(12) United States Patent
Motoyama

(10) Patent No.: US 9,813,453 B2
(45) Date of Patent: Nov. 7, 2017

(54) APPROACH FOR MANAGING ACCESS TO DATA ON CLIENT DEVICES

(71) Applicant: Tetsuro Motoyama, Cupertino, CA (US)

(72) Inventor: Tetsuro Motoyama, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 35 days.

(21) Appl. No.: 14/957,262

(22) Filed: Dec. 2, 2015

(65) Prior Publication Data

US 2016/0088025 A1    Mar. 24, 2016

Related U.S. Application Data

(63) Continuation of application No. 13/528,647, filed on Jun. 20, 2012, now Pat. No. 9,213,805.

(51) Int. Cl.
| | |
|---|---|
| *G06F 21/00* | (2013.01) |
| *H04L 29/06* | (2006.01) |
| *G06F 21/62* | (2013.01) |
| *G06F 21/30* | (2013.01) |
| *G06F 21/44* | (2013.01) |
| *G06F 21/60* | (2013.01) |
| *H04W 12/06* | (2009.01) |

(52) U.S. Cl.
CPC .............. *H04L 63/20* (2013.01); *G06F 21/00* (2013.01); *G06F 21/30* (2013.01); *G06F 21/44* (2013.01); *G06F 21/60* (2013.01); *G06F 21/62* (2013.01); *G06F 21/6218* (2013.01); *H04L 63/08* (2013.01); *H04W 12/06* (2013.01); *G06F 2221/2111* (2013.01); *G06F 2221/2113* (2013.01)

(58) Field of Classification Search
USPC ............................................................. 726/1
See application file for complete search history.

(56) References Cited

U.S. PATENT DOCUMENTS

| | | |
|---|---|---|
| 5,748,084 A | 5/1998 | Isikoff |
| 5,886,634 A | 3/1999 | Muhme |
| 6,006,228 A | 12/1999 | McCollum |
| 6,054,922 A | 4/2000 | Smith |
| 6,232,877 B1 | 5/2001 | Ashwin |
| 6,918,038 B1 | 7/2005 | Smith et al. |

(Continued)

OTHER PUBLICATIONS

U.S. Appl. No. 13/528,647, filed Jun. 20, 2012, Notice of Allowance, Mail Date Aug. 13, 2015.

(Continued)

*Primary Examiner* — William Goodchild
(74) *Attorney, Agent, or Firm* — Hickman Palermo Becker Bingham LLP

(57) ABSTRACT

A device management system is configured to manage access to electronic documents on client devices using policies. The policies specify one or more download and processing restrictions to be enforced with respect to the particular electronic document at client devices for example, particular hardware and software configurations that are required at client devices before data is permitted to be downloaded to those client devices. The policies may also specify other requirements that must be satisfied before data is permitted to be downloaded to those client devices, for example, user authentication.

20 Claims, 38 Drawing Sheets

(56) References Cited

U.S. PATENT DOCUMENTS

| | | | |
|---|---|---|---|
| 7,194,763 B2 | 3/2007 | Potter et al. |
| 7,271,727 B2 | 9/2007 | Steeves |
| 7,331,725 B2 | 2/2008 | Troyansky |
| 7,447,608 B1 | 11/2008 | Poston et al. |
| 7,679,518 B1 | 3/2010 | Pabla et al. |
| 7,693,736 B1 | 4/2010 | Chu et al. |
| 7,774,281 B2 | 8/2010 | Okamoto et al. |
| 8,056,143 B2 | 11/2011 | Brown et al. |
| 8,065,175 B1 | 11/2011 | Lewis |
| 8,180,663 B2 | 5/2012 | Tischhauser et al. |
| 8,205,093 B2 | 6/2012 | Argott |
| 8,266,534 B2 | 9/2012 | Curtis et al. |
| 8,316,446 B1 | 11/2012 | Campbell et al. |
| 8,468,581 B2 | 6/2013 | Cuende Alonso |
| 8,489,442 B1 | 7/2013 | Mohler |
| 8,789,144 B2 | 7/2014 | Mazzaferri et al. |
| 2001/0014867 A1 | 8/2001 | Conmy |
| 2002/0054345 A1 | 5/2002 | Tomida et al. |
| 2002/0069253 A1 | 6/2002 | Kazui et al. |
| 2002/0082907 A1 | 6/2002 | Inomata et al. |
| 2002/0111845 A1 | 8/2002 | Chong |
| 2003/0093688 A1 | 5/2003 | Helgessen et al. |
| 2004/0125956 A1 | 7/2004 | Heiderscheit et al. |
| 2004/0160623 A1 | 8/2004 | Strittmatter et al. |
| 2004/0162876 A1 | 8/2004 | Kohavi |
| 2004/0172586 A1 | 9/2004 | Ragnet et al. |
| 2005/0171830 A1 | 8/2005 | Miller et al. |
| 2005/0220099 A1 | 10/2005 | Igarashi |
| 2005/0223242 A1 | 10/2005 | Nath |
| 2006/0020587 A1 | 1/2006 | Kausik |
| 2006/0026671 A1 | 2/2006 | Potter et al. |
| 2006/0069656 A1 | 3/2006 | Horikiri |
| 2006/0173985 A1 | 8/2006 | Moore |
| 2006/0200374 A1 | 9/2006 | Nelken |
| 2006/0224430 A1 | 10/2006 | Butt |
| 2006/0278702 A1 | 12/2006 | Sakai |
| 2007/0006294 A1 | 1/2007 | Hunter |
| 2007/0030516 A1 | 2/2007 | Tsuji et al. |
| 2007/0033091 A1 | 2/2007 | Ravikumar et al. |
| 2007/0112926 A1 | 5/2007 | Brett et al. |
| 2007/0124436 A1 | 5/2007 | Shepherd |
| 2007/0124803 A1 | 5/2007 | Taraz |
| 2007/0198637 A1 | 8/2007 | Deboy et al. |
| 2007/0250370 A1 | 10/2007 | Partridge et al. |
| 2007/0282660 A1 | 12/2007 | Forth |
| 2007/0288278 A1 | 12/2007 | Alexander et al. |
| 2008/0040187 A1 | 2/2008 | Carraher et al. |
| 2008/0060080 A1* | 3/2008 | Lim ............... H04L 63/10 726/26 |
| 2008/0098478 A1 | 4/2008 | Vaidya et al. |
| 2008/0107274 A1 | 5/2008 | Worthy |
| 2008/0177611 A1 | 7/2008 | Sommers et al. |
| 2008/0282321 A1 | 11/2008 | Hecht et al. |
| 2009/0006982 A1 | 1/2009 | Curtis et al. |
| 2009/0030766 A1 | 1/2009 | Denner et al. |
| 2009/0044251 A1 | 2/2009 | Otake et al. |
| 2009/0067000 A1 | 3/2009 | Takiyama |
| 2009/0132329 A1 | 5/2009 | Lam et al. |
| 2009/0164643 A1 | 6/2009 | Thompson et al. |
| 2009/0204904 A1 | 8/2009 | Mujikic et al. |
| 2009/0222747 A1 | 9/2009 | May et al. |
| 2009/0265203 A1 | 10/2009 | Marcus et al. |
| 2009/0292930 A1 | 11/2009 | Marano et al. |
| 2010/0107225 A1 | 4/2010 | Spencer et al. |
| 2010/0251140 A1 | 9/2010 | Tipirneni |
| 2010/0251142 A1 | 9/2010 | Geppert et al. |
| 2010/0262926 A1 | 10/2010 | Gupta et al. |
| 2010/0299763 A1 | 11/2010 | Marcus et al. |
| 2010/0333169 A1 | 12/2010 | Hopen et al. |
| 2011/0040598 A1 | 2/2011 | Brady et al. |
| 2011/0055891 A1 | 3/2011 | Rice |
| 2011/0149314 A1 | 6/2011 | Kim |
| 2011/0161130 A1 | 6/2011 | Whalin et al. |
| 2011/0165890 A1 | 7/2011 | Howarth |
| 2011/0167357 A1 | 7/2011 | Benjamin et al. |
| 2011/0184772 A1 | 7/2011 | Norton et al. |
| 2011/0304428 A1 | 12/2011 | Motoyama |
| 2011/0314392 A1 | 12/2011 | Howarth |
| 2012/0022909 A1 | 1/2012 | Ayatollahi et al. |
| 2012/0023554 A1 | 1/2012 | Murgia et al. |
| 2012/0026536 A1 | 2/2012 | Shah |
| 2012/0102119 A1 | 4/2012 | Balogh et al. |
| 2012/0136982 A1 | 5/2012 | Hayashida |
| 2012/0185291 A1 | 7/2012 | Ramaswamy et al. |
| 2012/0191500 A1 | 7/2012 | Byrnes et al. |
| 2012/0198516 A1 | 8/2012 | Lim |
| 2012/0218576 A1 | 8/2012 | Sekine et al. |
| 2012/0221963 A1 | 8/2012 | Motoyama |
| 2012/0246574 A1 | 9/2012 | Hoard et al. |
| 2012/0255026 A1 | 10/2012 | Baca et al. |
| 2012/0311665 A1 | 12/2012 | Lim |
| 2013/0060592 A1 | 3/2013 | Motoyama |
| 2013/0060593 A1 | 3/2013 | Motoyama |
| 2013/0060594 A1 | 3/2013 | Motoyama et al. |
| 2013/0061330 A1 | 3/2013 | Sivaramamurthy et al. |
| 2013/0067564 A1 | 3/2013 | Fok Ah Chuen et al. |
| 2013/0085785 A1 | 4/2013 | Rogers et al. |
| 2013/0091549 A1* | 4/2013 | Joyce ............... G06F 21/00 726/4 |
| 2013/0097421 A1 | 4/2013 | Lim |
| 2013/0097667 A1 | 4/2013 | Pulfer et al. |
| 2013/0097688 A1 | 4/2013 | Bradley et al. |
| 2013/0117859 A1 | 5/2013 | Leontiev et al. |
| 2013/0347053 A1 | 12/2013 | Motoyama |
| 2013/0347055 A1 | 12/2013 | Motoyama |
| 2015/0062621 A1 | 3/2015 | Xiao |
| 2015/0199157 A1 | 7/2015 | Xiao et al. |
| 2016/0042192 A1 | 2/2016 | Motoyama et al. |
| 2016/0292448 A1 | 10/2016 | Motoyama et al. |

OTHER PUBLICATIONS

U.S. Appl. No. 13/528,647, filed Jun. 20, 2012, Interview Summary, Jun. 18, 2015.
U.S. Appl. No. 13/528,647, filed Jun. 20, 2012, Final Office Action, May 6, 2015.
U.S. Appl. No. 13/528,647, filed Jun. 20, 2012, Office Action, Dec. 22, 2014.
Tur et al., "The CALO Meeting Assistant System", Aug. 2012, IEEE, Transactions on Audio, Speech, and Language Processing, vol. 18, Issue 6, 12 pages.
U.S. Appl. No. 13/037252, filed Feb. 28, 2011, Office Action dated Dec. 16, 2014.
U.S. Appl. No. 12/252,320, filed Oct. 15, 2008, Notice of Allowance dated May 24, 2012.
U.S. Appl. No. 13/226,334, filed Sep. 6, 2011, Office Action dated Feb. 12, 2013.
U.S. Appl. No. 13/226,334, filed Sep. 6, 2011, Final Office Action dated Jul. 3, 2013.
U.S. Appl. No. 13/226,314, filed Sep. 6, 2011, Office Aciton dated Aug. 14, 2013.
U.S. Appl. No. 13/226,314, filed Sep. 6, 2011, Final Office Action dated Dec. 3, 2013.
U.S. Appl. No. 13/226,314, filed Sep. 6, 201, Office Action dated Jan. 15, 2013.
U.S. Appl. No. 13/226,284, filed Sep. 6, 2011, Office Action dated Nov. 6, 2012.
U.S. Appl. No. 13/226,334, filed Sep. 6, 2011, Final Office Action dated Jun. 17, 2014.
U.S. Appl. No. 13/226,284, filed Sep. 6, 2011, Final Office Action dated Dec. 23, 2013.
U.S. Appl. No. 13/226,334, Filed Sep. 6, 2011, Final Office Action dated May 7, 2015.
U.S. Appl. No. 13/037,252, filed Feb. 28, 2011, Notice of Allowance dated Jun. 1, 2015.
U.S. Appl. No. 13/037,252, filed Feb. 28, 2011, Final Office Action dated Nov. 20, 2013.
U.S. Appl. No. 13/037,252, filed Feb. 28, 2011, Office Action dated Jun. 3, 2013.

(56) References Cited

OTHER PUBLICATIONS

U.S. Appl. No. 12/884,019, filed Sep. 16, 2010, Office Action dated Sep. 19, 2012.
U.S. Appl. No. 12/884,019, filed Sep. 16, 2010, Notice of Allowance dated Feb. 19, 2013.
U.S. Appl. No. 12/813,436, filed Jun. 10, 2010, Office Action dated Oct. 11, 2012.
U.S. Appl. N. 12/252,320, filed Oct. 15, 2008, Office Action dated Dec. 6, 2011.
U.S. Appl. No. 13/226,284, filed on Sep. 6, 2011, Office Action dated Jul. 3, 2013.
U.S. Appl. No. 13/528,642, Filed Jun. 20, 2012, Office Action Mar. 16, 2015.
U.S. Appl. No. 13/528,642, filed Jun. 20, 2012, Final Office Action dated Oct. 10, 2013.
U.S. Appl. No. 13/528,642, Office Action dated Jun. 3, 2013.
U.S. Appl. No. 13/528,638, filed Jun. 20, 2012, Office Action Aug. 19, 2013.
U.S. Appl. No. 13/226,284, filed Sep. 6, 2011, Final Office Action dated Apr. 3, 2013.
U.S. Appl. No. 12/813,436, filed Jun. 10, 2009, Notice of Allowance dated Jun. 6, 2013.
U.S. Appl. No. 13/528,642, filed Jun. 20, 2012, Final Office Action dated Sep. 6, 2016.
U.S. Appl. No. 13/226,334, filed Sep. 6, 2011, Office Action dated Oct. 22, 2013.
U.S. Appl. No. 13/528,642, filed Jun. 20, 2012, Office Action dated Apr. 18, 2016.
U.S. Appl. No. 13/226,314, filed Sep. 6, 2011, Final Office Action dated Jun. 27, 2013.
U.S. Appl. No. 13/528,642, filed Jun. 20, 2012, Interview Summary dated Dec. 22, 2015.
U.S. Appl. No. 13/528,642, filed Jun. 20, 2012, Final Office Action dated Oct. 14, 2015.
U.S. Appl. No. 13/528,638, filed Jun. 20, 2012, Notice of Allowance dated Jan. 16, 2014.
U.S. Appl. No. 13/226,334, filed Sep. 6, 2011, Office Action dated Jan. 5, 2016.
U.S. Appl. No. 13/226,334, filed Sep. 6, 2011, Office Action dated Oct. 23, 2014.

* cited by examiner

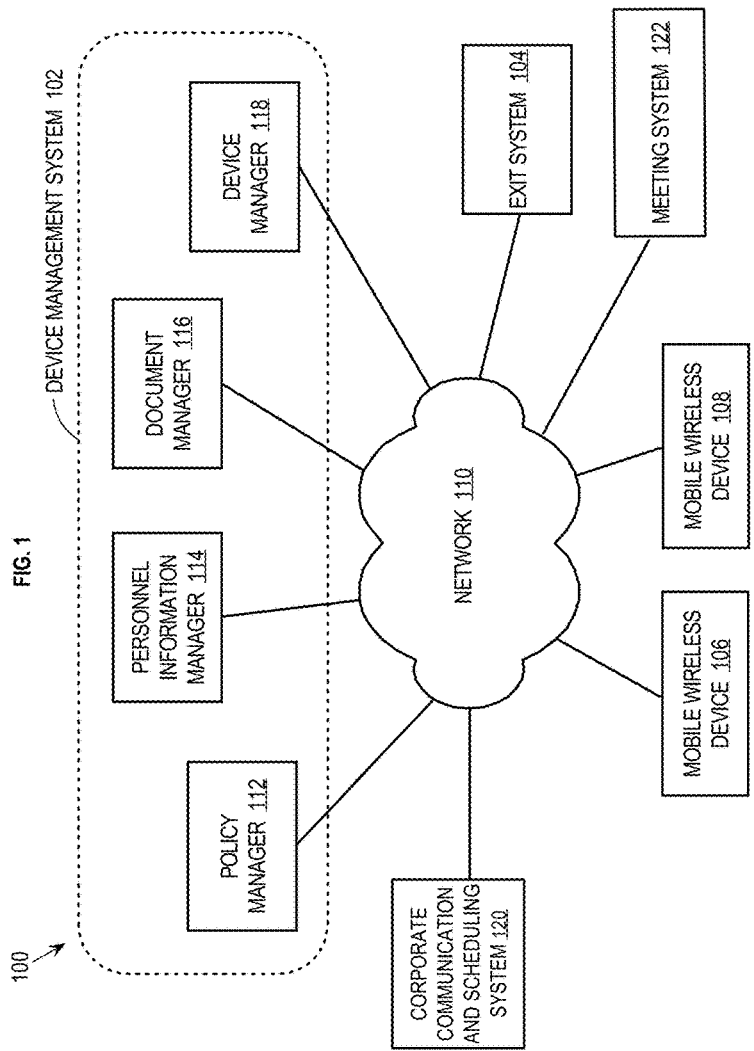

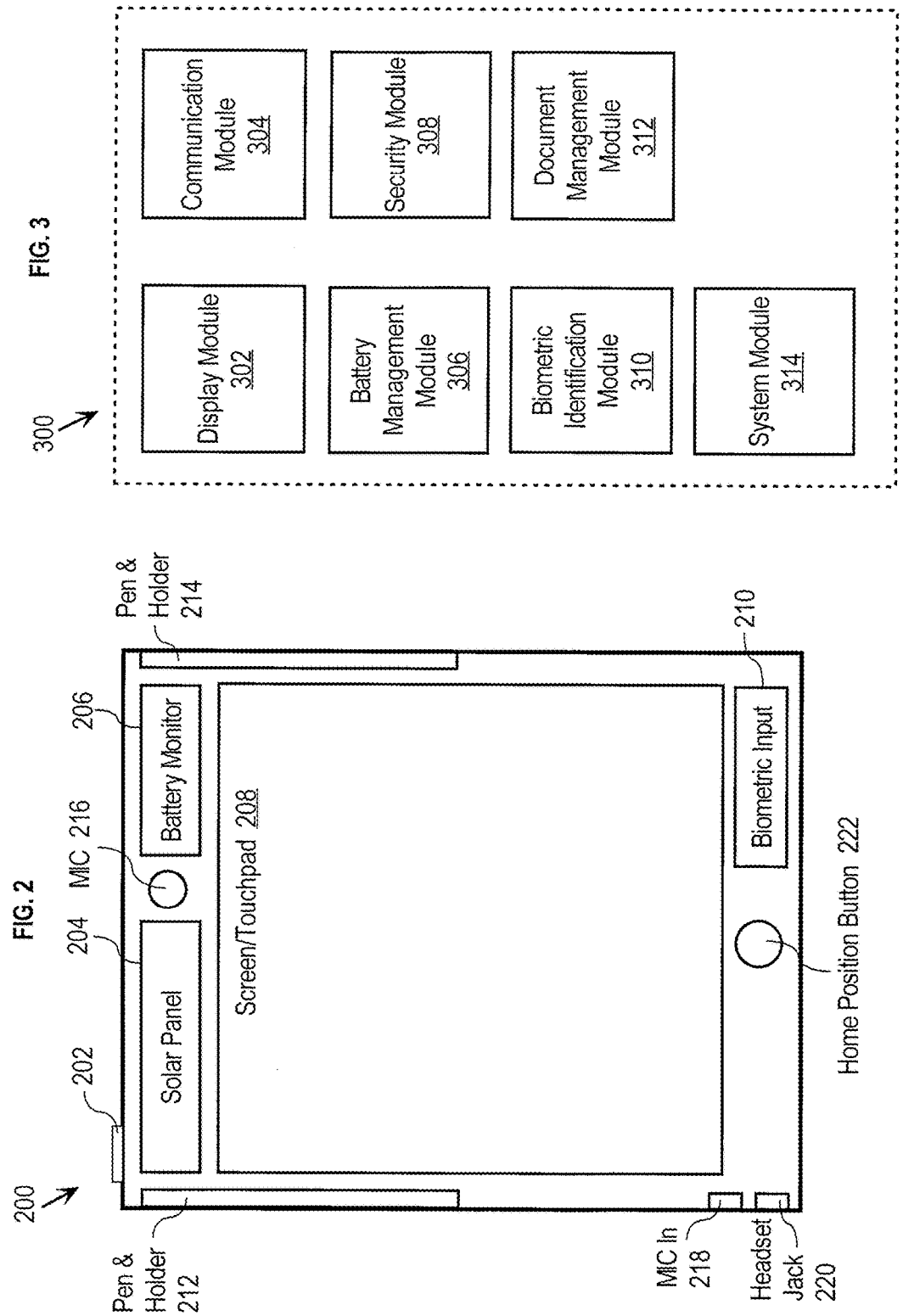

FIG. 6A

POLICY DATA TABLE

600 →

| Authorization Level | Policy Inside Building/Company | Policy Outside Building/Company |
|---|---|---|
| Authorization Level 1 | None | Level 0 |
| Authorization Level 2 | Level 0 | Level 0, Level 1 |
| Authorization Level 3 | Level 0, Level 1 | Level 0, Level 1, Level 2 |
| . . . | . . . | . . . |
| Lowest Authorization Level | All Confidential Information | All Confidential Information |

POLICY DATA TABLE

650

| Authorization Level | Policy Inside Building/Company | Policy Outside Building/Company |
|---|---|---|
| Project A | Projects A, B, C, D | Project A |
| Group E | Groups E, G, X | Group E |
| User 1 | Projects A, D | Project A |
| User 2 | Groups E, X | Group E |

FIG. 6C

POLICY DATA TABLE--Policy Associated with Data Attribute

| Data Attribute | Top Secret (Most Restrictive) | Level 0 | Level 1 | Level 2 (Least Restrictive) |
|---|---|---|---|---|
| Policy -- Specifies Download and Processing Restrictions | -No Data Download<br>-Display Only<br>-No Image Copy of Display at Device | -Download Based Upon Authorization Level<br>-No Image Copy of Display at Device<br>-No Copying/Forwarding of Downloaded Data | -Download Based Upon Authorization Level<br>-No Image Copy of Display at Device<br>-No Copying of Downloaded Data<br>-Forwarding of Downloaded Data Based Upon Same Authorization Level | -Download Based Upon Authorization Level<br>-No Image Copy of Display at Device<br>-No Copying of Downloaded Data<br>-Forwarding of Downloaded Based Upon Same Authorization Level |

670

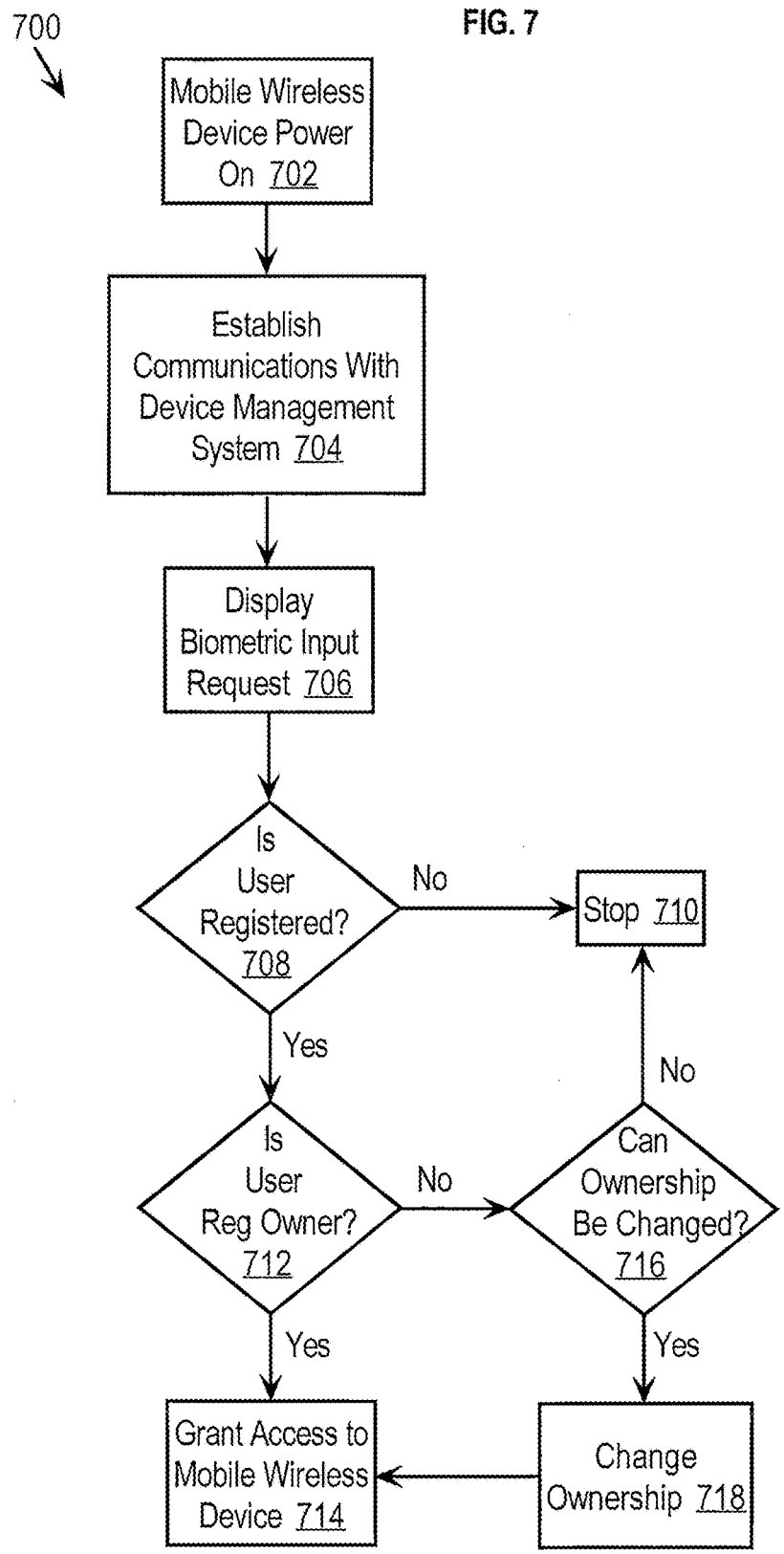

Meeting Arrangement Request Form

| Agenda | |
| --- | --- |
| Organizer | |
| Key Persons | |
| Additional persons | |

Date Range: From ____ To ____ Duration (Hours) ____ [Submit]

FIG 21A

|  | Mon 4/25 | Tue 4/26 | Wed 4/27 | Thu 4/28 | Fri 4/29 |
| --- | --- | --- | --- | --- | --- |
| 8 am | | | | | |
| 9 am | | 1<br>At Cupertino Office<br>Rm 123 | | | |
| 10 am | | | | | |
| 11 am | | | | 3<br>At Menlo Park Office<br>Rm 5A | |
| 12 pm | | | | | |
| 1 pm | | 2<br>At Cupertino Office<br>Rm 123 | | | |
| 2 pm | | | | | |
| 3 pm | | | | | |
| 4 pm | | | | | |
| 5 pm | | | | | |
| 6 pm | | | | | |

FIG 21B

Meeting Arrangement Request

| | |
|---|---|
| Agenda | |
| Organizer | |
| Key Persons | |
| Additional persons | |
| Date and Time | From [ ]  To [ ]  Duration (Hours) [ ] |
| Location | |
| Comments | |

[ Submit ]

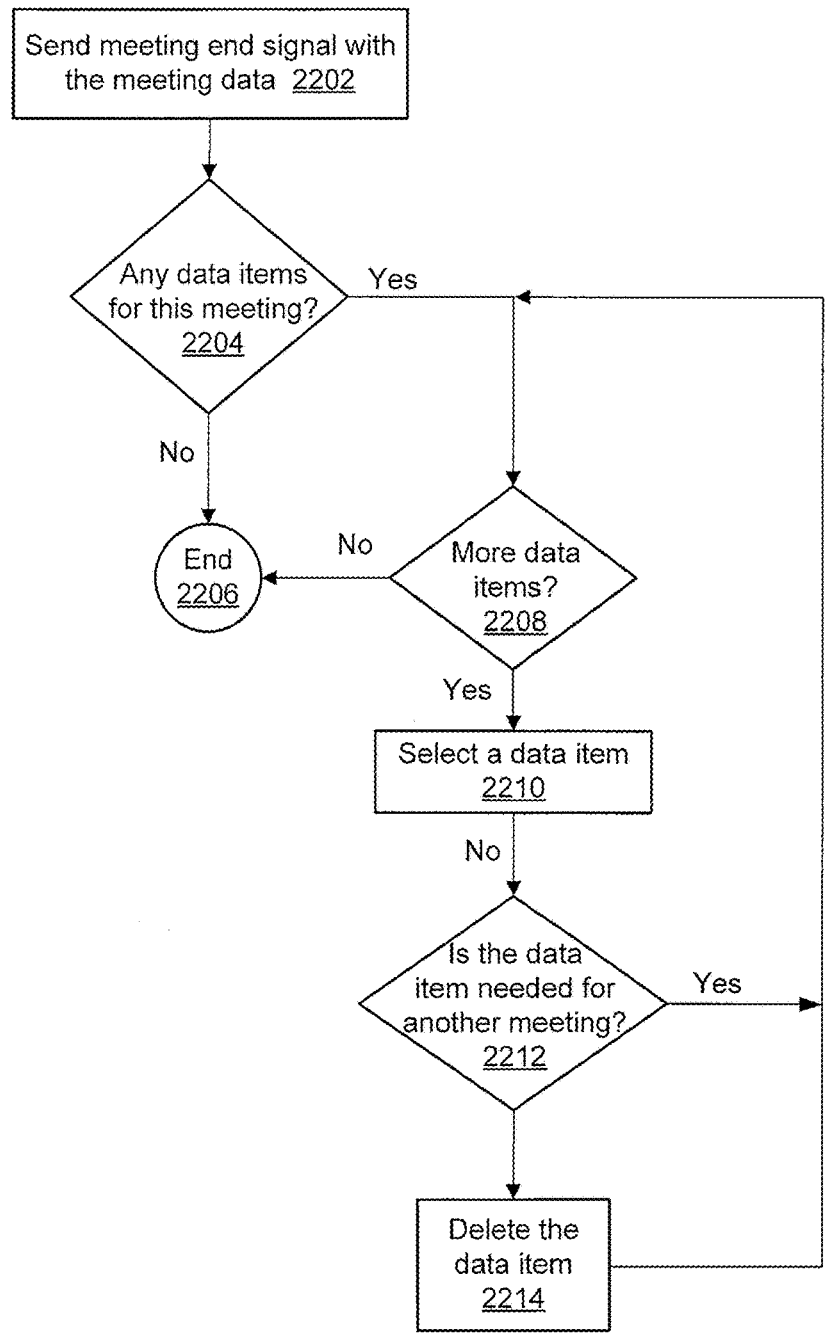

Please use the following information to generate the official meeting minutes

Date:         29 January 2011
Attendants:   T. Motoyama, E. Becker
Documents:    RSID 1-XYZ Disclosure
Agenda:       Disclosure Explanation Decisions Action Items

| Who | By When | What |
|-----|---------|------|
|     |         |      |
|     |         |      |
|     |         |      |
|     |         |      |

Motoyama Note
    Page 1

Page 2

Becker Note
    Page 1

Page 2

Page 3

Outline

Decision [Add Row]

Action Items [Add Row]

| Who | By When | What |
|---|---|---|
| ▽ | | |
| ▽ | | |
| ▽ | | |
| ▽ | | |

DEVICE CLASSIFICATION TABLE

3300

| DEVICE CLASSIFICATION | Special Devices (Most Restrictive) | General Devices Configured by a Business Organization | General Devices (Least Restrictive) |
|---|---|---|---|
| DEVICE ATTRIBUTES | -Special devices configured and maintained by a business organization<br>-Configured to support enforcement of document policies and security | -General purpose devices configured and maintained by a business organization<br>-Configured to support enforcement of document and security policies | -General purpose devices (tablet computers, laptop and desktop computer, smart phones, etc.) |

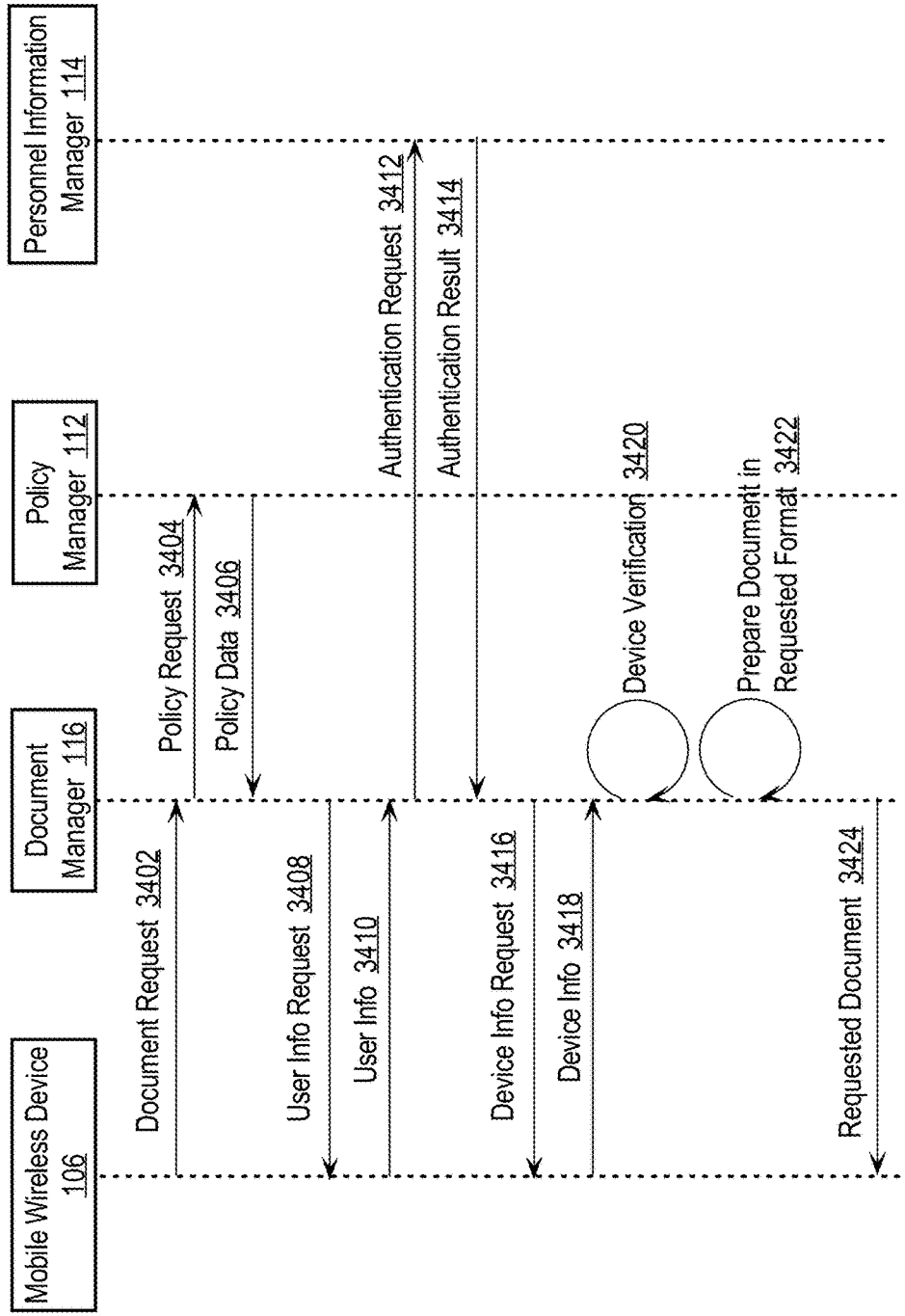

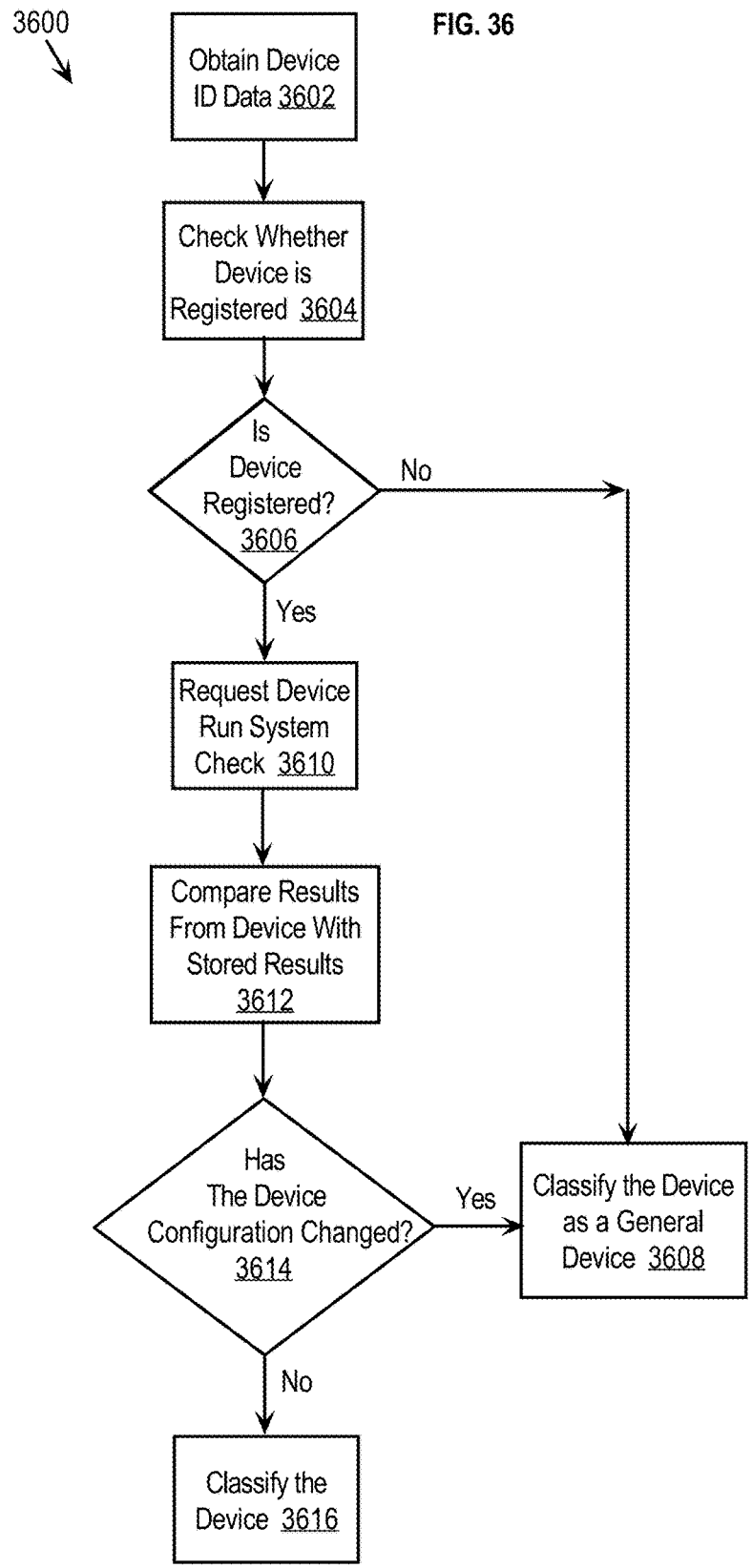

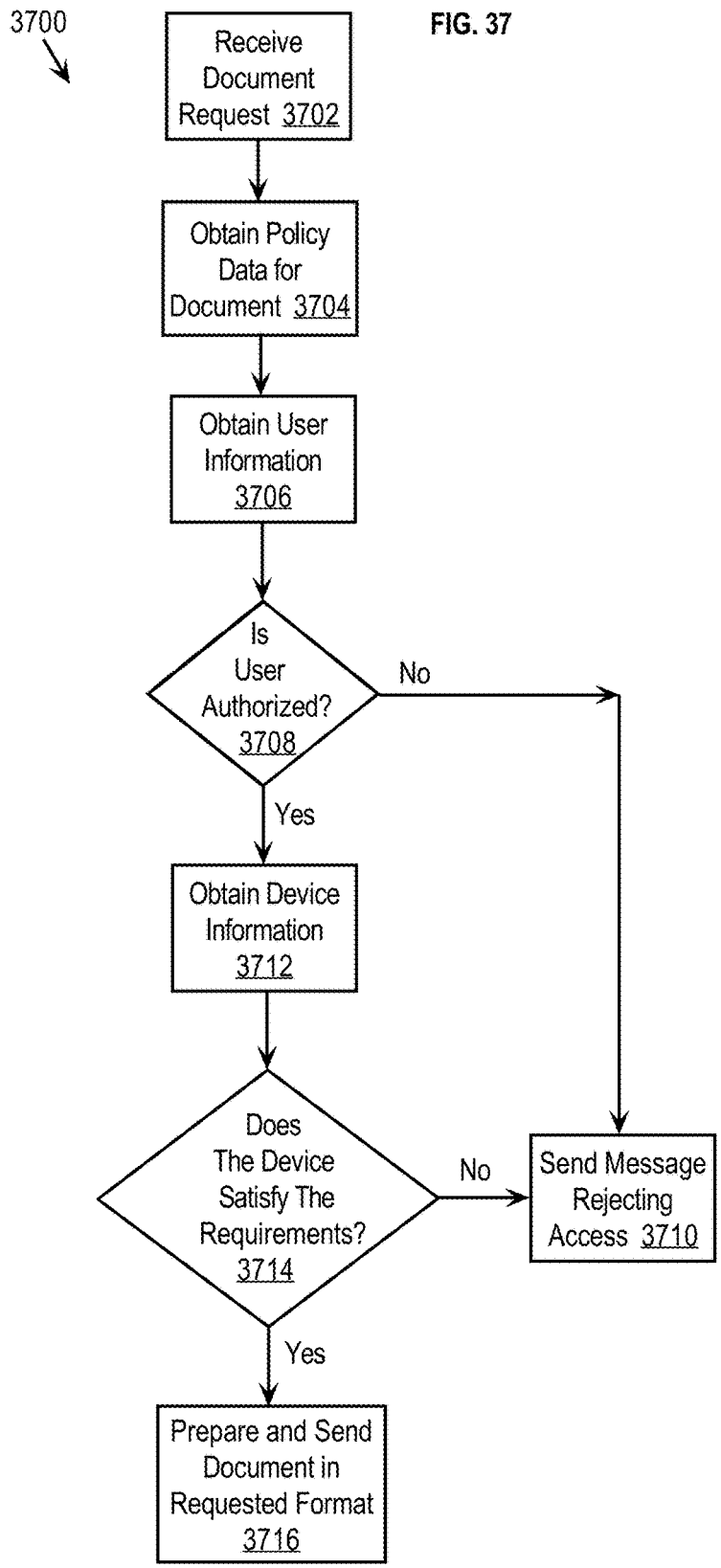

APPROACH FOR MANAGING ACCESS TO DATA ON CLIENT DEVICES

RELATED APPLICATION DATA AND CLAIM OF PRIORITY

This application is a Continuation of prior U.S. patent application Ser. No. 13/528,647 entitled "Approach For Managing Access To Data On Client Devices", filed Jun. 20, 2012, the contents of which are incorporated by reference for all purposes as if fully set forth herein.

This application is related to U.S. patent application Ser. No. 12/252,320 entitled "Approach For Managing Access To Electronic Documents On Network Devices Using Document Retention Policies And Document Security Policies," filed Oct. 15, 2008, and also to U.S. patent application Ser. No. 13/226,284 entitled "Meeting Arrangement With Key Participants And With Remote Participation Capability," filed Sep. 6, 2011, and also to U.S. patent application Ser. No. 13/226,314 entitled "Meeting Planner," filed Sep. 6, 2011, and also to U.S. patent application Ser. No. 13/226,334 entitled "Post Meeting Processing," filed Sep. 6, 2011, and also to U.S. patent application Ser. No. 13/037,252 entitled "Electronic Meeting Management For Mobile Wireless Devices With Post Meeting Processing," filed Feb. 28, 2011, and also to U.S. patent application Ser. No. 12/884,019 entitled "Electronic Meeting Management System For Mobile Wireless Devices," filed Sep. 16, 2010, and also to U.S. patent application Ser. No. 12/813,436 entitled "Security System For Managing Information On Mobile Wireless Devices," filed Jun. 10, 2010, and also to U.S. patent application Ser. No. 12/813,436 entitled "Approach For Managing Access To Data On Client Devices," filed herewith, and also to U.S. patent application Ser. No. 13/528,642 entitled "Approach For Managing Access To Data On Client Devices," filed herewith, the contents of which are incorporated by reference in their entirety for all purposes as if fully set forth herein.

FIELD OF THE INVENTION

This invention relates generally to scheduling technology, and more specifically, to a system for meeting management and techniques for controlling access to electronic documents on mobile devices.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

The widespread proliferation of network devices, such as telephony devices, tablet computers and personal digital assistants (PDAs), has increased connectivity and enhanced collaboration. In some instances, network devices execute meeting and scheduling applications to facilitate scheduling and group collaboration within or across organizations. For example, a rudimentary scheduling system may allow a user to view a schedule, send meeting invitations, and maintain a task list. However, scheduling, preparing for a meeting, presenting the meeting, and following up the results of the meeting, are often cumbersome tasks that may be bogged down by various inefficiencies.

SUMMARY

An approach is provided for managing access to a particular electronic document. A device management system receives, from a client device, a request to access a particular electronic document. A determination is made, from a plurality of policies, of one or more policies that apply to the particular electronic document, wherein the one or more policies specify one or more download and processing restrictions to be enforced with respect to the particular electronic document at client devices. A determination is made, based upon the one or more download and processing restrictions to be enforced with respect to the particular electronic document at client devices, that user authentication is required to download the particular electronic document to the client device. In response to determining that user authentication is required to download the particular electronic document to the client device, determining whether a user of the client device is authorized to download the particular electronic document. In response to determining that the user of the client device is authorized to download the particular electronic document, a determination is made of one or more attributes of the client device to which the particular electronic document is to be downloaded, and a determination is made, based upon the one or more attributes of the client device to which the particular electronic document is to be downloaded, whether the client device is currently configured to enforce the one or more download and processing restrictions with respect to the particular electronic document. In response to determining, based upon the one or more attributes of the client device to which the particular electronic document is to be downloaded, that the client device is currently configured to enforce the one or more download and processing restrictions with respect to the particular electronic document, then providing the particular electronic document to the client device. The approach may be implemented as a computer-implemented method, by an apparatus, system or device, or by a computer-readable medium storing instructions which, when processed by one or more processors, implements the approach.

BRIEF DESCRIPTION OF THE DRAWINGS

In the figures of the accompanying drawings like reference numerals refer to similar elements.

FIG. 1 is a block diagram that depicts an example security system for managing information on mobile wireless devices.

FIG. 2 is a block diagram that depicts an example mobile wireless device.

FIG. 3 is a block diagram that depicts an example architecture of a mobile wireless device.

FIGS. 6A and 6B are example policy data tables maintained by a policy manager.

FIG. 6C is an example policy data table maintained by a policy manager that includes policy data defined for particular data attributes.

FIG. 7 is a flow diagram that depicts an approach for powering on and registering a mobile wireless device.

FIG. 21A depicts an example meeting arrangement request form used by a user to request a meeting arrangement.

FIG. 21B depicts an example presentation of meeting options that are determined in response to receiving a meeting arrangement request from a user.

FIG. 21C depicts an example meeting request form used to invite potential participants to attend a meeting.

FIG. 21D depicts an example invitation form received by potential participants that may be used to respond to a meeting request.

FIG. 22 is a flow diagram that depicts an approach for a mobile wireless device to delete data associated with a meeting that has concluded.

FIG. 25 depicts an example meeting record or report.

FIG. 28 depicts an example meeting planning form used by a user to plan for a meeting.

FIG. 30 depicts an example display that may be shown and updated during a meeting.

FIG. 33 depicts a device classification table.

FIG. 34 is a message ladder diagram that depicts example messages exchanged between a mobile wireless device and a device management system to manage access to data on a mobile wireless device.

FIG. 36 is a flow diagram that depicts an approach for performing a device qualification check according to an embodiment.

FIG. 37 is a flow diagram that depicts an approach for using policies to manage access to data on the mobile wireless device.

DETAILED DESCRIPTION

Figure 5:
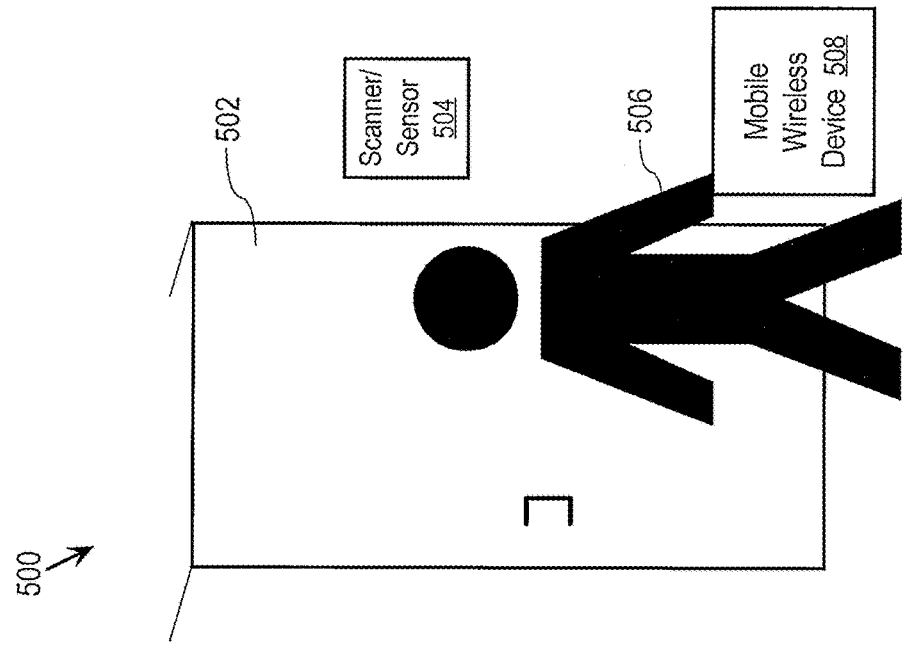
FIG. 5 depicts an example exit system.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
  II. SYSTEM ARCHITECTURE
    A. Mobile Wireless Devices
    B. Exit System
    C. Device Management System
    D. Corporate Communication and Scheduling System
    E. Meeting System
  III. MOBILE WIRELESS DEVICE POWER ON AND REGISTRATION
  IV. MANAGING INFORMATION ON MOBILE WIRELESS DEVICES
  V. LOW POWER CONSIDERATIONS
  VI. IMPLEMENTATION MECHANISMS
  VII. MEETING MANAGEMENT
    A. Participant Authorization
    B. Sharing Information Among Mobile Wireless Devices
    C. Arranging Meetings Among Mobile Wireless Devices
    D. Post Meeting Processing
  VIII. AUTOMATIC MEETING OPTION DETERMINATION
  IX. MEETING PLANNING AND PRESENTATION
  X. DECISION AND ACTION ITEM PROCESSING
  XI. MANAGING ACCESS TO ELECTRONIC DOCUMENTS ON CLIENT DEVICES

I. Overview

A device management system is provided for managing electronic meetings on mobile wireless devices. The device management system includes a meeting support system that is configured to receive a request for an electronic meeting from a mobile wireless device that corresponds to a meeting organizer. The request specifies a plurality of participants for the meeting. The device management system generates and transmits a plurality of electronic meeting invitations to a plurality of mobile wireless devices that correspond to the plurality of participants. The device management system receives a plurality of responses from the mobile wireless devices indicating whether the plurality of participants will attend the electronic meeting. The device management system receives, from the mobile wireless device, identification data that identifies one or more documents or information that will be made available to the plurality of participants via the plurality of mobile wireless devices. The meeting support system determines whether the plurality of participants is authorized to access the one or more electronic documents or information. This may include, for example, determining whether the plurality of participants have sufficient access rights to satisfy one or more access policies that apply to the one or more electronic documents or information. If the meeting support system determines that any of the participants are not authorized to access any of the electronic documents or information, the meeting support system notifies the meeting organizer. The device management system may also include a meeting session management system that is configured to share information among the plurality of mobile wireless devices. More particularly, information entered via one or more of the mobile wireless devices, e.g., via a graphical user interface, is shared with the other mobile wireless devices of the meeting participants.

The system may also include a location system that is configured to detect that a user has requested to leave a specified location. The location system is also configured to detect that a particular mobile wireless device is in proximity to the user. The device management system is configured to determine whether the user is authorized to remove the mobile wireless device from the specified location. If the user is not authorized to remove the mobile wireless device from the specified location, the device management system signals the location system to prevent the user from leaving the specified location with the mobile wireless device. If the user is authorized to remove the mobile wireless device from the specified location, then the device management system determines, based upon policy data that specifies attributes of information that should not be removed from the specified location on mobile wireless devices, information on the mobile wireless device that is to be rendered inaccessible. The device management system is further configured to cause the determined information on the mobile wireless device to be rendered inaccessible. Rendering information on the mobile wireless device inaccessible may include, for example, deleting the information, encrypting the information or re-encrypting the information. In this manner, the system provides better control over information stored on mobile wireless devices and is particularly helpful in preventing unauthorized information from being removed from a specified location. Embodiments are described hereinafter in the context of managing information stored on mobile wireless devices upon exit from a building, but the invention is not limited to this context and is applicable to managing access to information stored on mobile wireless devices when leaving any location.

The device management system may be further configured to manage access to electronic documents on client devices using policies. The policies specify one or more download and processing restrictions to be enforced with respect to the particular electronic document at client devices for example, particular hardware and software configurations that are required at client devices before data is permitted to be downloaded to those client devices. The policies may also specify other requirements that must be satisfied before data is permitted to be downloaded to those client devices, for example, user authentication.

II. System Architecture

FIG. 1 is a block diagram that depicts an example system 100 for managing meetings on mobile wireless and other network devices. System 100 includes a device management system 102, an exit system 104, corporate communication and scheduling system 120, meeting system 122, and mobile wireless devices 106, 108, communicatively coupled via a network 110. Network 110 may be implemented by any medium or mechanism that provides for the exchange of data between device management system 102, exit system 104, corporate communication and scheduling system 120, meeting system 122, and mobile wireless devices 106, 108. Examples of network 110 include, without limitation, a network such as a Local Area Network (LAN), Wide Area Network (WAN), Ethernet or the Internet, or one or more terrestrial, satellite or wireless links. The mobile wireless devices 106, 108, exit system 104 and device management system 102 are described in more detail hereinafter.

A. Mobile Wireless Devices

Mobile wireless devices 106, 108 may be implemented by any type of mobile wireless device. Examples of mobile wireless devices 106, 108 include, without limitation, a laptop computer, a tablet computer, a cell phone and an MP3 player.

FIG. 2 is a block diagram that depicts an example mobile wireless device 200 used with the system 100 of FIG. 1. In this example, mobile wireless device 200 includes a power switch 202 for powering on and powering off the mobile wireless device 200. Although powered-off, the mobile wireless device 200 may maintain wireless contact with the device management system 102. Mobile wireless device 200 also includes a solar panel 204 for charging an internal battery of the mobile wireless device 200, as well as a battery monitor 206 for monitoring the state of the internal battery. The battery monitor 206 may also indicate whether the internal battery is being charged by the solar panel 204 and may indicate additional information, such as a current voltage supplied by the solar panel 204. Mobile wireless device 200 includes a screen/touchpad 208 for displaying information and for receiving user input. The screen/touchpad 208 may include a dedicated area with controls for controlling the display of pages and/or for entering information and characters. Mobile wireless device 200 also includes a biometric input 210 for receiving biometric information from a user. The biometric input 210 may be, for example, a touchpad for receiving a finger print of a user. The biometric information may be used to authenticate a user to provide enhanced security over simple password protection. Pen & holders 212, 214 provide devices for users to write and/or select GUI objects on screen/touchpad 208. A microphone 216 accepts audio input, as does a MIC In (input) 218. Mobile wireless device 200 also includes a headset jack 220 and a home position button 222. Mobile wireless device 200 may include other features and components, depending upon a particular implementation that are not depicted in FIG. 2 or described herein for purposes of explanation. Example additional features include, without limitation, communications ports, such as Ethernet, Firewire and USB ports, one or more power outlets, a camera, a mute button, a removable protective cover and various user input controls, such as buttons, sliders, control wheels, touchpads, joysticks a keypad and a keyboard. The physical dimensions of mobile wireless device 200 may vary depending upon a particular implementation and the invention is not limited to any particular physical dimensions. One example set of dimensions is about 8 inches wide, by about 11 inches in height, by about 0.1 to 0.3 inches thick.

FIG. 3 is a block diagram that depicts an example architecture 300 for mobile wireless device 200. In this example, architecture 300 includes several different types of modules that may be implemented in discrete hardware elements, computer software, or any combination of discrete hardware elements and computer software. Furthermore, mobile wireless devices 106, 108 may include additional elements that are not depicted in the figures or described herein for purposes of brevity.

Architecture 300 includes a display module 302 that controls displaying information on the screen/touchpad 208 and for processing user input detected on the screen/touchpad 208. Communication module 304 manages communications between the mobile wireless device 200 and other devices on network 110, such as device manager 118, including selection of communication protocol. Mobile wireless device 200 may communicate using a wide variety of wireless communications and protocol and the invention is not limited to mobile wireless devices on any particular wireless communication method or protocol or any particular frequency range. Example wireless communication methods and protocols include, without limitation, cellular telephony communication methods (3G, 4G, etc), 802.11x, 802.15x and Bluetooth. Mobile wireless device 200 may also change communication methods to adapt to different systems or geographical areas.

Battery management module 306 monitors the state of the internal battery and the charging of the internal battery by the solar panel 204 and also manages power consumption to maximize battery life. For example, the battery management module 306 may manage wireless communications and the brightness of the screen/touchpad 208 to maximize battery life. The battery management module 306 may also cause messages to be displayed on the screen/touchpad 208 to notify a user of a low battery state. The security module 308 manages various aspects of security for mobile wireless device 200. For example, the security module 308 manages the encryption and decryption of information stored on mobile wireless device 200. The security module 308 may also control access to information based upon access policies managed by the device management system 102. For example, the security module 308 may grant or deny access by a particular user to information based upon the user's authorization level and policies that specify the information that corresponds to the authorization level. The security module 308 may also render inaccessible information on the mobile wireless device 200 in response to signals from the device management system 102. A biometric identification module 310 manages the identification of users/owners of the mobile wireless device 200 based upon biometric information received from biometric input 210. A document management module 312 manages documents on the mobile wireless device 200. This may include, for example, downloading documents and information from the device management system 102 to the mobile wireless device 200 and managing versions of information stored on the mobile wireless device 200. A system module 314 manages all other functions of the mobile wireless device 200. The modules depicted in FIG. 3 may be combined into fewer modules or separated into additional modules, depending upon a particular implementation and the invention is not limited to the particular configuration depicted in FIG. 3.

Figure 4:
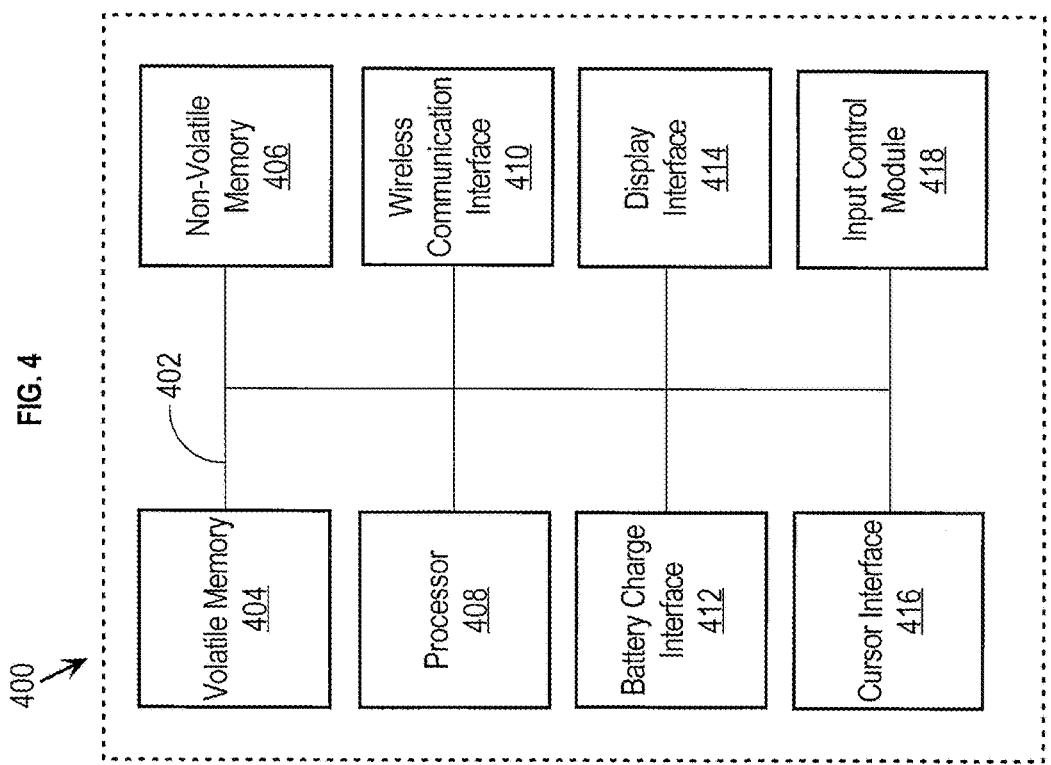
FIG. 4 is a block diagram that depicts an example hardware architecture for a mobile wireless device.

FIG. 4 is a block diagram that depicts an example hardware architecture 400 for mobile wireless device 200. Architecture 400 includes various elements communicatively coupled via a communications bus 402. The architecture 400 includes a volatile memory 404, for example a random access memory (RAM), a non-volatile memory 406, for example one or more disks or Solid State Drives (SSD's), and a processor 408. The volatile memory 404 and non-volatile memory 406 may be used to store configuration information for the mobile wireless device 200, as well as content. The architecture 400 also includes a wireless communications interface 410 for facilitating wireless communications between the mobile wireless device 200 and other devices on network 110, for example the device management system 102, the exit system 104 and other mobile wireless devices 106, 108. A battery charge interface 412 provides a connection between the solar panel 204 and the internal battery. The battery charge interface 412 may also provide a connection between the internal battery and the battery monitor 206. In the situation where the battery monitor 206 also monitors the solar panel 204, the battery charge interface 412 may also provide a connection between the solar panel 204 and the battery monitor 206. The display interface 414 provides a connection between the screen/touchpad 208 and the other internal components of FIG. 4 for displaying information on screen/touchpad 208. A cursor interface 416 provides an interface between the screen/touchpad 208 and the other internal components of FIG. 4 for controlling a cursor displayed on the screen/touchpad 208. An input control module 418 provides an interface between the screen/touchpad 208 and the other internal components of FIG. 4 for processing user input received via the screen/touchpad 208. The elements depicted in FIG. 4 may be combined into fewer elements or separated into additional elements, depending upon a particular implementation and the invention is not limited to the particular configuration depicted in FIG. 4.

B. Exit System

Exit system 104 is configured to detect user requests to exit a building. For example, the user may present an identification card to a scanner and the exit system unlocks a door to allow the user to exit the building. As another example, the user may pass through an area covered by a scanner so that the user does not have to present the identification card to a scanner device. Exit system 104 may also be configured to detect the presence of mobile wireless devices 106, 108 near building exits. This may be done, for example, by using information transmitted by mobile wireless devices 106, 108 to determine their location. For example, mobile wireless devices 106, 108 may be configured with location detection capability, e.g., a global positioning system, and transmit their location to exit system 104. As another example, the location of mobile wireless devices 106, 108 may be determined based upon communications between mobile wireless devices 106, 108 and wireless access points or cellular base stations. Alternatively, exit system 104 may detect the signal strength of wireless devices 106, 108 at multiple points leading to the exit. Exit system 104 may include any number of hardware and software components for performing these functions.

FIG. 5 depicts an example exit system 500 according to one embodiment. Exit system 500 includes building exit in the form of a door 502 and a scanner/sensor 504. A user 506 may manually enter into scanner/sensor 504 information that uniquely identifies the user 506. For example, the user 506 may manually enter a user ID or employee code into a keypad or keyboard on scanner/sensor 504. Alternatively, the user 506 may present an identification card that is scanned by scanner/sensor 504 to automatically extract from the identification card information that identifies the user. This is more convenient for the user 506 because the user 506 does not have to manually enter their user identification into the scanner/sensor 504. As another alternative, RFID tags or other similar technology may be used that allows the scanner/sensor 504 to extract the identification information from the identification card without the user 506 having to actively present the identification card to the scanner/sensor 504. For example, the user's 506 identification card may include an RFID tag that stores the user identification information. The scanner/sensor 504 includes an RFID scanner so that when the user 506 is in proximity of the scanner/sensor 504, the user's 506 identification information is automatically retrieved from the user's 506 identification card.

In this example, the user 506 has in their possession a mobile wireless device 508. The exit system 500 is configured to detect that the mobile wireless device 508 is in proximity to the user 506. This may be accomplished using information transmitted by the mobile wireless device 506, such as position information, or by determining the location of the mobile wireless device 506 based upon communications between the mobile wireless device 506 and wireless access points or cellular base stations. According to one embodiment, the mobile wireless device 508 is configured to always communicate with the device management system 102 when the mobile wireless device 508 is powered on to ensure that the location of the mobile wireless device 508 can always be determined. The mobile wireless device 508 may also communicate status information, including for example, operational state and battery level. The use of the exit system 500 to manage information stored on mobile wireless devices is described in more detail hereinafter.

C. Device Management System

Referring to FIG. 1, according to one embodiment, device management system 102 includes several elements, including a policy manager 112, a personnel information manager 114, a document manager 116 and a device manager 118.

Policy manager 112 manages information retention polices that specify conditions under which information is to be rendered inaccessible. For example, an information retention policy may specify retention periods or absolute retention times for classes of information or for individual information items, such as individual electronic documents. Policy manager 112 also manages access policies that specify conditions under which information may be accessed. For example, an access policy may specify attributes of users that are allowed to access specified information. The attributes may specify classes, levels, of users and how long specified classes of information are to be retained before being rendered inaccessible.

Policy manager 112 manages policies that specify the rights of users with respect to mobile wireless devices. For example, a policy might specify that a user is an authorized user or owner of a particular mobile wireless device or a class of mobile wireless devices. A policy might also specify particular mobile wireless devices or classes of mobile wireless devices that users are allowed to remove from a building.

Policy manager 112 also manages policies that specify attributes of information that is not allowed to be stored on mobile wireless devices, as well as information that is not allowed to be removed from a building on mobile wireless devices. As used herein, the term "information" refers to any type of information or data. Examples of information include, without limitation, data files, emails, electronic messages and electronic documents. Example attributes include, without limitation, types of information, categories of information or names associated with information. For example, a policy may specify that public information may be removed from a building on mobile wireless devices, but that information classified as confidential cannot be removed from the building on mobile wireless devices. As another example, the policy may identify particular information by name that cannot be removed from the building on mobile wireless devices. Attributes may be specific to a particular business organization, sub-group within an organization, employee level or individual employees. For example, a policy may specify that only executives at a specified level or higher may remove classified documents from a building. As another example, a policy may specify that only users who are members of a particular team or project may remove from the building information associated with a particular project.

The policies managed by policy manager 112 may be reflected in policy data that is managed by policy manager 112. The policy data may be stored in any type of database or data files, either local to policy manager 112 or remotely at a location separate from policy manager 112. Policy manager 112 may provide an administrative user interface to allow administrative personnel to create, edit and delete policy data. Policy data may be created at another location and then stored on policy manager 112.

FIG. 6A is an example policy data table 600 maintained by policy manager 112. The policy data contained in policy data table 600 is associated with authorization levels and may represent a default document non-download policy. Policy data table 600 includes three columns. The first column indicates an authorization level, the second column specifies the policy to be applied inside a building or company and the third column specifies a policy to be applied outside the building or company. The policy to be applied inside a building or company indicates attributes of information that is not allowed to be stored on mobile wireless devices inside a building or company (inclusive policy). The policy to be applied outside a building or company indicates attributes of information that may not be removed from the building or company on mobile wireless devices (exclusive policy). For Authorization Level 1, which may correspond to the highest level of executives in a business organization, for example, the CEO, CFO, CIO, COO and President, the policy data indicates that any information may be stored on mobile wireless devices within a building or company, but that information having the attribute of Level 0, which may correspond for example to Top Secret information, is not permitted to be removed from the building on a mobile wireless device. Users that correspond to Authorization Level 1 may store on mobile wireless devices within a building or company any information, but may not remove from the building or company on a mobile wireless device information that has a Level 0 attribute. For Authorization Level 2, which may correspond to the next highest level of executives in the business organization, for example, Vice Presidents, the policy data indicates that information having the attribute of Level 0 is not allowed to be stored on mobile wireless devices within a building or company. For Authorization Level 2, information having the attribute of Level 0 or Level 1 is not permitted to be removed from the building or company on a mobile wireless device. Thus, in this example, users that correspond to Authorization Level 2 may not store on mobile wireless devices within a building or company information that has the Level 0 attribute. Users that correspond to Authorization Level 2 may not remove from the building, on a mobile wireless device, information that has the Level 0 or Level 1 attribute. Thus, Authorization Level 2 is more restrictive than Authorization Level 1. At the lowest authorization level, all confidential information is prohibited from being stored on mobile wireless devices, either within or outside of a building or company. Thus, the lowest authorization level is the most restrictive policy.

Figure 6B:

Policy data may be associated with logical entities other than authorization levels. Examples of other logical entities include, without limitation, projects and groups. Policy data may also be associated with individual users. FIG. 6B is an example policy data table 650 maintained by policy manager 112 that includes policy data defined for projects, groups and users. The policy data contained in policy data table 650 may represent additional access permission policies that may be used instead of or in addition to the policies of policy data table 600. The policy data for Project A indicates that users that correspond to Project A may store on mobile wireless devices within a building or company information associated with Projects A, B, C and D. Users that correspond to Project A may however, only remove from the building or company on mobile wireless devices project information that corresponds to Project A. Information corresponding to other projects may not be removed from the building or company on mobile wireless devices. Thus, unlike the policy data in policy data table 600 that specifies information that cannot be removed from buildings or companies on mobile wireless devices, the policy data in policy data table 650 specifies information that can be removed from the building or company on mobile wireless devices. Other types of information, such as public information, may also be removed from the buildings or companies on mobile wireless devices.

Groups are not limited to executive levels or projects within a business organization. For example, policy data may be established for social groups, such as social networking groups. Suppose that a various groups are established within a social network. For Group E, the policy data in policy data table 650 indicates that group information that has attributes of Groups E, G or X may be stored on mobile wireless devices within the building or company, but only group information associated with Group E may be removed from the building or company on mobile wireless devices. Thus, users associated with Group E may store on mobile wireless devices information corresponding to Groups E, G or X within the building or company, but may only remove from the building on mobile wireless devices group information that has the attributes of Group E. Other types of information, such as public information, may also be removed from the buildings or companies on mobile wireless devices.

Policy data may also be defined for individual users. In policy data table 650, the policy data for User 1 indicates that information that has the attributes of Projects A or D may be stored on mobile wireless devices within the building or company. However, only project information associated with Project A may be removed from the building or company on mobile wireless devices. The policy data for User 2 indicates that information that has the attributes of Groups E or X may be stored on mobile wireless devices within the building or project, but only project information associated with Group E may be removed from the building or company on mobile wireless devices. Other types of information, such as public information, may also be removed from the buildings or companies on mobile wireless devices. Thus, policy data may define the kinds of information that may be removed from a building on mobile wireless devices.

Users may be either directly or indirectly assigned to one or more authorization levels, projects, groups, etc. For example, a user may be directly assigned to a particular authorization level. As another example, a user may be associated with a group that is assigned to a particular authorization level. All the members of the group are therefore indirectly assigned to the particular authorization level.

Policy data may also specify download and processing restrictions for data downloaded to client devices based upon attributes of the downloaded data. The download and processing restrictions may vary widely depending upon a particular implementation. Example download and processing restrictions include, without limitation, allowing only data of one or more specified formats, e.g., a non-editable format, to be downloaded to the particular client device and restrictions on the types of operations that may be performed with respect to data downloaded to a client device. Example restrictions on the types of operations that may be performed with respect to a particular electronic document downloaded to a client device include, without limitation, allowing only the display of the particular electronic document at the client device, not allowing a copy of the particular electronic document to be stored at the client device, allowing a copy of the particular electronic document to be stored at the client device only in accordance with an authorization level, not allowing a copy of the particular electronic document to be forwarded from the client device to another device or allowing a copy of the particular electronic document to be forwarded from the client device to another device only in accordance with an authorization level. The download and processing restrictions may also specify that data is to be deleted from a client device after being displayed at a client device.

The data attributes upon with the download and processing restrictions are based may include a wide variety of data attributes that may vary depending upon a particular implementation. Example data attributes include, without limitation, data type, data format and data classification or level. FIG. 6C is an example policy data table 670 maintained by policy manager 112 that includes policy data defined for particular data attribute values. In this example, the policy data specifies download and processing restrictions for data downloaded to client devices. The particular policy, and corresponding download and processing restrictions, may vary depending upon the attributes of the data being provided to a client device. In the present example, the data attribute value corresponds to a classification of the corresponding data as belonging to one of "Top Secret," "Level 0," "Level 1," or a "Level 2" classification. In some situations, data may have data attributes that correspond to multiple classifications and therefore multiple download and processing restriction policies, but for purposes of explanation, examples are described herein in the context of data having data attributes that correspond to a single classification.

The policy data in policy data table 670 for the "Top Secret" data attribute value specifies download and processing restrictions that include "No Data Download, Display Only, No Image Copy of Display at Device." As indicated in policy data table 670, the download and processing restrictions for the data attribute value "Top Secret" are more restrictive than the download and processing restrictions for the data attribute values "Level 0," "Level 1," or "Level 2", with the download and processing restrictions for the data attribute value "Level 2" being the least restrictive. The attribute data may be maintained by device management system 102, for example by document manager 116. For example, a data attribute value may be maintained by document manager 116 for each electronic document. Data attribute values may also correspond to logical groups, e.g., file types. In this situation, data of a specified file type is indirectly associated with a data attribute value and the corresponding download and processing restrictions. The use of policy data to apply download and processing restrictions to data downloaded to client devices is described in more detail hereinafter.

Personnel information manager 114 maintains information about users. Examples of information maintained by personnel information manager 114 include, without limitation, identification information for users, including biometric information, employment, membership and classification information and authorization levels. For example, for a particular employee of a particular business organization, the personnel information manager 114 may maintain information that indicates the particular employee's name, personal information including biometric information, position, title, employment level within the particular organization, employee groups and projects associated with the particular employee and one or more authorization levels associated with the particular employee.

Document manager 116 manages the storage of and access to information. This includes maintaining and rendering inaccessible information in accordance with information retention policies maintained by policy manager 112. This also includes controlling access to information based upon access policies maintained by policy manager 112.

Device manager 118 manages mobile wireless devices 106, 108, including tracking the location of mobile wireless devices 106, 108 and causing information on mobile wireless devices 106, 108 to be rendered inaccessible, as described in more detail hereinafter.

D. Corporate Communication and Scheduling System

Corporate communication and scheduling system 120 is configured to manage communications and scheduling data, such as electronic mail (email), calendaring, contact information, task information, and other related data, for one or more users. In addition or alternatively, email for the one or more users may be processed and managed by a Simple Mail Transfer Protocol (SMTP) server or other email server separate from the corporate communication and scheduling system 120. In one embodiment, corporate communication and scheduling system 120 is managed and maintained within a corporate environment, such as an enterprise network. Alternatively, corporate communication and scheduling system 120 may be implemented as a network service, such as a cloud application, external to the corporate environment on which corporate communication and scheduling system 120 is deployed.

Figure 32:
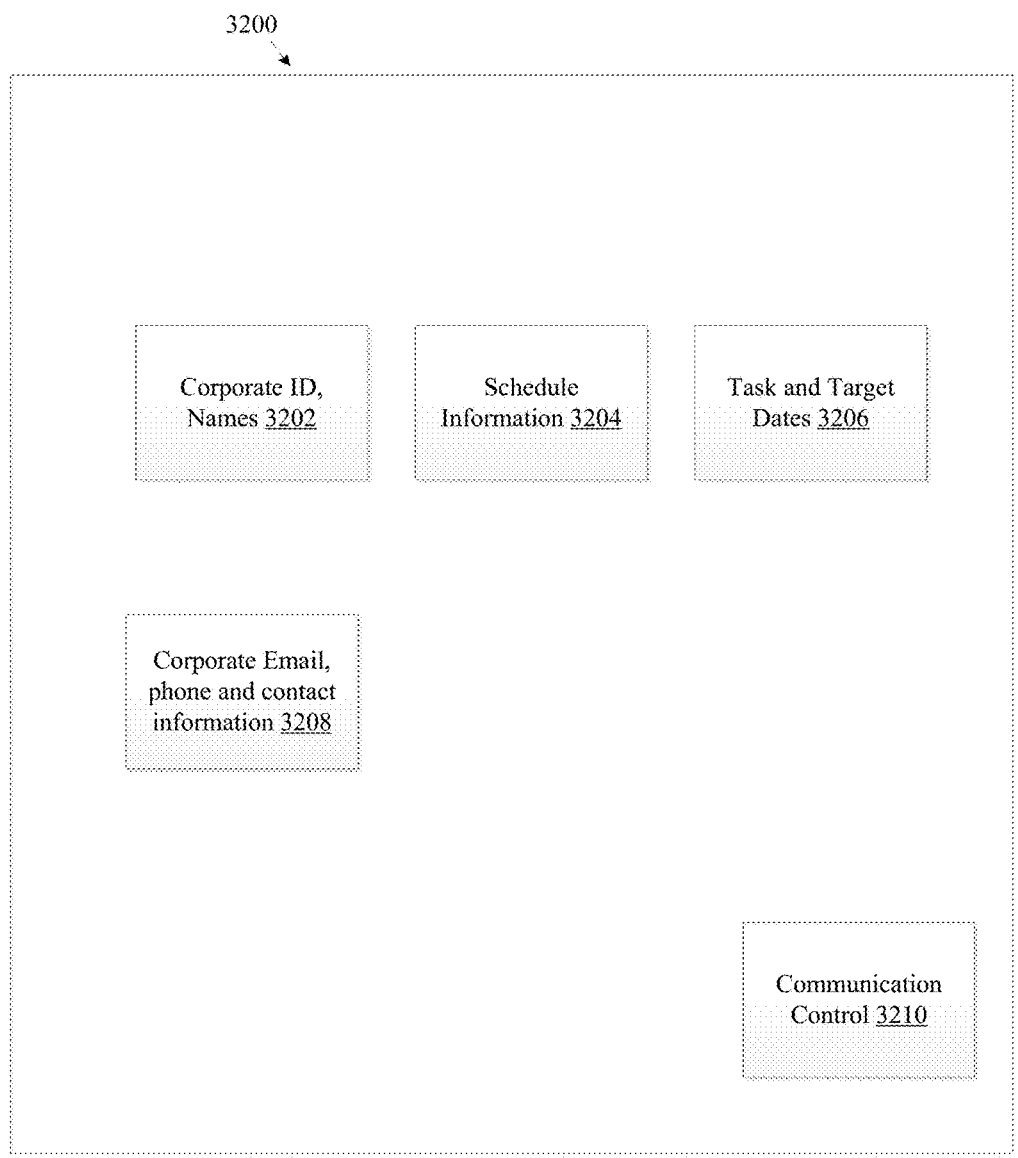
FIG. 32 is a block diagram that depicts an example corporate communication and scheduling system.

FIG. 32 is a block diagram that depicts an example corporate communication and scheduling system. Corporate communication and scheduling system 3200 includes logic to manage corporate ID names 3202, schedule information 3204, task and target dates 3206, corporate email, phone, and contact information 3208, and communication control 3210. Corporate ID names 3202 may generally comprise any data that identifies one or more users for which corporate communication and scheduling system 3200 manages data. Example corporate ID names may include without limitation legal names, employee identification numbers, and/or usernames. The corporate ID names 3202 may be linked or otherwise associated with schedule information 3204, task and target dates 3206, corporate email, phone, and contact information 3208, and/or communication control 3210. Accordingly, corporate communication and scheduling system 3200 may manage schedule information 3204, task and target dates 3206, corporate email, phone, and contact information 3208, and communication control 3210 on a per user basis. Schedule information 3204 may generally comprise any data that identifies a schedule for one or more users. For example, schedule information 3204 may include without limitation the date and time of a meeting, the duration of a meeting, the location of a meeting, and the participants of a meeting. Task and target dates 3206 may generally comprise any data that identifies tasks for one or more users. For example, task and target dates 3206 may include without limitation a description of the task, the target date for the task to be completed, a flag to indicate whether the task has been completed. Communication control 3210 may comprise any mechanism to process incoming and outgoing communications for one or more users. Examples include, without limitation, email, phone, voicemail, voice over internet protocol (VoIP), and instant messaging systems.

E. Meeting System

Meeting system 122 is configured to organize and process meeting information for one or more users. In one embodiment, meeting system 122 coordinates pre-meeting arrangement processing, meeting-session processing (i.e., processing during the meeting) and post-meeting processing. For example, meeting system 122 may receive and process outline data, decision items, and action items as discussed in further detail below. Meeting system 122 may also generate meeting record data, such a meeting minutes, to summarize the details of a meeting. Meeting system 122 may coordinate meeting scheduling and other processing by exchanging information with corporate communication and scheduling system 120. For example, meeting system 122 may retrieve scheduling information for one or more users from corporate communication and scheduling system 120 and send meeting record data, action items, and other data for management by corporate communication and scheduling system 120. Meeting system 122 also coordinates with device manager 118 to exchange the meeting information with a web-based or other meeting application to cause display of meeting information, such as outline data, decision items, and action items, before, during, or after a meeting takes place. The web-based meeting application may have a similar software structure as meeting support system 1700 and meeting session management system 1720, which are described in further detail below. In an alternative embodiment, the meeting related functionality of the device manager 118 (e.g., meeting support system 1700 and meeting session management system 1720) may be implemented by meeting system 122.

III. Mobile Wireless Device Power on and Registration

FIG. 7 is a flow diagram 700 that depicts an approach for powering on and registering a mobile wireless device, according to one embodiment. In step 702, a mobile wireless device is powered on. For example, a user powers on mobile wireless device 106 by selecting a power switch on the mobile wireless device 106. In step 704, the mobile wireless device established communications with the device management system. For example, the mobile wireless device 106 may have previously communicated with device management system 102 and uses the settings and information from the previous communication to reestablish communications with the device management system 102. Alternatively, if the mobile wireless device 106 has not previously communicated with the device management system 102, the mobile wireless device 106 may use a network discovery approach to discover the device management system 102. According to one embodiment, the mobile wireless device 106 establishes communications with device manager 118.

In step 706, the mobile wireless device requests biometric information from the user. For example, referring to FIG. 2, the mobile wireless device 200 displays a message on the screen/touchpad 208 requesting that the user provide biometric information via the biometric input 210, e.g., by the user placing a finger or thumb on the biometric input 210. In step 708, a determination is made whether the user is registered with the device management system 102. This may include, for example, the mobile wireless device 106 transmitting the biometric information to the device manager 118, which consults personnel information manager 114 to determine whether the user is registered with the device management system 102. If in step 708 the user is determined to not be registered, then the process terminates in step 710. This may include deleting information or rendering information inaccessible and powering down the mobile wireless device 106.

If, in step 708, the user is determined to be registered, then in step 712, a determination is made whether the user is the registered owner of the mobile wireless device 106. This may be determined by the device manager 118 alone, or in conjunction with other elements of the device management system 102, such as the personnel information manager 114. If, in step 712, the user is determined to be the registered owner of the mobile wireless device 106, then in step 714, the user is granted access to the mobile wireless device 106, which may include, for example, displaying a main menu page on screen/touchpad 208.

If, in step 712, the user is determined to not be the registered owner of the mobile wireless device 106, then in step 716 a determination is made whether the ownership can be changed. The mobile wireless device 106 may be configured to not allow a remote change in ownership. For example, for added security, the ownership of some mobile wireless devices can only be changed when the mobile wireless device is connected via a wired connection. The mobile wireless device 106 may communicate with the device manager 118 to determine whether the ownership can be changed remotely. If not, then the process is terminated in step 710 as previously described herein. If the ownership can be changed remotely, then the ownership is changed in step 718. This may include, for example, the mobile wireless device 106 communicating with the device management system 102 to perform user and device authentication and registrations. The process of changing the registered owner of the mobile wireless device 106 may also include rendering inaccessible content on mobile wireless device 106, for example content associated with the prior registered owner of the mobile wireless device 106. The new registered owner is then granted access to the mobile wireless device 106, which may include, for example, displaying a main menu page on screen/touchpad 208.

IV. Managing Information on Mobile Wireless Devices

Figure 8:
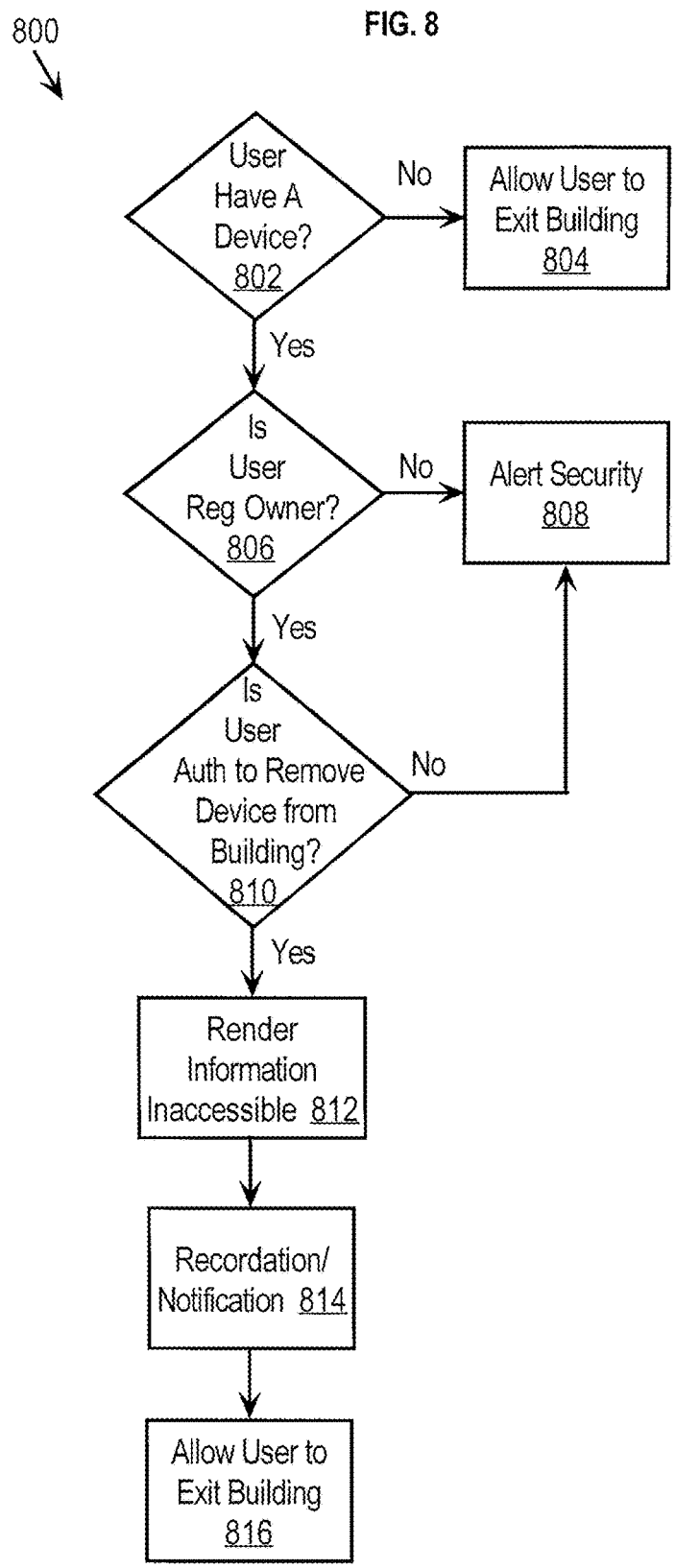
FIG. 8 is a flow diagram that depicts an approach for managing information on mobile wireless devices.

FIG. 8 is a flow diagram 800 that depicts an approach for managing information on mobile wireless devices, according to one embodiment. In this approach, it is presumed that an exit system detects that a user has requested to exit a building. For example, as previously described herein with respect to FIG. 5, a user 506 may manually enter into scanner/sensor 504 information that uniquely identifies the user 506 or the user 506 may present an identification card that is scanned by scanner/sensor 504 to automatically extract from the identification card information that identifies the user. As another alternative, RFID tags or other similar technology may be used that allows the scanner/sensor 504 to extract the identification information from the identification card without the user 506 having to actively present the identification card to the scanner/sensor 504.

In step 802, a determination is made whether the user has a mobile wireless device. For example, the exit system may detect that a particular mobile wireless device is in the proximity of the user. As previously described with respect to FIG. 5, this may be accomplished in several ways, including using information transmitted by the mobile wireless device 506, such as position information, or by determining the location of the mobile wireless device 506 based upon communications between the mobile wireless device 506 and wireless access points or cellular base stations, or through the use of RFID tags or similar technology.

If, in step 802, a determination is made that the user does not have a mobile wireless device, then in step 804, the user is allowed to exit the building. If, in step 802, a determination is made that the user does have a mobile wireless device, then in step 806, a determination is made whether the user is the registered owner of the mobile wireless device. This may be accomplished, for example, by the exit system 104 sending user identification information or user biometric information and device identification information that identifies the mobile wireless device 106, for example a MAC address or other identifying information, to the device management system 102, which determines whether the user is the registered owner of the mobile wireless device 106. For example, the exit system 104 may provide the user identification information or the user biometric information and the device identification information to the device manager 118, which in turn makes a request to the personnel information manager 114. The personnel information manager 114 determines whether the user associated with the user identification information or the user biometric information is the registered owner of the mobile wireless device 106 and provides a response to the device manager 118. The device manager 118 may also maintain the information necessary to determine whether the user is the registered owner of the mobile wireless device 106. Alternatively, the exit system 104 may contact the personnel information manager 114 directly to determine whether the user is the registered owner of the mobile wireless device 106.

Figure 9:
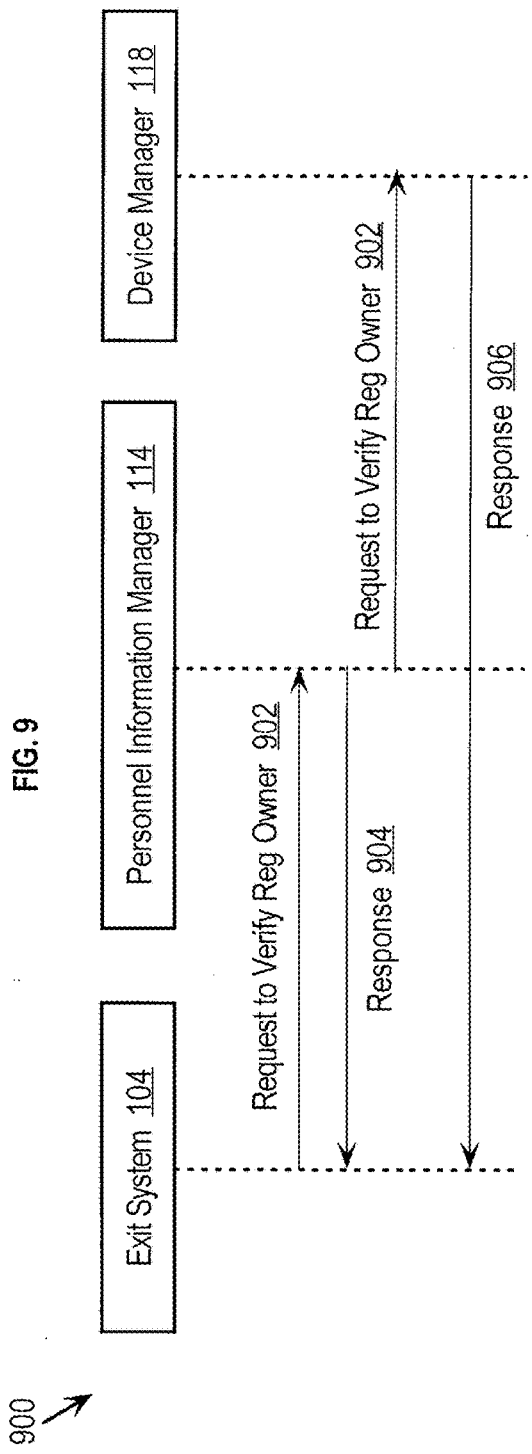
FIG. 9 is a message ladder diagram that depicts example message interactions between an exit system, a personnel information manager and a device manager to determine whether the user is the registered owner of the mobile wireless device.

FIG. 9 is a message ladder diagram 900 that depicts example message interactions between the exit system 104, the personnel information manager 114 and the device manager 118 to determine whether the user is the registered owner of the mobile wireless device 106. The exit system 104 sends to the personnel information manager 114 a request 902 to verify whether a user is the registered owner of the mobile wireless device 106. The request 902 may include, for example, user identification information or the user biometric information and device identification information, for example a MAC address, for the mobile wireless device 106.

The personnel information manager 114 uses the information contained in the request to determine whether the user is the registered owner of the mobile wireless device 106. The personnel information manager 114 then generates and transmits to the exit system 104 a response 904 indicating whether the user is the registered owner of the mobile wireless device 106. Alternatively, the personnel information manager 114 may provide a request 902 to the device manager 118, which may be the original request that is forwarded, or a new request generated by the personnel information manager 114. The device manager 118 processes the request and generates and transmits to the personnel information manager 114 a response 906 indicating whether the user is the registered owner of the mobile wireless device 106. The personnel information manager 114 forwards the response to the exit system 104. The device manager 118 may also provide the response 906 directly to the exit system 104.

If, in step 806, a determination is made that the user is not the registered owner of the mobile wireless device, then in step 808, an alert is generated and transmitted to security or some other entity, such as administrative personnel. The alert may also be logged into device management system 102. If, in step 806, a determination is made that the user is the registered owner of the mobile wireless device, then in step 810, a determination is made whether the user is authorized to remove the mobile wireless device 106 from the building. For example, exit system 104 may communicate with personnel information manager 114 to inquire whether the user of mobile wireless device 106 is authorized to remove the mobile wireless device 106 from the building. This may include, for example, the personnel information manager 114 consulting with policy manager 112 to determine whether the user has privileges to remove the mobile wireless device 106 from the building.

Figure 10:
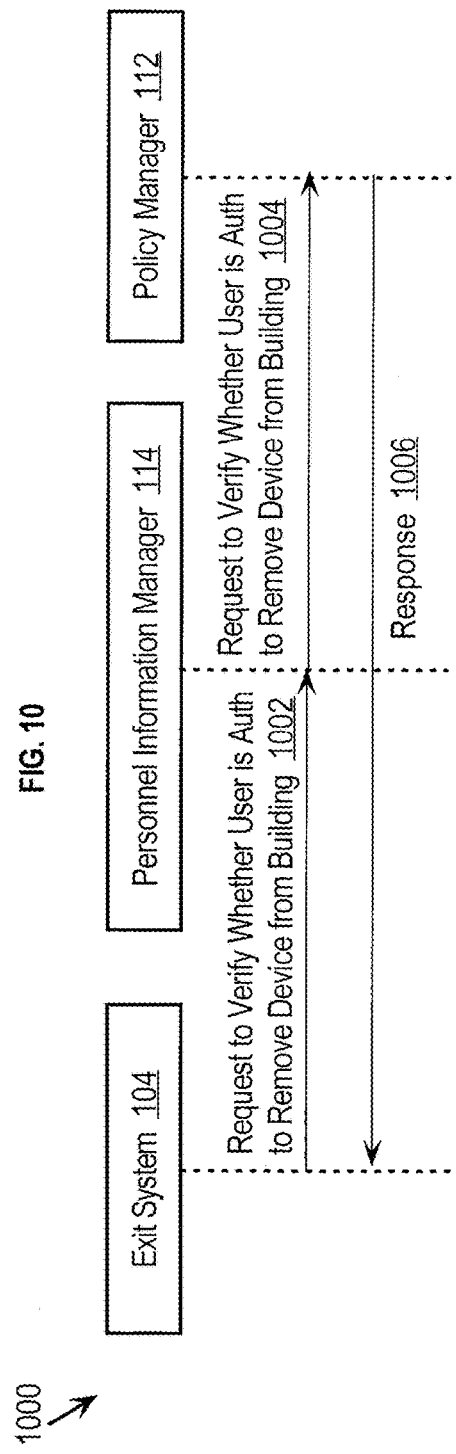
FIG. 10 is a message ladder diagram that depicts example message interactions between an exit system, a personnel information manager and a policy manager to determine whether the user is authorized to remove a mobile wireless device from the building.

FIG. 10 is a message ladder diagram 1000 that depicts example message interactions between the exit system 104, the personnel information manager 114 and the policy manager 112 to determine whether the user is authorized to remove the mobile wireless device 106 from the building. The exit system 104 sends to the personnel information manager 114 a request 1002 to verify whether the user is authorized to remove the mobile wireless device 106 from the building. The request 1002 may include, for example, user identification information or the user biometric information. The request 1002 may also include device identification information, for example a MAC address, for the mobile wireless device 106. Thus, the request may be made and verified with respect to a particular user, or with respect to a particular user and a particular device.

The personnel information manager 114 uses the user identification information or the user biometric information contained in the request to determine the status of the user. The status may indicate, for example, the position, title, employment level within the particular organization, employee groups, projects or authorization levels associated with the user. The personnel information manager 114 then sends to the policy manager 112 a request 1004 to determine whether the user is authorized to remove the mobile wireless device 106 from the building. The request 1004 includes the status information for the user to enable the policy manager 112 to apply the appropriate one or more policies that apply to the user. The request 1004 may be a modified version of request 1002, with the added status information, or request 1004 may be a new request generated by the personnel information manager 114. The policy manager 112 then generates and transmits to the exit system 104, either directly or via personnel information manager 114, a response 1006 indicating whether the user is authorized to remove the mobile wireless device 106 from the building.

If, in step 810, a determination is made the user is not authorized to remove the mobile wireless device 106 from the building, then in step 808, an alert is generated and transmitted to security or some other entity, such as administrative personnel. The alert may also be logged into device management system 102. If, in step 810, a determination is made that the user is authorized to remove the mobile wireless device 106 from the building, then in step 812, information that is not authorized to be removed from the building on mobile wireless devices is rendered inaccessible. The device management system 102 determines, based upon policy data that specifies attributes of information that should not be removed from the building on mobile wireless devices, information on the mobile wireless device 106 that is to be rendered inaccessible. This determination may use policy data that is specific to the registered user of the mobile wireless device. For example, the device manager 118 may first consult the personnel information manager 114 to determine the status of the user. The status may indicate, for example, the position, title, employment level within the particular organization, employee groups, projects or authorization levels associated with the user. The device manager 118 then consults the policy manager 112 to request one or more policies that apply to the user based upon the user's status. The device manager may then provide to the document manager 116 data that indicates the one or more policies that apply to the user and request data that indicates the information on the mobile wireless device that is to be rendered inaccessible based upon the one or more policies. The document manager 116 determines, based upon the one or more policies that apply to the user, the information on the mobile wireless device 106 that is to be rendered inaccessible. The document manager 116 may maintain data that indicates the information that is currently stored on the mobile wireless device 106. Alternatively, the document manager 116 may communicate with the mobile wireless device 106 to request the information that is currently stored on the mobile wireless device 106. As another alternative, the device manager 118 may communicate with the mobile wireless device 106 to request the information that is currently stored on the mobile wireless device 106. The document manager 116 then applies the one or more policies to determine the information on the mobile wireless device 106 that is to be rendered inaccessible. For example, suppose that the user is associated with authorization level 2. This may be assigned to the user based upon the user's position within a business organization. The document manager 116 determines that a particular electronic document having an assigned level of Level 1 is stored on the mobile wireless device 106. The document manager 116 indicates to device manager 118 that the particular electronic document on the mobile wireless device 106 is to be rendered inaccessible. The information on the mobile wireless device 106 that satisfies the one or more policies for the user is rendered inaccessible. Continuing with the prior example, the device management system 102 causes the particular electronic document to be deleted, encrypted, re-encrypted or otherwise rendered inaccessible. According to one embodiment, the device manager 118 causes information on the mobile wireless device 106 to be rendered inaccessible by signaling the mobile wireless device 106. The signal may indicate the particular action to be performed with respect to the information, for example, whether the information is to be deleted, encrypted, re-encrypted or otherwise rendered inaccessible.

Figure 11:
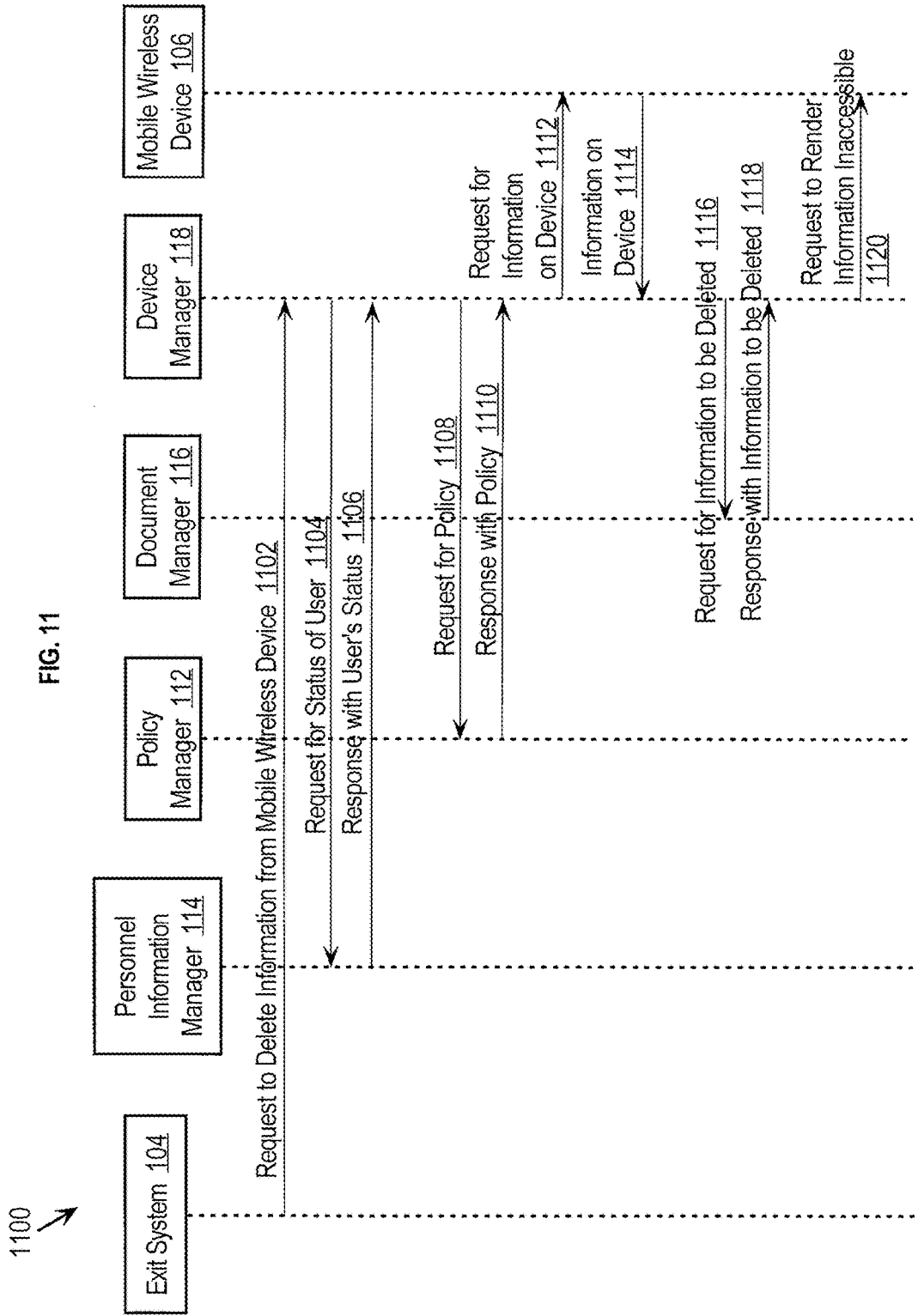
FIG. 11 is a message ladder diagram that depicts example message interactions between an exit system, a personnel information manager, a policy manager, a document manager and a device manager to cause the deletion from a mobile wireless device of information that is not authorized to be removed from a building on mobile wireless devices.

FIG. 11 is a message ladder diagram 1100 that depicts example message interactions between the exit system 104, the personnel information manager 114, the policy manager 112, the document manager 116 and the device manager 118 to cause information that is not authorized to be removed from the building on mobile wireless devices to be rendered inaccessible. The exit system 104 issues a request 1102 to the device manager 118 to render inaccessible information on the mobile wireless device 106 that is not authorized to be removed from the building on the mobile wireless device 106. The device manager 118 issues to the personnel information manager 114 a request 1104 for the status of the user and the personnel information manager 114 provides to the device manager 118 a response 1106 that includes the user's status. The device manager 118 issues to the policy manager 112 a request 1108 for a policy to be applied for the particular user and the policy manager 112 provides to the device manager 118 a response 1110 that includes the user's status.

The device manager 118 then issues to the mobile wireless device 106 a request 1112 for information that is currently stored on the mobile wireless device 106. The mobile wireless device generates and provides to the device manager 118 a response 1114 that indicates the information currently stored on the mobile wireless device. In situations where the document manager 116 tracks the information stored on mobile wireless devices, the request may be made to the document manager 116 instead of the mobile wireless device 106.

The device manager 118 then generates and sends to the document manager 116 a request 1116 for information on the mobile wireless device 106 to be rendered inaccessible. The request 1116 may include data that identifies the information stored on the mobile wireless device 106 and data that identifies the one or more policies to be applied to the information. The request may identify the one or more policies by name, code or some other identifying information. The document manager 116 applies the one or more policies to the information stored on the mobile wireless device 106 to determine information on the mobile wireless device 106 that is to be rendered inaccessible. For example, referring to FIG. 6, suppose that a determination is made by the policy manager 112 that Executive Level 2 policy applies to the user and that the mobile wireless device 106 includes particular information that has an attribute of top secret. The response 1118 identifies the particular information. The device manager 118 generates and issues to the mobile wireless device 106 a request or command 1120 to render inaccessible the particular information from the mobile wireless device and the mobile wireless device renders the particular information inaccessible. This may include, for example, deleting the particular information, encrypting the particular information, re-encrypting the particular information or otherwise rendering inaccessible the particular information.

Returning to FIG. 8, after the information on the mobile wireless device 106 has been rendered inaccessible, in step 814, a recordation and/or notification may be made to record that the information on the mobile wireless device 106 was rendered inaccessible. The device manager 118 may generate a record that indicates the information on the mobile wireless device 106 that was rendered inaccessible. Other information may also be recorded, for example, data that identifies the user and the last known location of the mobile wireless device 106. The device manager 118 may also generate and transmit a notification, for example to an administrator, that the information on the mobile wireless device 106 has been rendered inaccessible. In step 816, the user is allowed to exit the building.

Variations of the aforementioned approach may also be used. For example, in situations where the device management system 102 tracks the information stored on mobile wireless devices 106, 108, then there is no need for the device management system 102 to query the mobile wireless devices 106, 108 to obtain data that identifies the information currently stored on mobile wireless device 106, 108. For example, document manager 116 may track information stored on the mobile wireless devices 106, 108. Instead, when the exit system 104 issue a request to render inaccessible information on a particular mobile wireless device that should not be removed from the building on the particular mobile wireless device, the device management system 102 determines the information on the particular mobile wireless device that is to be rendered inaccessible and instructs the particular mobile wireless device to render the information inaccessible.

As another example, in some situations the determination of whether the user is the registered owner is not used. For example, in business organizations with a small number of employees, or other situations where unauthorized use of devices is not a concern, being a registered owner may not be required to remove a mobile wireless device from a building. Similarly, verification that a user is authorized to remove a mobile wireless device from a building, e.g., in step 810, may also not be used.

V. Low Power Considerations

In the various embodiments described herein, it is presumed that the mobile wireless device on which the information is rendered inaccessible has sufficient power to operate and respond to signals from the device management system 102 to render the information inaccessible. If signals emitted from a mobile wireless device are relied upon to determine the proximity of the mobile wireless device with respect to an exit of a building, then there is a risk that if the power level of the mobile wireless device is sufficiently low so that the mobile wireless device no longer transmits its location, the mobile wireless device may be removed from a building with information that should not be removed from the building on mobile wireless devices and that has not been rendered inaccessible. The use of other location methods that do not rely upon transmissions from mobile wireless devices can prevent this from occurring. For example, RFID technology does not require the mobile wireless device to actively transmit location information and the mobile wireless device does not have to be in a powered on state. This would prevent unauthorized users from removing mobile wireless devices from buildings, but would not prevent authorized users from removing from the building information that should not be removed from the building on mobile wireless devices.

According to one embodiment, when the power level, e.g., battery level, of a mobile wireless device falls below a specified threshold, one or more actions are taken to prevent information stored on the mobile wireless device from being removed from the building on the mobile wireless device in a usable state. This approach may be used irrespective of the location of the mobile wireless device. The approach may also be implemented for mobile wireless devices that are powered down, before the mobile wireless devices are completely powered off. One example of an action that may be performed in this situation is the deletion, from the mobile wireless device, of information that is not authorized to be removed from the building on mobile wireless devices, as previously described herein. While effective in preventing information from being removed from a building on mobile wireless devices that are in a low power state or are powered off, this approach may have the undesirable consequence of deleting information from mobile wireless devices where the users had no intention of leaving the building, and thus may present an inconvenience to users.

Another example of an action that may be performed in this situation is to encrypt, or re-encrypt, information stored on the mobile wireless device. For example, suppose that it is determined that the power level of a particular mobile wireless device has dropped below a specified threshold, or that the particular mobile wireless device is being powered down. Information that is not supposed to be removed from the building on mobile wireless devices may be encrypted, instead of deleted from the mobile wireless device. For example the device management system 102 may generate an encryption key and transmit the encryption key to the particular mobile wireless device with an instruction to encrypt specified information with the encryption key. This prevents the removal, from a building on a mobile wireless device, information in a usable state that is not intended to be removed from the building on a mobile wireless device. While encryption does not guarantee that a skilled third party cannot decrypt the information, this approach at least makes it more difficult for a third party to access the information.

Once the power level of the particular mobile wireless device has been restored, the device management system 102 may instruct the particular mobile wireless device to decrypt the information that was previously encrypted. Information that is already encrypted on mobile wireless devices may be re-encrypted using a different encryption key, or an additional encryption key if a layered encryption approach is used. This approach may be implemented transparent to the user to provide improved control over information stored on mobile wireless devices, without the inconvenience of deleting information when a user has no intention of removing the mobile wireless device from the building.

The aforementioned approaches for rendering inaccessible information on mobile wireless devices when the power level of a particular mobile wireless device has dropped below a specified threshold, or that the particular mobile wireless device is being powered down may also be applied if the wireless communication transmission capability of a mobile wireless device falls below a specified threshold. For example, if the transmission strength or quality of a communications link falls below a specified threshold, then information on the mobile wireless device may be rendered inaccessible as described herein.

VI. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, mobile computer systems, handheld devices, networking devices or any other device that incorporates hard-wired and/or program logic to implement the techniques.

Figure 12:
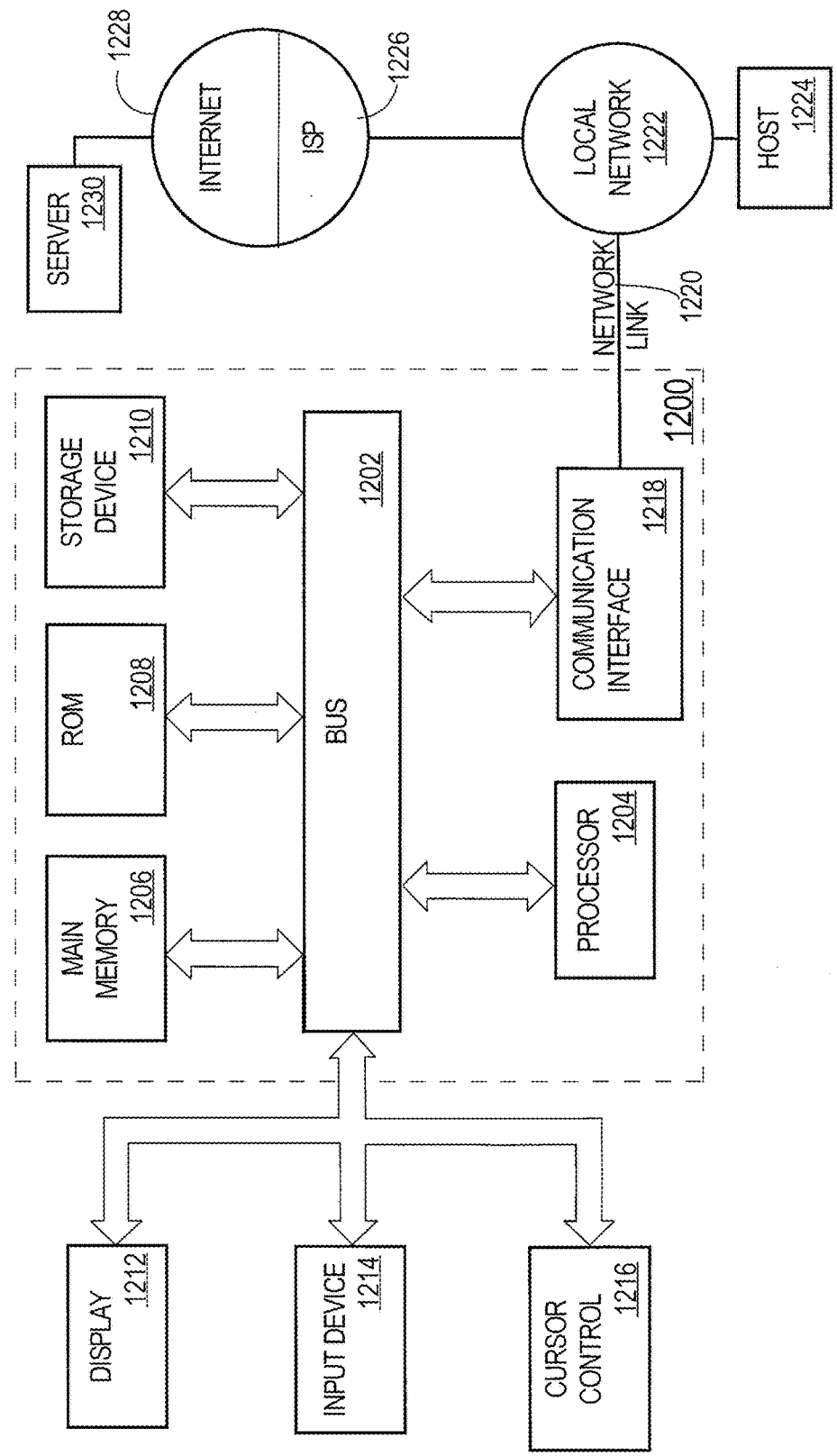
FIG. 12 is a block diagram of a computer system on which embodiments may be implemented.

FIG. 12 is a block diagram that depicts an example computer system 1200 upon which embodiments may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic or computer software which, in combination with the computer system, causes or programs computer system 1200 to be a special-purpose machine. According to one embodiment, those techniques are performed by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments are not limited to any specific combination of hardware circuitry and software.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of computer-readable storage media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. The received code may be executed by processor 1204 as it is received, and/or stored in storage device 1210, or other non-volatile storage for later execution.

VII. Meeting Management

Mobile wireless devices or other network devices as described herein may be used to arrange and manage electronic meetings between entities, such as individuals, groups and organizations. The communications used to establish and manage electronic meetings may be made using any type of network, which may vary depending upon a particular implementation. For example, mobile wireless devices may use cellular, IEEE 802.XX or any wireless means built in the devices. Since the mobile wireless devices and other network devices may be connected to the device management system 102, a user with a network device is able to access names, organizations and contact information of meeting participants to arrange the meeting. At the time of the electronic meeting, the device management system 102 connects the network devices of the meeting participants, if attending remotely, and may optionally connect the network devices of meeting participants that are physically present at the meeting.

A. Participant Authorization

According to one embodiment, authorization is performed during the process of arranging an electronic meeting. During the arrangement of a meeting (see FIGS. 18, 21A-21D, and 26 and the accompanying description), the device management system 102 determines whether the planned participants of a meeting are authorized to access documents and/or information that will be made available to meeting participants. If one or more of the planned participants are not authorized to access one or more documents and/or information that will be made available to meeting participants, the device management system 102 notifies the meeting organizer of this condition.

According to another embodiment, communications between mobile wireless devices and user input, including writing entered via a stylus, for mobile wireless devices are logged and log data is generated and stored in the device management system 102 to document the communications and user inputs. As described in more detail hereinafter, user input entered into a mobile wireless device is shared with other mobile wireless devices of participants in the electronic meeting.

Figure 13:
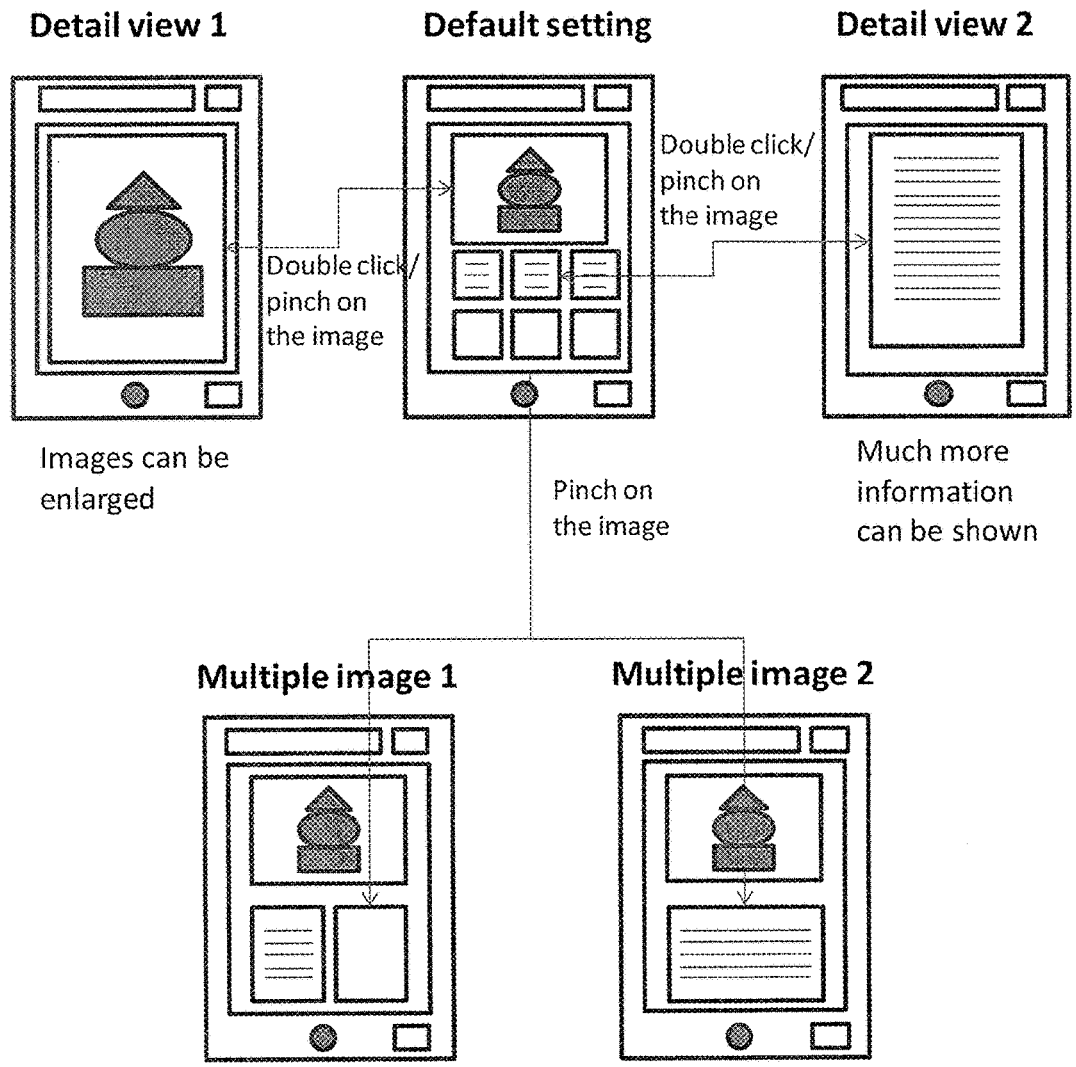
FIG. 13 depicts the use of a mobile wireless device to conduct an electronic meeting among participants.

FIG. 13 depicts the use of a mobile wireless device to conduct an electronic meeting among participants.

B. Sharing Information Among Mobile Wireless Devices

Figure 14:
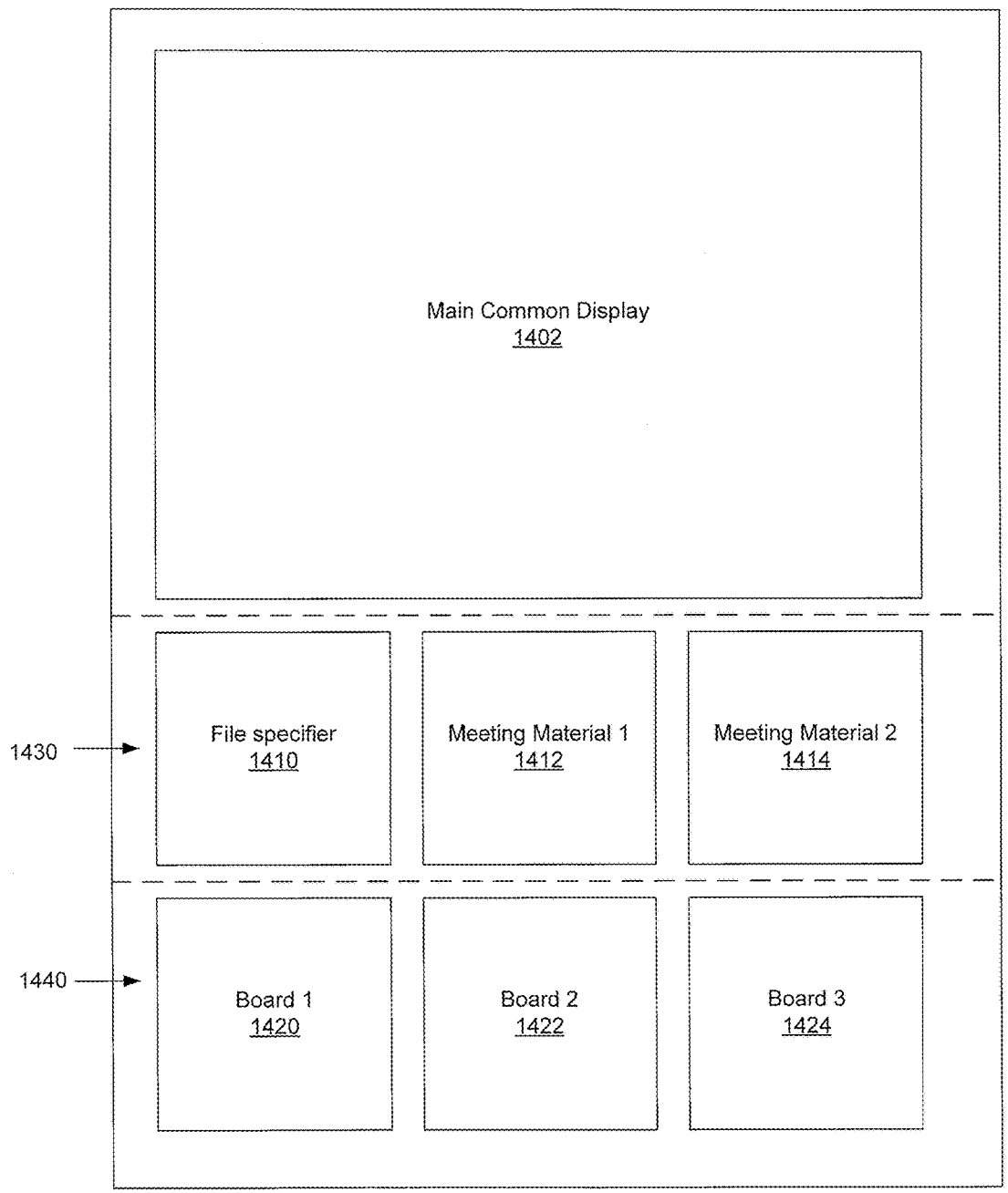
FIG. 14 depicts an example display for a mobile wireless device.

FIG. 14 depicts an example display for a mobile wireless device. The display includes a main common display area 1402, a middle display area 1430 and a bottom display area 1440. The main common display area 1402 is shared by all meeting attendees. As described in more detail hereinafter, the main common display area 1402 may be updated to reflect user input on other mobile wireless devices, creating a virtual whiteboard that is visible to all meeting participants. The middle display area 1430 holds a file specifier 1410 and selected files. File objects in the file specifier 1410 may be dragged to either main common display area 1402 or other locations within the middle display area 1430. The middle display area 1430 and a bottom display area 1440 support scrolling with, for example, a finger or stylus moving over the area. For example, file objects may be moved to the main common display area 1402 to be shared by the meeting attendees. In the present example, the bottom display area 1440 contains work areas referred to herein as "boards" and in the present example includes three boards, identified as Board 1 1420, Board 2 1422 and Board 3 1424. If needed, more boards can be added by selecting a next button (not depicted) in the bottom of the Board 4. Boards may be moved to the main common display area 1402 to share as a common white board.

Figure 15:
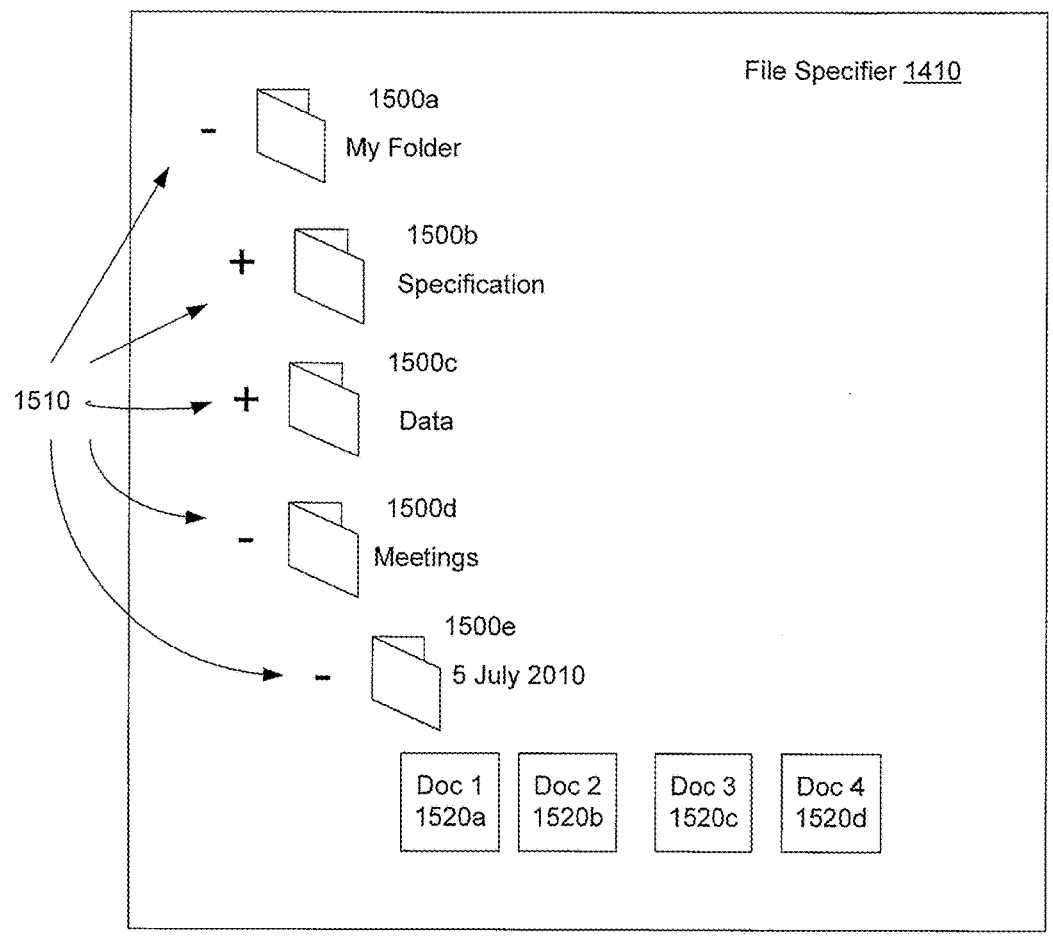
FIG. 15 depicts example contents of a file specifier.

FIG. 15 depicts example contents of file specifier 1410. GUI objects are provided for viewing the contents of folders containing sub-folders and documents. More specifically, "+" and "−" GUI objects 1510 are provided to expand and contract the folders 1500*a*-1500*e*. A folder named "My Folder" 1500*a* is a root folder for the stored documents. Other folders 1500*b*-1500*e* follow a regular tree structure. A folder named "5 Jul. 2010" contains the documents Doc 1 through Doc 4, identified by reference numerals 1520*a*-1520*d*, and are used in a meeting scheduled using mobile wireless devices. These folders and files may be created and managed by the user of the mobile wireless device.

Figure 16:
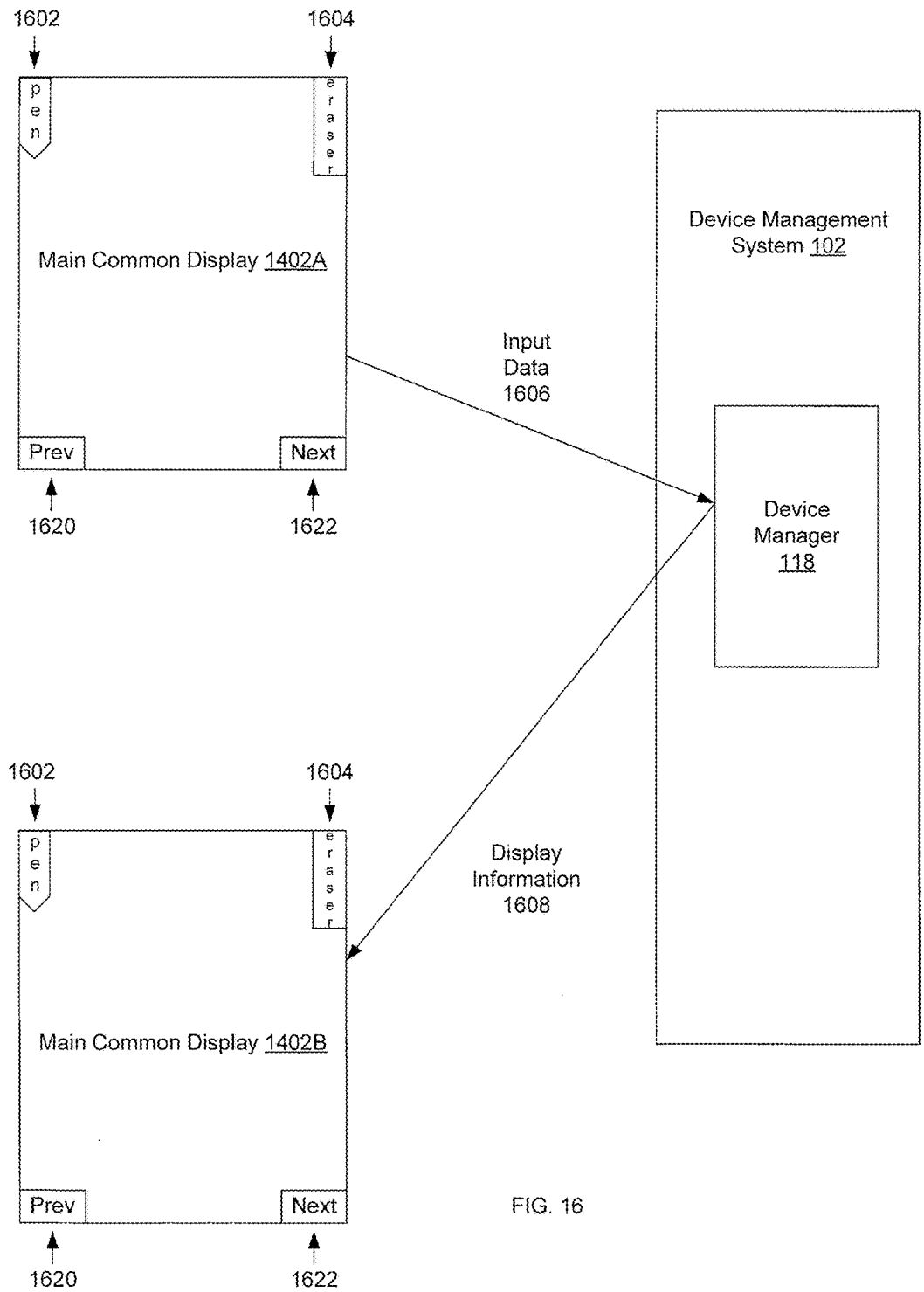
FIG. 16 depicts an example interaction between the main common display area of a mobile wireless device and a device management system as a user interacts with the main common display.

FIG. 16 depicts the sharing of information between mobile wireless devices participating in an electronic meeting. A main common display 1402A is displayed on a first mobile wireless device and a main common display 1402B is displayed on a second mobile wireless device. A user of the first mobile wireless device uses the stylus pen to select either a pen GUI object 1602 or an eraser GUI object 1604. Based upon whether the user selects the pen GUI object 1602 or the eraser GUI object 1604, the cursor in the display changes to pen or eraser, respectively. Previous (Prev) GUI object 1620 and Next GUI object 1622 allow a user to view the previous or next page or slide of a document. A user may use their finger or a stylus to scroll the display.

According to one embodiment, user input entered into the first mobile wireless device is securely shared among other mobile wireless devices participating in an electronic meeting, to allow other users to view the information. In response to detecting user input, the first mobile wireless device generates input data that represents the user input and securely transmits the input data 1606 to the device management system 102. The input data 1606 may be transmitted using any type of data format or communications format, depending upon a particular implementation. Device management system 102 securely transmits the input data 1606 to one or more mobile wireless devices participating in the electronic meeting. In the present example, device management system 102 transmits the input data 1606 as display information 1608 to the second mobile wireless device. The second mobile wireless device processes the display information 1608 and causes the display of the second mobile wireless device to reflect the display information 1608. This allows meeting participants to view a virtual whiteboard, which can greatly facilitate electronic meetings.

Figure 17:
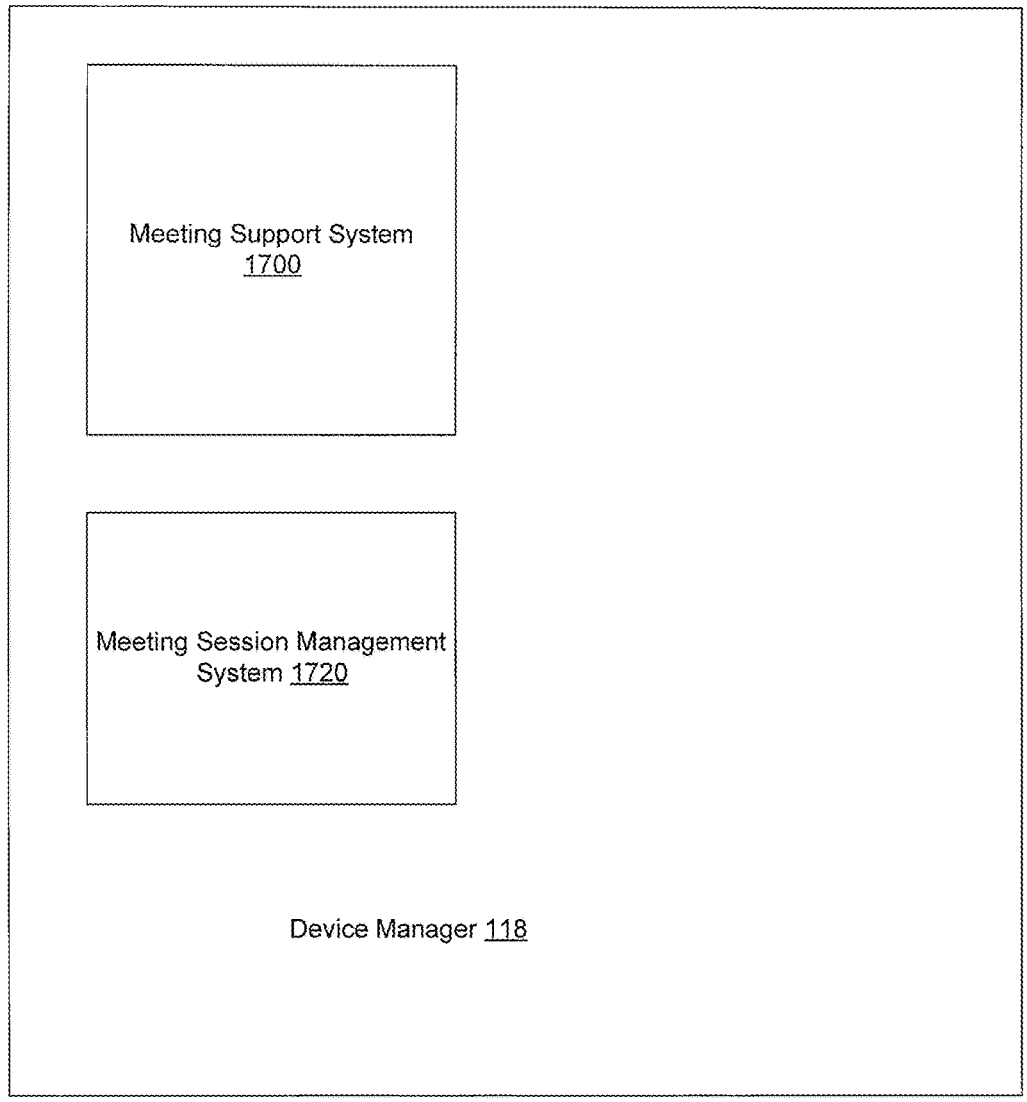
FIG. 17 depicts an example implementation of the device manager 118 for managing meetings on mobile wireless devices.
Figure 21D:
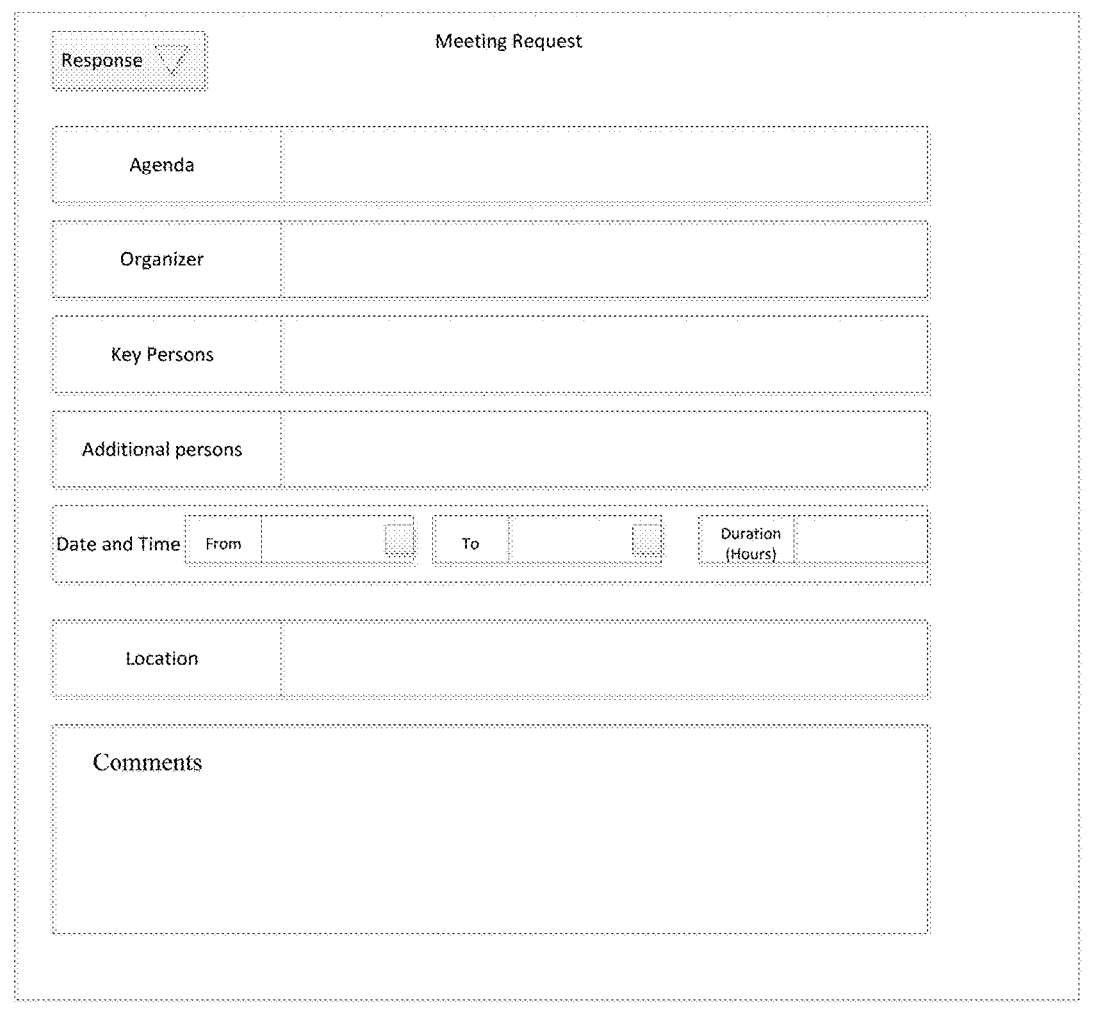

FIG. 17 depicts an example implementation of the device manager 118 for managing electronic meetings on mobile wireless devices. Device manager 118 includes a meeting support system 1700 and a meeting session management system 1720. The meeting support system 1700 supports the arrangement of electronic meetings using a meeting arrangement request form, a meeting option presentation, and a meeting request, as described in more detail hereinafter with respect to FIGS. 21A-D. A meeting organizer uses the meeting arrangement request form of FIG. 21A to request the arrangement of an electronic meeting. Then, the meeting support system 1700 presents meeting options such as those depicted in FIG. 21B. The organizer selects a meeting option, which causes a meeting request such as depicted in FIG. 21C to be displayed for the selected meeting option. The organizer uses the meeting request of FIG. 21C to invite attendees to attend a meeting corresponding to the selected meeting option. The invited attendees respond to organizer's meeting request using an invitation form such as that depicted in FIG. 21D. Meeting session management system 1720 coordinates the ongoing meeting session.

C. Arranging Meetings Among Mobile Wireless Devices

Figure 18:
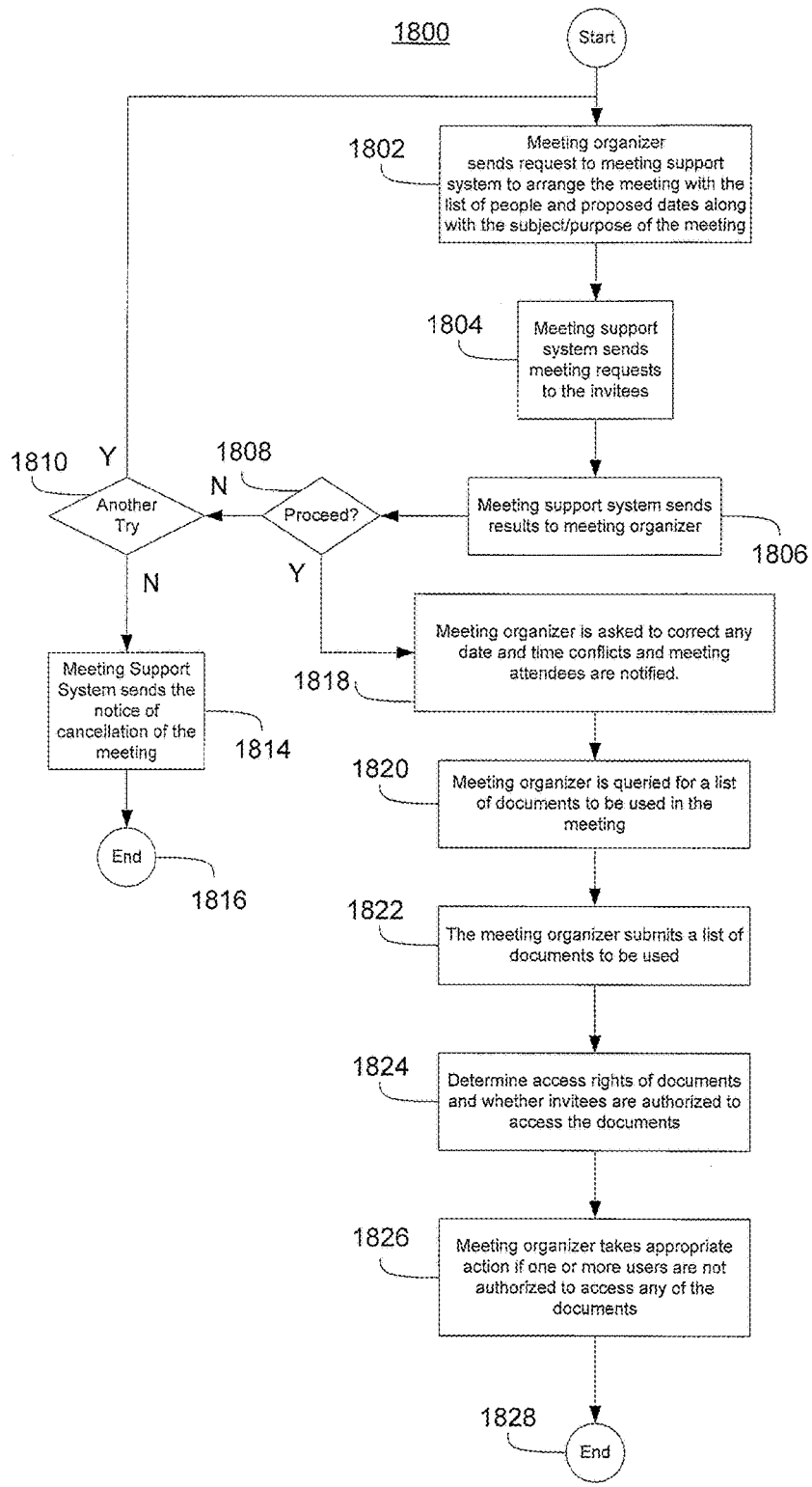
FIG. 18 is a flow diagram that depicts arranging an electronic meeting among mobile wireless devices using a meeting support system.

FIG. 18 is a flow diagram 1800 that depicts arranging an electronic meeting among mobile wireless devices using meeting support system 1700. In step 1802, the meeting organizer accesses the meeting arrangement request form of FIG. 21A to request an electronic meeting. For example, a user uses a mobile wireless device to access meeting support system 1700 and arrange a meeting, as discussed in further detail below in connection with FIGS. 21A-C In step 1804, a meeting request, such as depicted in FIG. 21D, is transmitted to each of the specified meeting attendees. For example, the meeting support system 1700 may generate and transmit an electronic meeting request to each of the meeting participants.

In step 1806, results of the meeting requests are transmitted to the meeting organizer. For example, the meeting support system 1700 transmits results of the meeting requests to the meeting organizer. In step 1808, the meeting organizer decides whether to proceed with the meeting, based upon the results. For example, the meeting organizer may decide to not conduct the electronic meeting if an insufficient number of attendees indicate that they will attend the electronic meeting. If the meeting organizer decides to not proceed with the electronic meeting, then in step 1810, a determination is made whether to arrange another electronic meeting. If so, then control returns to step 1802. If not, then in 1814, a meeting cancellation notice is transmitted and the process is complete in step 1816. For example, the meeting support system 1700 may transmit a meeting cancellation notice to all meeting invitees.

If, in step 1808, the meeting organizer decides to proceed with the electronic meeting, then in step 1818, the meeting organizer is asked to correct any conflicts in the proposed date and time of the electronic meeting. The meeting attendees are notified of the final date and time.

Once the date and time is fixed, the system notifies all the attendees about the electronic meeting and time in step 1818. In step 1820, the meeting organizer is queried for any documents to be included in or used in the electronic meeting. In step 1822, the meeting organizer submits a list of documents to be used in the electronic meeting. If there is no need for the document, the list will be empty. If the list is empty, the following steps shall be skipped to the end 1828. In step 1824, access rights of the documents are determined and a determination is made whether the meeting invitees are authorized to access the documents. For example, the meeting support system 1700 may determine the access rights of the documents specified by the meeting organizer by consulting other elements within the device management system 102. For example, the device management system 102 may consult the document manager 116 to determine one or more policies that apply to a document and then consult the policy manager 112 for details about the policy, for example, the access rights required to access the document. The meeting support system 1700 then determines whether the meeting invitees are authorized to access the documents. If one or more of the meeting invitees are not authorized to access any of the documents, then in step 1826, the meeting organizer is notified so that the meeting organizer may take appropriate action. For example, the meeting organizer may choose to not use one or more documents for which the meeting attendees do not have proper authorization to access. As another example, the meeting organizer may change the meeting attendees, e.g., by excluding from the meeting one or more users who are not authorized to access the documents. Alternatively, the meeting organizer may change the access rights required to access one or more of the documents and/or change the authorization of one or more of the users. The process is complete in step 1828.

Figure 19:
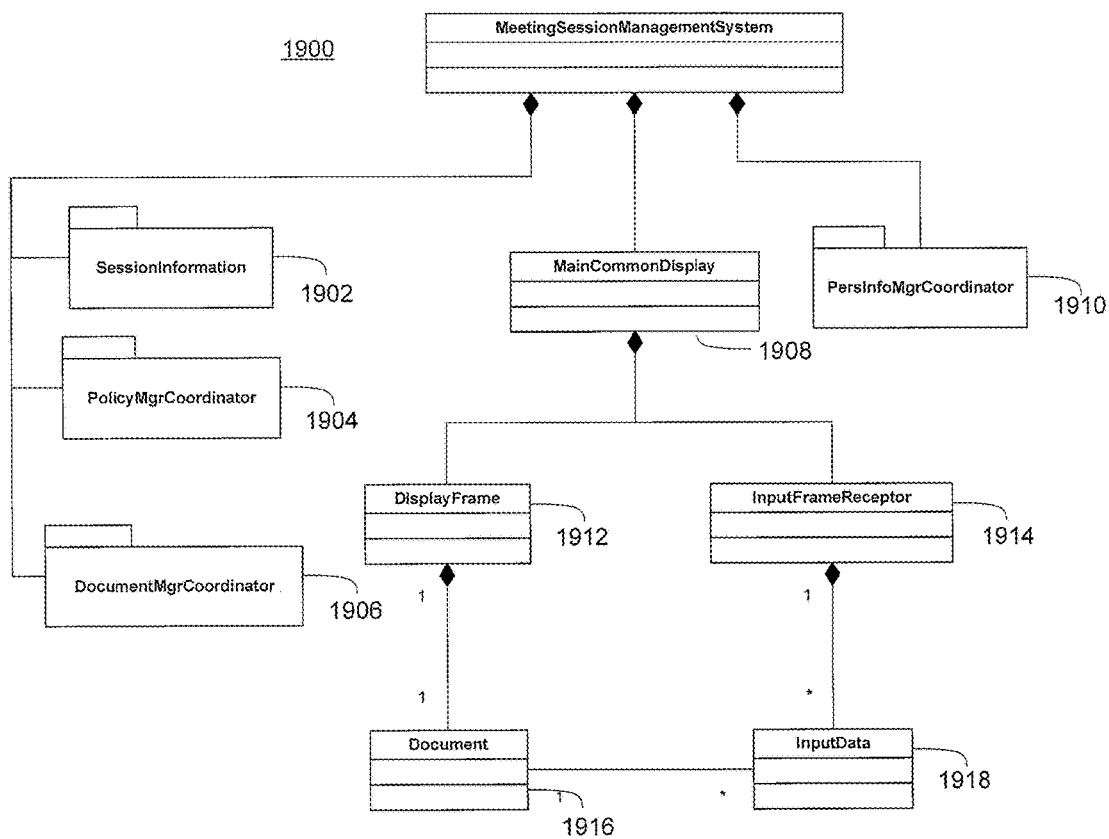
FIG. 19 depicts an example structure of a meeting session management system.

FIG. 19 depicts an example logical structure 1900 of the meeting session management system 1720. The meeting session management system 1720 is able to access various other managers 1910, 1904, 1906 of Device Management System 102 along with the Session Information 1902. A MainCommonDisplay module 1908 coordinates the current session on the main common display 1402 of participating mobile wireless devices. The Main Common Display module 1908 contains the display, DisplayFrame 1912 and input, InputFrameReceptor 1914. DisplayFrame 1912 contains Document 1916 that is displayed. Document is a generic idea and the board in 1440 is also included. InputFrameReceptor 1914 contains multiple InputData 1918. InputData 1918 refers to any input including erase commands and drawing input. InputData 1918 also contains information about the input sender and the time (standard time of the company). The Document 1916 and InputData 1918 are associated to create the comments on the document. In addition, the Meeting Session Manager System 1720 enforces access rights of electronic documents and information. A user may have different, e.g., broader, access rights when located in a building than when the user is located outside of the building. When a user person is not authorized to access the document, the user's Main Common Display may be disabled.

Figure 20:
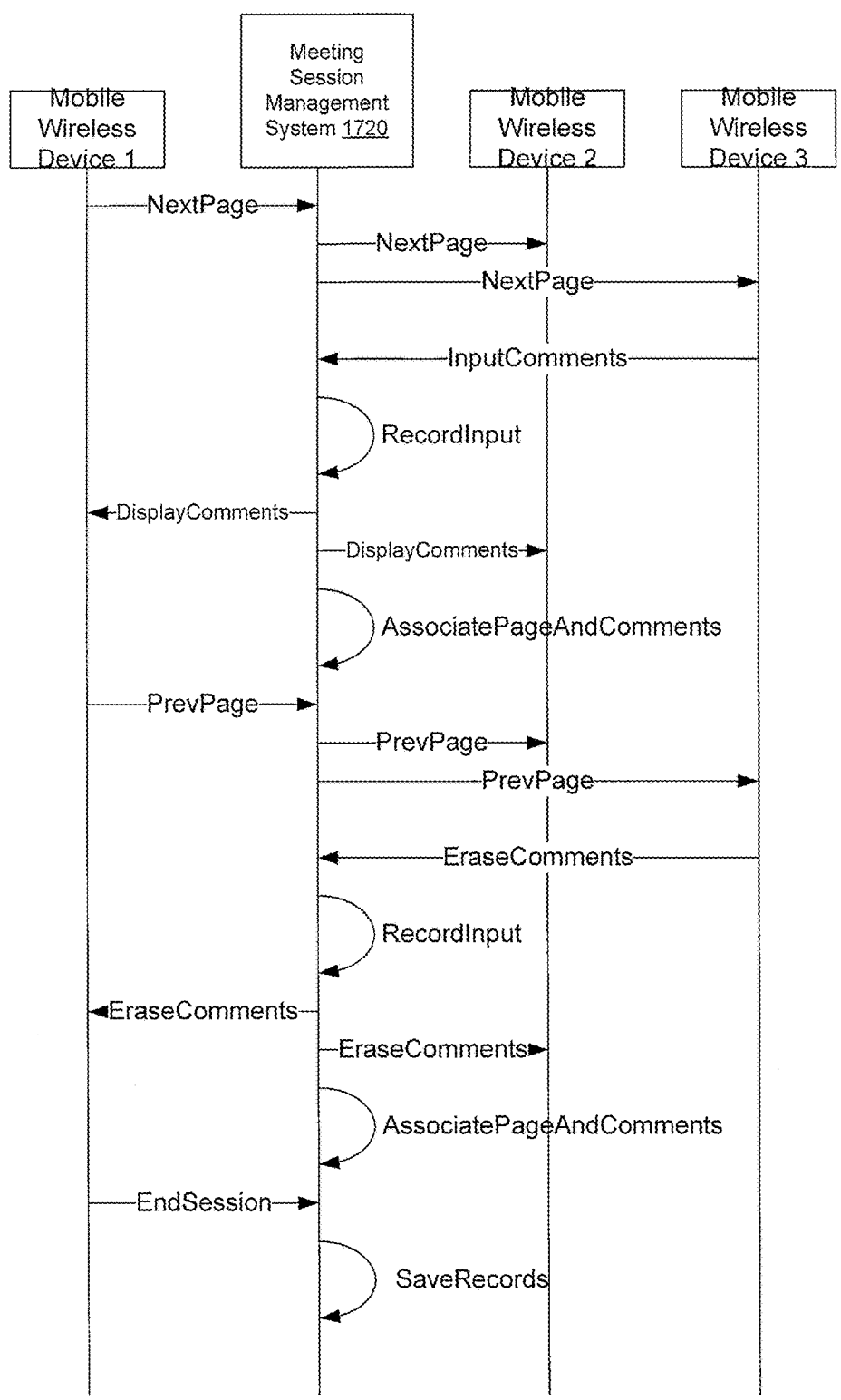
FIG. 20 is a message ladder that depicts example interactions between a meeting session manager and several mobile wireless devices via the main common display.

FIG. 20 is a message ladder that depicts example interactions between the meeting session manager 1720 and several mobile wireless devices via the main common display 1402. the Meeting Session Manager 1720 with the Tablet Devices through the Main Common Display.

FIGS. 21A-D illustrate a meeting arrangement system interface, which may be used to arrange a meeting through meeting system 122. FIG. 21A depicts a meeting arrangement request form, which may be used submit a request to meeting system 122 to determine possible meeting options that satisfy one or more criteria. The meeting arrangement request form may be displayed by any suitable GUI executing on a user's network device. For example, the form may be generated as the home page of meeting system 122 and accessed and displayed to a user via a web browser application. The user may specify an agenda, organizer, key persons, additional persons, date range, and duration for the meeting. The key persons are persons who need to attend the meeting. Additional persons are not required to be in the meeting, but may optionally attend. As used herein "in the meeting", "attending the meeting" or "participating in the meeting" refers to either a person in the physical location of the meeting or a person attending the meeting remotely through a network device, such as a tablet, laptop, or desktop computer. After the user has entered the information, the form is submitted to meeting system 122, which parses the information provided by the user. In response to receiving the form, meeting system 122 determines one or more meeting options that satisfy the criteria specified in the meeting request form, such as the duration of the meeting, the date range, and the availability of key and additional persons. The determination of meeting options is described in further detail below in connection with FIGS. 26 and 27.

FIG. 21B depicts an example presentation of meeting options that may be displayed to a user through a GUI. The meeting options displayed show possible meeting dates, time slots and locations that satisfy the user-specified criteria, as determined by meeting system 122. The meeting options are ranked, where a higher ranking denotes the most number of participants available to attend the meeting. If no time slot is available for key persons, the meeting system 122 will respond with no meeting possible. When the user selects a particular meeting option, such as clicking on the time slot of a displayed meeting option, FIG. 21C shall appear on the screen.

FIG. 21C depicts an example meeting request form after the user has selected a particular meeting option. The meeting request form of FIG. 21C includes all the items from the meeting arrangement request form depicted in FIG. 21A except Date Range is replaced with Date and Time with the highest priority and the location information obtained in the FIG. 21B. Alternatively or in addition to Date and Time, the meeting request form may specify the date and time of the meeting option selected by the user in FIG. 21B. The meeting arrangement request form of FIG. 21C also includes a comments section, where a user may enter comments. When this form is submitted, the meeting system 122 uses the corporate communication and scheduling system 120 to send the meeting invitation to the key persons and the additional persons.

FIG. 21D depicts an example invitation form received by the key persons and additional persons that are invited to attend a meeting. The invitation form includes all the items of the meeting request form. In addition, the invitation form includes a response button for the invitees to respond to the meeting request. For example, the response button may be implemented as a drop-down button where the person can "Accept", "Decline" or "Suggest Other Dates". If the person accepts the invitation, corporate communication and scheduling system 120 automatically updates the person's schedule with the meeting information.

FIGS. 21 A-D may be shown in a closed meeting system application with its own graphical interface or in a browser of a web-based system. If the entire system is based upon the cloud environment, these forms are shown through a browser.

D. Post Meeting Processing

According to one embodiment, various processing may be performed between mobile wireless devices after a meeting has concluded. Example processing includes, without limitation, deleting data from mobile wireless devices and generating meeting records. This approach ensures that information used during a meeting that is not needed for another meeting will be deleted from mobile wireless devices that participated in the meeting. This is particularly useful for meetings that involve the use of confidential information because it reduces the likelihood that the confidential information is made available to third parties.

FIG. 22 is a flow diagram 2200 that depicts an approach for a mobile wireless device to delete data associated with a meeting that has concluded. In step 2202, upon conclusion of the meeting, the mobile wireless device transmits to the device management system 102, a signal that indicates that the meeting has concluded. The signal may be transmitted by any number of the mobile wireless devices that participated in the meeting. For example, the signal may be sent by a particular mobile wireless device that is designated to transmit the signal for the meeting on behalf of all attendees. One example is the mobile wireless device of the meeting organizer who, at the conclusion of the meeting, selects an icon on the mobile wireless device to indicate that the meeting has concluded. The selection of the icon causes the signal to be transmitted to the device management system 102. The generation and transmission of the signal may be performed, for example, by system module 304 and communications module 304.

According to one embodiment, upon completion of a meeting, mobile wireless devices indicate to the device management system 102 one or more data items that were used in association with the meeting and that are stored on the mobile wireless devices. The term "data item" may refer to any type of data used during the meeting. Examples of "data items" include, without limitation, electronic documents and data files. The indication may be transmitted to the device management system 102 with the signal indicating that the meeting has concluded, or the indication may be sent separate from the signal. The generation and transmission of the indication may be performed, for example, by system module 304 and communications module 304. The indication may be made by any number of the participating mobile wireless devices. For example, each of the participating mobile wireless devices may transmit an indication to the device management system 102. As another example, the mobile wireless device of a meeting organizer may transmit an indication to the device management system 102 on behalf of one or more of the mobile wireless devices that were used for the meeting. The indication may be embodied in many different forms, depending upon a particular implementation. For example, the indication may be transmitted as a message, email or other notification. The indication may specify the data based upon, for example, file or document name, data type, etc. For example, suppose that a particular meeting has concluded and the particular meeting involved mobile wireless devices 106 and 108 and that a user of mobile wireless device 106 was the meeting organizer Suppose further that electronic documents A and B were used by the participants and stored on both wireless devices 106 and 108. At the conclusion of the meeting, one or both of mobile wireless devices 106 and 108 transmit a signal to the device management system 102 to indicate that the meeting has concluded. One or both of the mobile wireless devices 106 and 108 also transmit an indication to the device management system 102 to indicate that electronic documents A and B were stored on their respective mobile wireless devices 106 and 108. For example, mobile wireless device 106 may transmit the indication on behalf of both mobile wireless devices 106 and 108, or each mobile wireless device 106 and 108 may transmit their own indications. Device management system 102 may verify this information against data maintained by the document manager 116.

There may be situations where content is created during a meeting. For example, as previously described herein, mobile wireless devices may be configured to share "boards" on which content, such as drawings, notes, etc., may be created in a collaborative manner among the meeting participants. According to one embodiment, mobile wireless devices are configured to transmit content created during a meeting to the device management system 102. For example, suppose that during a meeting between users of mobile wireless device 106 and 108 the participants create a drawing and notes using a shared board, as previously described herein. One or more of the mobile wireless devices 106 and 108 are configured to, at the conclusion of the meeting, generate meeting data that reflects the drawing and notes created during the meeting. For example, the mobile wireless device of the meeting organizer may create the meeting data. Alternatively, the meeting organizer may designate another mobile wireless device to create the meeting data. The meeting data is transmitted to the device management system 102. The creation and transmission to the device management system 102 of meeting data is optional and may be performed using various security measures to protect the meeting data. For example, the meeting data may be encrypted and/or transmitted to the device management system 102 using a secure communications link.

In step 2204, the mobile wireless device determines whether the mobile wireless device has stored thereon any data items that are associated with the meeting that concluded. If the mobile wireless device does not currently store any data items used for the meeting, then the process is complete in step 2206. If so, then in step 2208, a determination is made whether any of the data items remain stored on the mobile wireless device. If not, then the process is complete in step 2206. If, in step 2208, a determination is made that the mobile wireless device stores one or more data items associated with the meeting that concluded, then in step 2210, one of the data items is selected. Next, in step 2212, a determination is made whether the selected data items will be used in a future meeting. This determination may be made using a variety of techniques. For example, another meeting that will use the selected data items may already be scheduled or planned. If the selected data items will be used in a future meeting, then the selected data items are not deleted from the mobile wireless device and the process returns to step 2208. If, in step 2212, a determination is made that the selected data items will not be used in a future meeting, then in step 2214, the selected data items are deleted and then the process returns to step 2208 to determine whether there are any remaining data items stored on the mobile wireless device that were associated with the meeting that concluded. The selection and deletion of data items may be performed, for example, by document management module 312.

Figure 23:
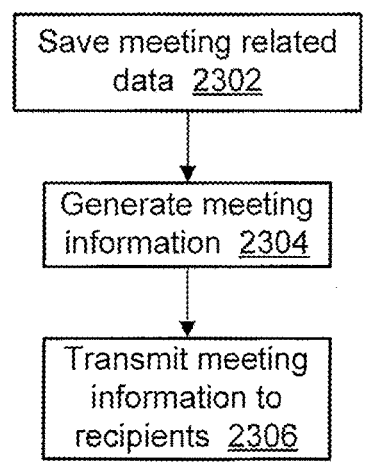
FIG. 23 is a flow diagram that depicts example functions performed by a device management system upon conclusion of a meeting.

FIG. 23 is a flow diagram 2300 that depicts example functions performed by the device management system 102 upon conclusion of a meeting. In step 2302, the device management system 102 saves data related to the meeting. The data may pertain to any attributes of the meeting. Example data includes, without limitation, a name of the meeting, a type of the meeting, a date of the meeting, a duration of the meeting, attendees of the meeting, attributes of mobile wireless devices used by the meeting attendees, data items used during the meeting, etc. The data may be saved, for example, by document manager 116 in a database used by the device management system 102. The data may also include content generated during the meeting by meeting participants.

In step 2304, the device management system 102 generates meeting information for the meeting. The meeting information may comprise, for example, a meeting record or report and may be in a wide variety of formats, depending upon a particular implementation. The meeting information may include any of the information stored in the database by the device management system 102. In step 2306, the meeting information is transmitted to one or more recipients. The recipients may include, for example, the mobile wireless devices of the meeting organizer and/or meeting participants. The meeting information, for example in the form of a meeting record or report, may be used, for example, to document the meeting, e.g., meeting minutes, and satisfy compliance requirements imposed by an organization or governmental body.

Figure 24:
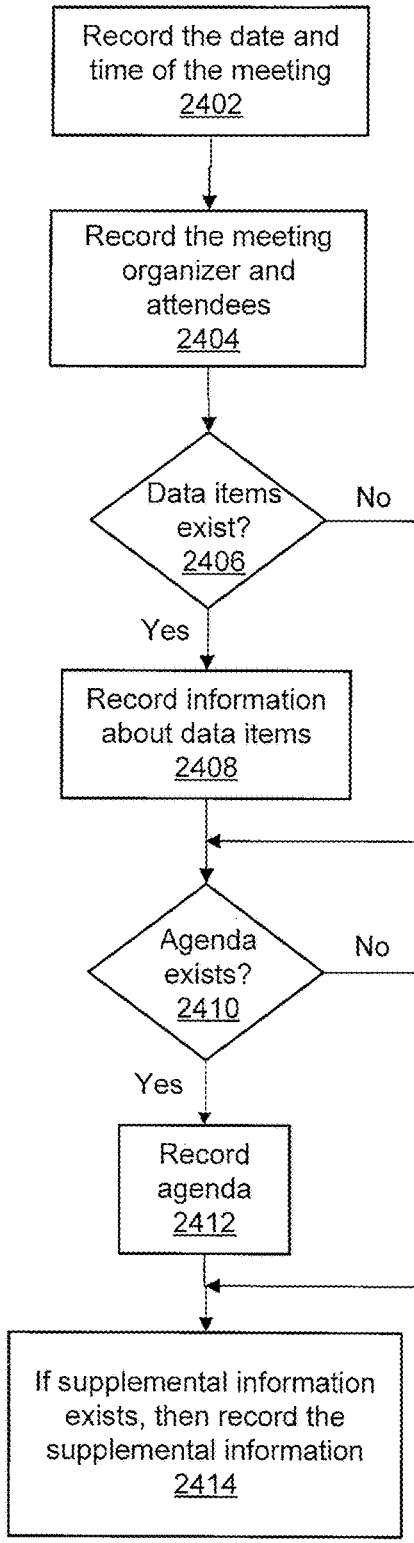
FIG. 24 is a flow diagram that depicts an example approach for storing meeting-related information and generating meeting information that may be, for example, in the form of a meeting report.

FIG. 24 is a flow diagram 2400 that depicts an example approach for storing meeting-related information and generating meeting information that may be, for example, in the form of a meeting report. In step 2402, the date and time of the meeting are recorded. For example, the device management system 102 may store in a database, data that specifies the date and time of the meeting. In step 2404, the meeting organizer and attendees are recorded. In step 2406, a determination is made whether data items exist for the meeting. As previously described herein, data items may be type of data used during the meeting. Examples of data items include, without limitation, electronic documents and data files. If data items exist for the meeting, then in step 2408, information for the data items is recorded. For example, the document manager 116 may generate a meeting report that includes names and links to electronic documents used during the meeting. In step 2410, a determination is made whether an agenda exists for the meeting. If so, then in step 2412, the agenda is recorded. For example, the document manager 116 may add the agenda to the meeting record or report. In step 2414, a determination is made whether any supplemental information exists for the meeting and if so, then the supplemental information is added to the meeting record or report. For example, supplemental information may include decisions items agreed upon during the meeting and action items assigned, as discussed in further detail below FIG. 25 depicts an example meeting record or report 2500 generated via the approach of FIG. 24. The meeting record or report 2500 includes information about the meeting that occurred, such as the date of the meeting, the attendees, documents used during the meeting, an agenda for the meeting and notes provided by the meeting attendees. The meeting report 2500 also includes decision items, which include information about decisions made during the meeting and action items, which include information about tasks assigned during the meeting. Decision items and action items are discussed in further detail below. The meeting record or report may include embedded links to the documents used during the meeting.

VIII. Automatic Meeting Option Determination

In many cases, determining the meeting availability for a number of different persons presents a great challenge. The scheduling conflicts often vary greatly from one person to the next. In addition, the meeting attendees may be located in several different areas. Accordingly, manually determining a best meeting option is often time-consuming and inefficient.

Meeting system 122 greatly facilitates the meeting arrangement process by automatically determining and ranking meeting options that satisfy one or more meeting criteria specified by a user. The meeting criteria may be specified through the meeting arrangement form depicted in FIG. 21A. For example, a meeting organizer may specify key persons, additional persons, a possible date range for the meeting, and the duration of the meeting. Meeting system 122 uses these criteria and compares the criteria with scheduling information, of the participants, provided by corporate communication and scheduling system 120, to determine and rank available meeting options.

The ranking of available meeting options may be performed based upon a variety of ranking criteria, depending upon a particular implementation. For example, the ranking of available meeting options may be based upon a total number of participants that are able to attend the meeting. As another example, the ranking of available meeting options may be based upon a number of additional participants and/or key participants that are able to attend the meeting. In some implementations, all available meeting options necessarily include all key participants, in which case the ranking may not be based upon a total number of key participants that are able to attend the meeting. In other situations, however, not all key participants may be required to attend and therefore the ranking may consider a total number of key participants that are able to attend the meeting. Rankings may also be based upon weightings assigned to participants (key or additional). For example, the availability of particular participants to attend a meeting may at a particular place and time may increase the ranking of that particular place and time. The ranking criteria may be specified by ranking criteria data that is made available to meeting system 122.

Figure 26:
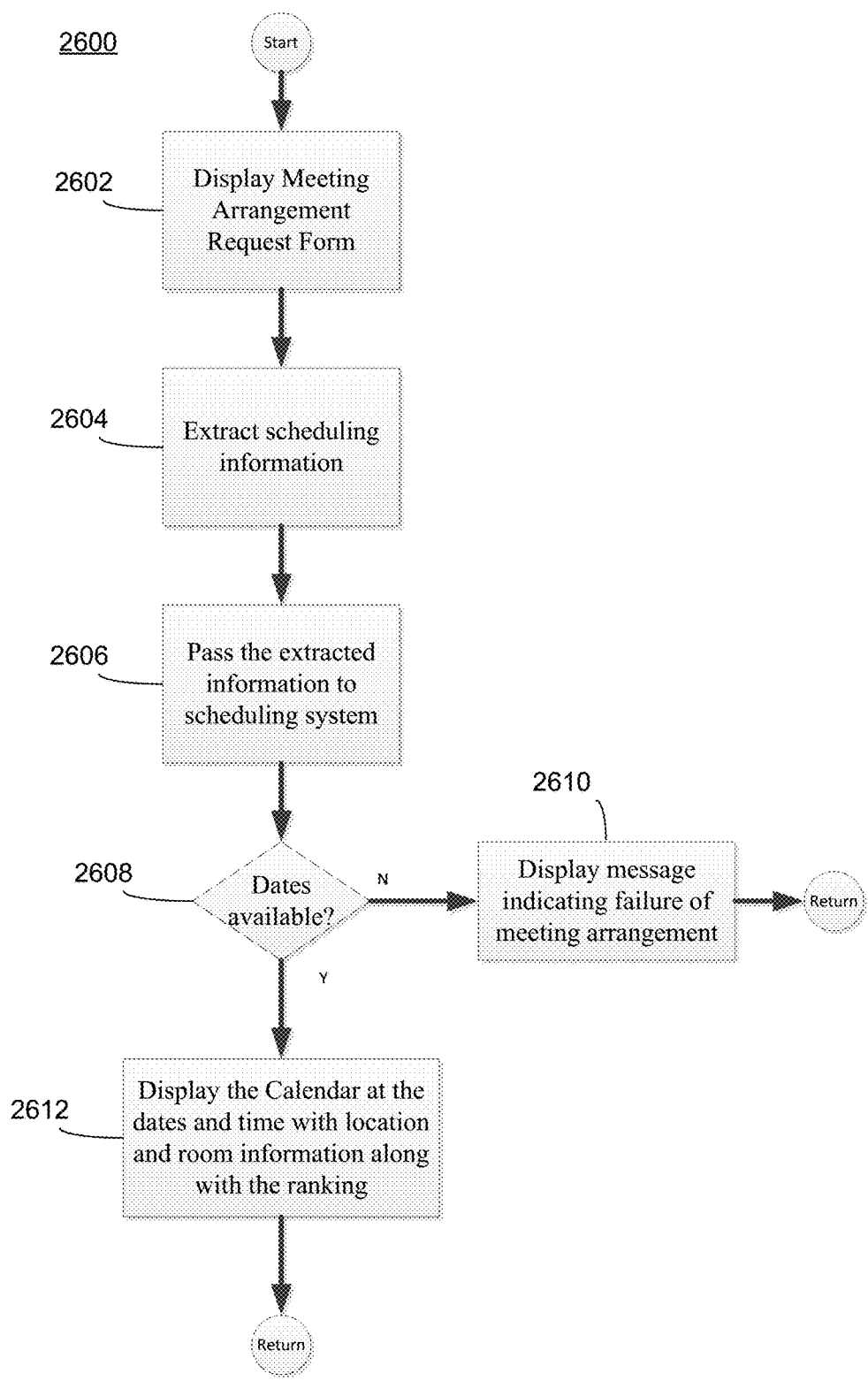
FIG. 26 is a flow diagram that depicts an approach for a scheduling system to display meeting options based on scheduling information.

FIG. 26 is a flow diagram 2600 that depicts an approach for a scheduling system to display meeting options based on user-specified criteria and scheduling information, according to an embodiment. In step 2602, the meeting system 122 causes a meeting arrangement request form, such as the form depicted in FIG. 21A to be displayed to a user. The user inputs, through the meeting arrangement request form, participant identification information that identifies participants invited to attend the meeting. The user further inputs scheduling information that identifies the date range during which the meeting may be held and that identifies the anticipated duration of the meeting. After the user has completed the form, the user submits the form to the meeting system 122. In step 2604, meeting system 122 extracts the participant identification information and scheduling information. In step 2606, meeting system 122 passes the extracted information to corporate communication and scheduling system 120. In step 2608, corporate communication and scheduling system 120 determines whether there are any dates available within the date range during which one or more participants may attend the meeting. If no dates are available, then in step 2610, meeting system 122 causes a message indicating failure of the meeting arrangement to be displayed. In one embodiment, the meeting system 122 may generate the failure message if it determines that no dates are available for all participants to attend the meeting. In another embodiment, the meeting system 122 may generate the failure if it determines that no dates are available for a threshold number of participants to attend the meeting. For example, the meeting system may generate the failure if at least two participants, such as the meeting organizer and an invited participant, are not available to meet at any time within specified range of dates. In step 2612, meeting system 122 causes display of a calendar that includes the dates, times, locations, and room information where the meeting may be held. For example, the meeting options may be presented similar to the meeting option presentation depicted in FIG. 21B. The meeting options may be ranked based on the number of participants that are available to attend the meeting. Meeting times at which more participants are available to attend are ranked higher than meeting times at which fewer participants are available to attend. As used herein, "available to attend" refers to either a person available to attend the meeting at the physical location of the meeting or a person available to attend the meeting remotely through a network device, such as a tablet, laptop, or desktop computer.

Figure 27:
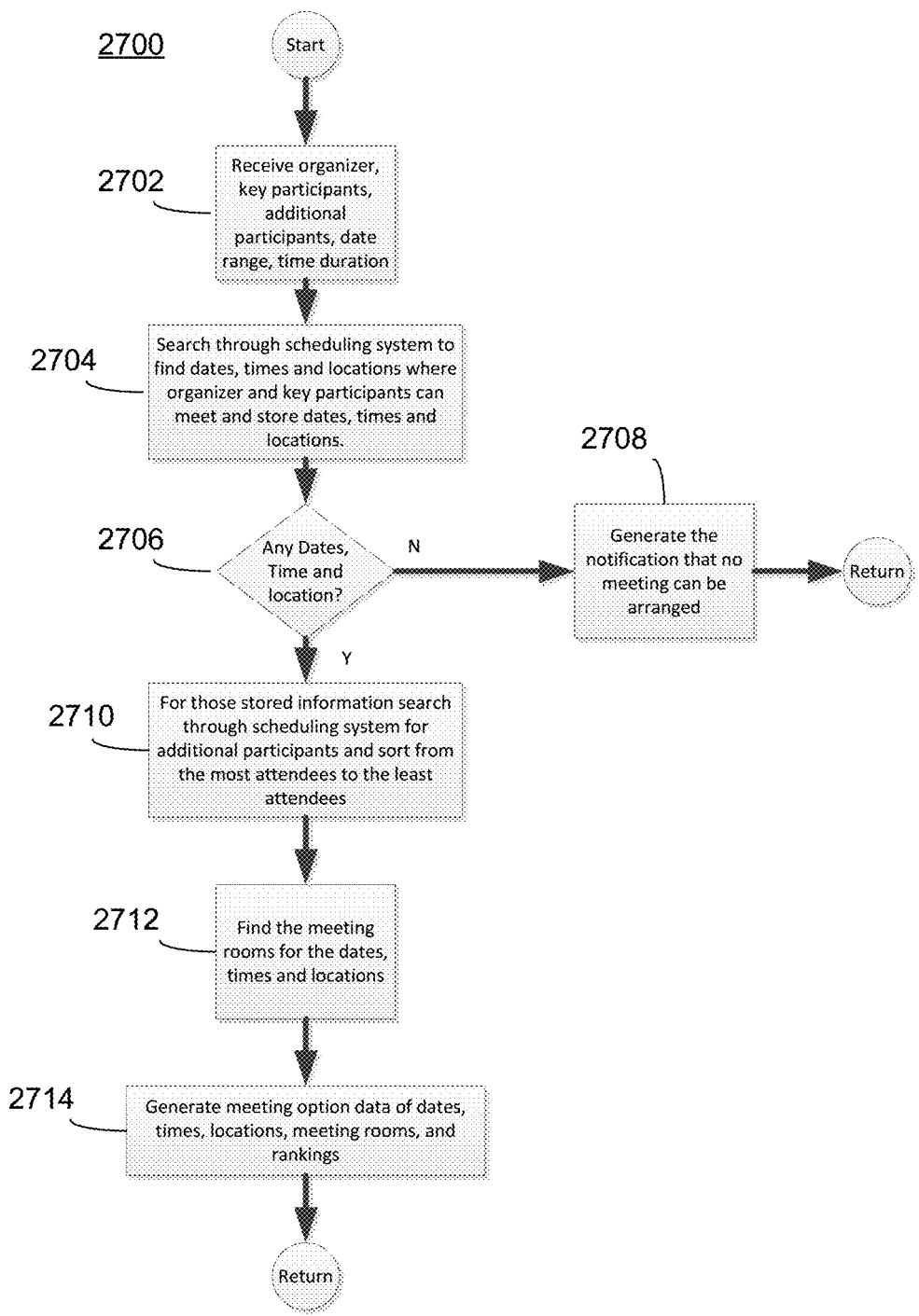
FIG. 27 is a flow diagram that depicts an approach for a scheduling system to generate meeting option data based on participant availability.

FIG. 27 is a flow diagram 2700 that depicts an approach for a scheduling system to display meeting options based on key participant and additional participant availability, according to an embodiment. In step 2702, meeting system 122 receives data that identifies a meeting organizer, key participants, additional participants, a date range, and a time duration for a meeting. Key participants are participants that are required to attend the meeting, according to one embodiment. By contrast, additional participants are participants who may be invited to attend the meeting, but are not required to attend a meeting. In step 2704, meeting system 122 coordinates with corporate communication and scheduling system 120 to find dates, times, and locations where the organizer and key participants can meet and stores these dates times and locations. In step 2706, meeting system 122 determines whether any dates times and locations have been found. If not, then meeting system 122 generates a notification that no meeting can be arranged. Otherwise, in step 2710, meeting system 122 searches communication and scheduling system 120 for additional participant scheduling data to determine which of the date, time, and location meeting options would allow the greatest number of additional participants to attend. The meeting system 122 ranks the meeting options from the greatest number of attendees to the fewest number of attendees. The meeting options and rankings are presented to the user, such as depicted in FIG. 21B. As illustrated, the meeting options and rankings are displayed on a calendar, which allows the user to easily identify the available dates, times, and rankings. The user may select any of the meeting options displayed. In response, the meeting system 122 generates a meeting request from, such as depicted in FIG. 21C. After the user submits the meeting request form, meeting system generates and sends a meeting invitation to the appropriate participants. This meeting request is sent to all participants specified by the user. Alternatively, the meeting request may be sent to only those participants that corporate meeting and scheduling system 120 determines are available to attend the selected meeting option. If a participant accept the meeting request, meeting system 122 automatically updates the participant's schedule by adding the meeting information, including the date, time, duration, and location of the meeting.

IX. Meeting Planning and Presentation

Meeting system 122 may also be configured to manage and facilitate the meeting planning and presentation process. For example, a user, such as a meeting organizer, may submit outline data, decision items, and action items to meeting system 122 before a meeting begins. Outline data may generally comprise any data that the user wishes to be presented to meeting participants during the meeting. For example, outline data may include, without limitation, slides, such as a PowerPoint presentation data, text data, image data, or other data to be presented to participants during the meeting. Decision items are items that are expected to be decided during the meeting. Action items are tasks that are expected to be assigned during the meeting.

Figure 28:
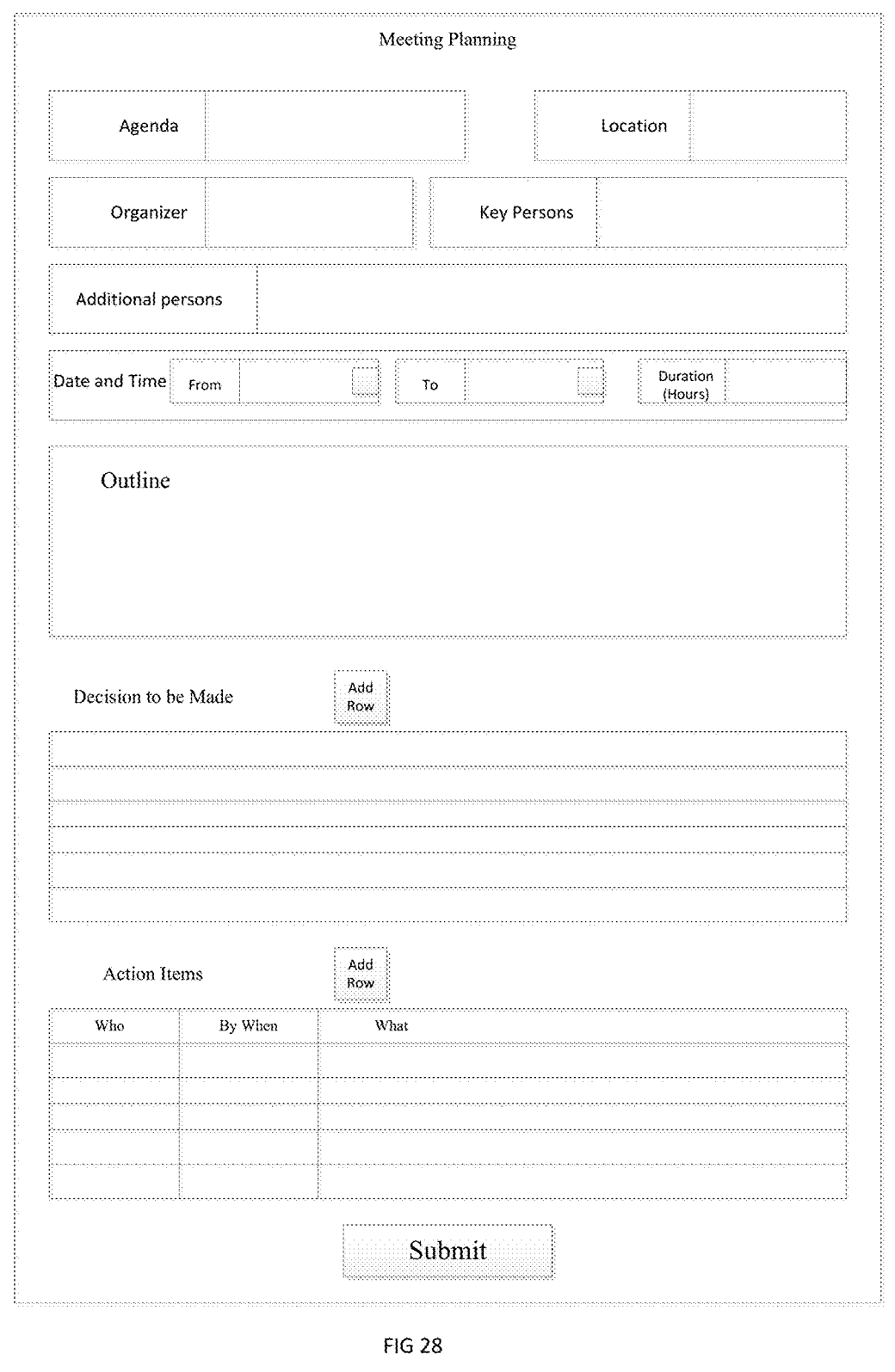

FIG. 28 depicts an example meeting planning form that may be used by a user to prepare for a meeting. The interaction between the system and a user can be through a browser or some graphical interface. After the user logs into the system, the system displays the pending meeting dates and times that the user arranged. When the user chooses the time and dates, the form is displayed for the input by the user. If the user previously filled in all or part of the items, those are displayed. The meeting planning form may be displayed to the user in response to the user selecting a scheduled meeting from a calendar or in response to the user scheduling a meeting. The meeting planning form specifies the agenda, location, organizer, key persons, additional persons, date and time of the meeting. This information may be automatically populated based on the meeting selected by the user. The user can then fill in the outline, decision to be made, and action items that the user desires. The user may copy and paste or type the outline. In an alternative embodiment, the user may attach a file, such as a PowerPoint presentation, to be displayed during the meeting. The meeting planning form includes a submit button for the user to submit the meeting planning form to meeting system 122. The outline, decisions items, and action items are shown to one or more participants during the meeting through the participant's device such as a tablet, laptop, or desktop computer. Accordingly, all participants attending the meeting may easily follow the presentation, even if the participants are remotely located.

Figure 29:
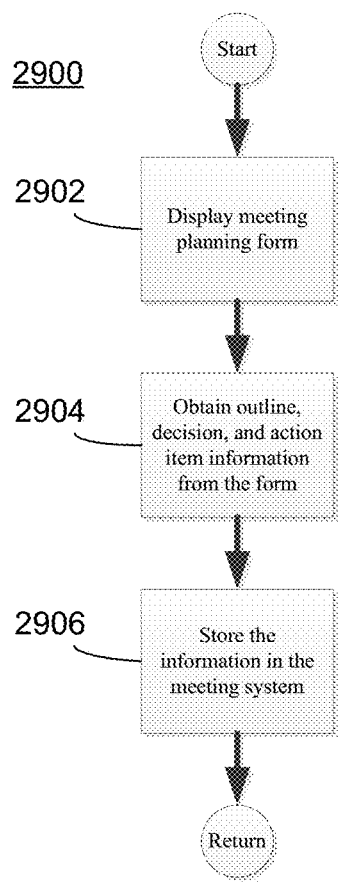
FIG. 29 is a flow diagram that depicts an approach for a meeting system to obtain and store planning information.

FIG. 29 is a flow diagram 2900 that depicts an approach for a meeting system to obtain and store planning information. In step 2902, meeting system 122 causes a meeting planning form, such as the one depicted in FIG. 28, to be displayed to a user. In step 2904, the meeting planning form obtains outline, decision, and action item information from the meeting planning form, as submitted by the user. In step 2906, meeting system 112 stores outline, decision, and action item planning data. The meeting system 122 links the planning information with meeting information, such as the date, time, location, and participants of the meeting data. Thus, meeting system 122 may automatically cause display of the outline, decision, and action items to one or more participants as the meeting begins.

FIG. 30 depicts an example display that may be shown and updated during a meeting. The display includes the outline, decision, and action items previously submitted by the user via the meeting planning form, such as depicted in FIG. 28. The display is presented to one or more network devices that are connected to meeting system 122 and are associated with participants that are authorized to attend the meeting. If there are multiple pages associated with the outline, the meeting organizer may control which page is displayed. If the meeting organizer changes the page that is displayed, the change will be synchronized across all participating devices so that the participating devices will display the same presentation data. The decision items and action items that are displayed may be updated at any point during the meeting. Updating access may be restricted to a single participant, such as the meeting organizer, a group of participants, such as the key participants, or may be permitted by any participant attending the meeting. The display depicted in FIG. 30 does not include a "submit" button as the updated information will be taken and used to generate meeting record data automatically when the meeting ends. For example, the outline, decision, and action times may be recorded in step 2414 in FIG. 24 to be added in the meeting record data. If a decision or action item has not been updated before the meeting is completed, meeting system 122 may prompt a participant, such as the meeting organizer to update the items or may otherwise generate a flag to notify one or more participants that an item has been left unaddressed before the closing of the meeting. For example, the system may generate a flag if a decision has been left unresolved or if an action item has not been assigned by the meeting's end. The user may then choose to update the item or close the meeting without addressing the item.

X. Decision and Action Item Processing

The action item and decision items that are presented during the meeting may be dynamically updated at any time. For example, after a decision has been agreed upon, a participant may select a particular decision item and add information identifying how the particular decision item was resolved during the meeting. As another example, the action items may be updated to reflect a task assignment. Referring to FIG. 30, the "What", "By When" and "Who" fields may be updated at any time during the meeting. The user may have intentionally left one or more of these fields blank in the meeting planning preparation process. The other fields are automatically populated with information the user specified via the meeting planning form depicted in FIG. 28 for display during the meeting. GUI elements may be used to facilitate dynamic item updates during the meeting. For example, the "Who" section of Action items may include drop down buttons where the participants of the meeting are shown, so the meeting organizer does not need to type in the name to assign the action item. Alternatively, the drop down button may show any person with the corporation, regardless of whether they are a participant of the meeting. Thus, the action item may be assigned to a participant of the meeting or a person who is not attending the meeting. For example, supervisors within a corporation attending a meeting may assign action items to employees that are not present at the meeting. Additional decision items and action items, not included in the meeting planning form, may be added during the meeting by selecting the corresponding "Add Row" buttons depicted in FIG. 30, although the GUI may vary from implementation to implementation.

Figure 31:
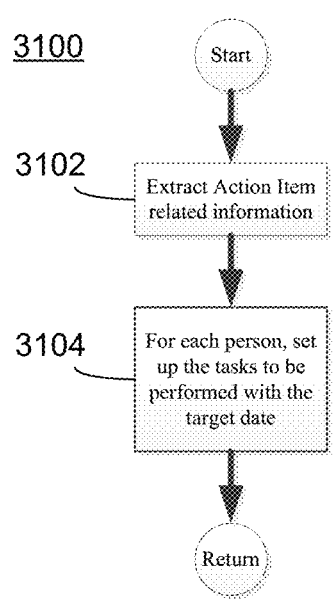
FIG. 31 is a flow diagram that depicts an approach for extracting and setting up task information.

Meeting system 122 coordinates the assigned action items with corporate communication and scheduling system 120. Accordingly action item and other meeting information may be automatically and seamlessly be integrated into a user's schedule. FIG. 31 is a flow diagram 3100 that depicts an approach for extracting and setting up task information, according to an embodiment. In step 3102, meeting system 122 extracts action item related information. For example, meeting system 122 may automatically parse the action item data at the conclusion of a meeting to determine to whom a task is assigned. In step 3104, meeting system 122 sets up the tasks to be performed with the target date for each person that has been assigned a task. For instance, meeting system 122 may send the action item information, including data identifying the person who is assigned the task, the target date for completion of the task, and a description of the task, to corporate communication and scheduling system 120. In response, corporate communication and scheduling system 120 updates the schedule of the person to whom the task is assigned by adding the task to the person's schedule. Adding the task to the person's schedule may include, but is not limited to, setting periodic or other automatic reminders to remind the person of the tasks due date, adding the task description to the calendar on the date that it is due, and adding the task to a to-do list for the person.

At the conclusion of the meeting, the meeting system 122 determines whether any action or decision items have not been addressed. If an action item or decision item has not been addressed, then meeting system 122 may automatically incorporate the item into the schedule of the meeting organizer to remind the meeting organizer that a decision or task remains unaddressed. For example, meeting system 122 may send action or decision related information to corporate communication and scheduling system 120 to add the item to the organizer's to-do list.

XI. Managing Access to Electronic Documents on Client Devices

According to one embodiment, approaches are provided for using policy data to manage access to data on client devices. The device management system 102 may be configured to manage access to data on client devices using policy data. The policy data indicates one or more policies that apply to data to be downloaded to client devices. The policies specify one or more download and processing restrictions to be enforced with respect to the particular electronic document at client devices for example, particular hardware and software configurations that are required at client devices before data is permitted to be downloaded to those client devices. The policies may also specify other requirements that must be satisfied before data is permitted to be downloaded to those client devices, for example, user authentication.

As previously described herein, FIG. 6C depicts an example policy data table 670 maintained by policy manager 112 that includes policy data defined for particular data attribute values. In this example, the policy data specifies download and processing restrictions for data downloaded to client devices.

FIG. 33 depicts a device classification table 3300 that specifies one or more device classification attributes for each of three device classifications. The depiction and description of three device classifications is provided for explanation purposes only and the number and types of device classifications may vary depending upon a particular implementation and the invention is not limited to any particular number or types of device classifications. For example, some implementations may use a greater number of device classifications to provide greater granularity.

In the example depicted in device classification table 3300, the three device classifications include Special Devices, General Devices Configured by a Business Organization and General Devices. The Special Devices device classification is representative of devices having a most restrictive set of device attributes. The General Devices Configured by a Business Organization is representative of devices having an intermediate level of device attributes and the General Devices device classification is representative of devices having a least restrictive set of device attributes. Devices corresponding to the General Devices device classification are general purpose devices, for example, tablet computers, laptop and desktop computers and smart phones, etc., that are not registered with or maintained by a business organization. Devices corresponding to the General Devices Configured by a Business Organization device classification are general purpose devices that are registered with and maintained by a business organization and configured to support enforcement of document and security policies. For example, users of devices in these two device classifications may not be allowed to install any software or otherwise change the configuration of their device. Information technology personnel of the business organization are responsible for maintaining and updating the configuration, including changing settings and installing software. Devices corresponding to the Special Devices device classification are special purpose devices that are registered with and maintained by a business organization and configured to support enforcement of document and security policies. Devices in both the Special Devices device classification and the General Devices Configured by a Business Organization device classifications may be configured with special hardware, software, or any combination of hardware and software to support enforcement of document and security policies. This may include, for example, special firmware, operating system software or application programs that are installed and maintained by a business organization to support enforcement of document and security policies. Devices configured in this manner are capable of implementing the download and processing restrictions specified by the policy data table 670 of FIG. 6C.

Consider the following example. Suppose that a user of the client device has an authorization level of 2 and wishes to view on their client device an electronic document having an attribute value corresponding to Level 1. According to the policy data table 670, the download and processing restrictions associated with Level 1 data specify that the download of data is to be performed based upon authorization level.

According to the policy data contained in the policy data table 600, since the user has an authorization level of 2 and the data has a data attribute value corresponding to Level 1, the data may be downloaded to the client device only if the client device is within the building of the business organization. This is because the policy specifies that for a user having an authorization level 2, Level 0 and Level 1 data cannot be stored on the client device if the client device is outside the building of the business organization, but only Level 0 data cannot be stored on the client device inside the building of the business organization. Assuming that the client device is within a building of the business organization, then according to the policy data table 670, the requested data may be downloaded to the client device.

Referring again to the policy data table 670, the download and processing restrictions associated with Level 1 data also specify that no image copy of the data or a copy of the data may be made at the client device. In addition, the data may only be forwarded to other devices in accordance with the same authorization level. For example, the data may not be forwarded to another user with a lower authorization level, which in the present example, is an authorization level lower than authorization level 2. Thus, in this example, the user may download the electronic document to their client device, but is not permitted to make an image copy of the display at the client device or make a copy of the electronic document. In addition, the electronic document may only be forwarded to a user of another device when that user has an authorization level that is at least as high, i.e., least restrictive, as the current user.

As indicated by this example, multiple policies may be applied to manage access to data on client devices. As one non-limiting example, a first policy may be applied to determine user authentication requirements. A second policy may be applied to determine download and processing restrictions for the client device. A third policy may be applied to implement the processing restrictions at the client device, for example, to control forwarding of data to other devices. According to one embodiment, data indicating corresponding device classifications for devices is maintained by device manager 118.

FIG. 34 is a message ladder diagram 3400 that depicts example messages exchanged between mobile wireless device 106 and the device management system 102 to manage access to data on the mobile wireless device 106, according to one embodiment. For purposes of explanation, the message ladder diagram 3400 is depicted and explained in the context of downloading an electronic document (referred to hereinafter as "the document") to the mobile wireless device 106, but embodiments are not limited to this context and are applicable to any type of electronic data. In addition, various messages and steps are depicted and described as being generated by and performed by, respectively, particular elements of the device management system 102 for purposes of explanation, but embodiments are not limited to this particular example and the various messages and steps depicted may be generated by and performed by other elements of the device management system 102.

Referring to FIG. 34, the mobile wireless device 106 generates and transmits a document request 3402 to the device management system 102 and the document request 3402 is directed to the document manager 116. The document request 3402 may be generated and transmitted in a variety of ways, depending upon the type of mobile wireless device 106 and upon a particular implementation. Examples include, without limitation, a user selecting to read an email from an email client, a user selecting to view an electronic document or a data file from a word processing program or a document viewer program, and a user requesting a Web page from an Internet browser program. The document request 3402 may be a request to view data, download data in its original form, or download data in a different form. The document request 3402 contains data that identifies the document and may also include data that specifies a requested format of the requested document. The data that specifies the requested format may explicitly identify a requested format, or may indirectly identify a requested format, for example, by indicating a file type or extension.

In response to receiving the document request 3402, the document manager 116 generates and transmits a policy request 3404 to the policy manager 112. The policy request 3404 requests policy data that indicates one or more policies that apply to the requested document. The policy manager 112 processes the policy request 3404 to identify policies associated with the requested document, for example, by performing a search based upon the data that identifies the requested document contained in the document request 3402. For example, the policy manager 112 may determine a corresponding level for the requested document and then use the policy data table 670 of FIG. 6C to determine a policy that corresponds to the requested document and specifies download and processing restrictions that are to be applied to the requested document.

The policy manager 112 transmits policy data 3406 back to the document manager 3406 that evaluates the policy data 3406 to determine whether a user authentication policy applies to the requested document. For example, the policy data 3406 may identify a particular policy that is to be applied to the requested document. Assuming that a policy is to be applied to the requested document that requires user authentication, then the document manager 116 generates and transmits a user information request 3408 to the mobile wireless device 106. The mobile wireless device 106 generates and transmits user information 3410 to the document manager 116. The user information 3410 may include a wide variety of information that may vary depending upon a particular implementation. Examples of user information 3410 include, without limitation, a user identification (ID), a password and biometric information. The user information may already be available on the mobile wireless device 106 or may be queried from a user, for example via a user interface or a biometric interface.

In response to receiving the user information 3410, the document manager 116 generates and transmits to the personnel information manager 114 an authentication request 3412 to request authentication of the user of the mobile wireless device 106. The personnel information manager 114 determines, based upon the user information 3410, whether the corresponding user is authorized to access the requested document and generates and transmits to the document manager 116 an authentication result 3414. Determining whether the corresponding user is authorized to access the requested document may include applying a policy associated with a user authentication level as depicted and described herein with respect to the policy data table 600 of FIG. 6A. This may also, or instead, include applying a policy associated with a project, group or user as depicted and described herein with respect to the policy data table 650 of FIG. 6B.

If the authentication result 3414 indicates that the user of the mobile wireless device 106 is not authorized to access the document, then the document manager 116 generates and transmits a notification to the mobile wireless device 106 indicating that the user of the mobile wireless device 106 is not authorized to access the document. The mobile wireless device 106 may process the notification, for example, by notifying the user that they are not authorized to access the document. If the authentication result 3414 indicates that the user of the mobile wireless device 106 is authorized to access the document, then the document manager 116 generates and transmits a device information request 3416 to the mobile wireless device 106 to obtain information about the mobile wireless device 106. The mobile wireless device 106 generates and transmits device information 3418 to the document manager 116. The device information 3418 may include data that merely identifies the mobile wireless device 106. When the mobile wireless device 106 is registered with the device management system 102, this is sufficient information for the device management system 102 to determine the current capabilities and configuration state of the mobile wireless device 106. For example, referring to device classification table 3300 of FIG. 33, devices in the Special Devices and General Devices Configured by a Business Organization device classifications are generally registered with the device management system 102, since devices belonging to these device classifications are configured and maintained by a business organization. Devices belonging to the General Devices device classification may or may not be registered with the device management system 102, depending upon a particular implementation. The device information 3418 may include data in addition to, or instead of, the data that merely identifies the mobile wireless device 106. For example, the device information 3418 may include data that indicates the current capabilities and configuration state of the mobile wireless device 106.

In response to receiving the device information 3418, the document manager 116, either alone or in combination with other elements of the device management system 102, performs device verification 3420. The device verification 3420 determines whether the mobile wireless device 106 is capable of enforcing the download and processing restrictions specified by the one or more policies associated with the requested document. This process may involve several different steps, depending upon the particular mobile wireless device 106 and a particular implementation. For example, the device management system 102 may first determine whether the mobile wireless device 106 is currently registered with the device management system 102. If the mobile wireless device 106 is currently registered with the device management system 102, then the device classification and current configuration of the mobile wireless device 106 is checked to determine whether the mobile wireless device 106 is currently capable of enforcing the download and processing restrictions specified by the one or more policies associated with the requested document. Even if the mobile wireless device 106 is currently registered with the device management system 102, the device management system 102 may obtain the current classification and configuration of the mobile wireless device 106 in case the classification or configuration has changed since the last time the classification and configuration information was updated for the mobile wireless device 106 in the device management system 102. If the mobile wireless device 106 is not currently registered with the device management system 102 or has a General Devices classification, the device management system 102 may obtain the current classification and configuration of the mobile wireless device 106.

Figure 35:
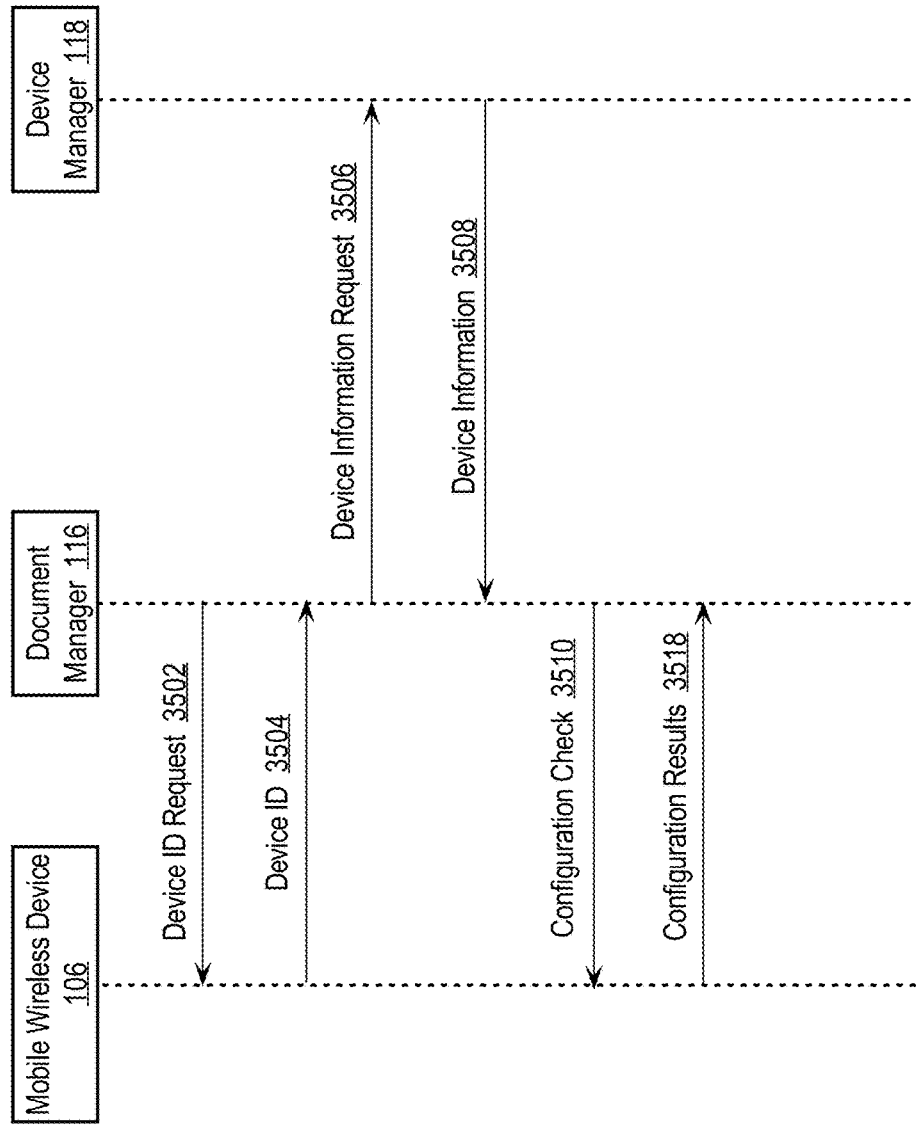
FIG. 35 is a message ladder diagram that depicts example messages exchanged between a device management system and a mobile wireless device to perform a device qualification check of the mobile wireless device.

FIG. 35 is a message ladder diagram 3500 that depicts example messages exchanged between the device management system 102 and the mobile wireless device 106 to perform a device qualification check of the mobile wireless device 106. The document manager 116 generates and transmits to the mobile wireless device 106 a device identification ID request 3502 to request data that identifies the mobile wireless device 106. For purposes of explanation, this approach is depicted in FIG. 35 and described herein in the context of the document manager 116 generating and transmitting the device ID request 3502, but this may be performed by other elements of the device management system 102, depending upon a particular implementation. The form and content of the device ID request 3502 may vary depending upon a particular implementation. As one non-limiting example, the device ID request 3502 may be an SNMP request.

In response to receiving the device ID request 3502, the mobile wireless device 106 provides device identification data 3504 to the document manager 116. The device identification data 3504 may be any data that identifies the mobile wireless device 106 and the invention is not limited to any particular type or form of document identification data 3504. Examples of device identification data 3504 include, without limitation, a name, an address, a serial number, an identification code, a MAC address, a signature, etc. If the device identification data 3504 cannot be obtained from the mobile wireless device 106, then the device qualification check is considered to be unsuccessful.

Assuming that the document manager 116 receives the device identification data 3504, the document manager 116 generates and transmits to the device manager 118 a device information request 3506. The device information request 3506 includes data that identifies the mobile wireless device 106. This may include, for example, the device identification data 3504 received from the mobile wireless device 106. In response to receiving the device information request 3506, the device manager 118 transmits to the document manager 116 device information 3508 that indicates one or more attributes of the mobile wireless device 106. For example, the device information 3508 may indicate the current device classification and current configuration of the mobile wireless device 106. According to one embodiment, the device management system 102 maintains data that indicates the current device classification and current configuration of client devices registered with the device management system 102.

The document manager 116 causes a configuration check request 3510 to be generated and transmitted to the mobile wireless device 106 to obtain the current configuration of the mobile wireless device 106. The configuration check request 3510 may be generated by the document manager 116 itself, or for example, by another software process configured to perform configuration checks, such as device audit software that is invoked by the document manager 116 or other elements of the device management system 102. In response to receiving the configuration check request 3510, the mobile wireless device generates and transmits to the document manager 116 configuration results 3518 that indicate the current configuration of the mobile wireless device 106. The configuration check request 3510 may cause the execution of a special software process on the mobile wireless device 106. The special software process may be pre-installed by the business organization and may be unknown to the user of the mobile wireless device 106. The special process may generate and provide the configuration results 3518. One example of a special process is audit software that is installed and configured by information technology personnel of a business organization. The configuration results 3518 may include a wide variety of information, depending upon a particular implementation, and the invention is not limited to any particular type or form of information contained in the configuration results 3518. Examples of data included in the configuration results 3518 include, without limitation, one or more hardware attributes, such as installed hardware elements, one or more software attributes indicating the installed operating system and one or more installed software programs. As described hereinafter in more detail with respect to FIG. 36, the configuration results 3518 may be used to verify the configuration of the mobile wireless device 106.

FIG. 36 is a flow diagram 3600 that depicts an approach for performing a device qualification check according to an embodiment. In step 3602, device ID data is obtained. For example, the device management system 102 queries the mobile wireless device 106 for data that identifies the mobile wireless device 106. In step 3604, a check is made to determine whether the client device is registered. For example, the device management system 102 determines, based upon the device ID data received from the mobile wireless device 106, whether the mobile wireless device 106 is currently registered with the device management system 102. This may be done, for example, by determining whether registration data exists in the device management system 102 for the mobile wireless device 106. In step 3606, if the device is not currently registered with the device management system 102, then in step 3608, the device is classified as a General Device, which may include storing data in the device management system 102 indicating that the mobile wireless device 106 is classified as a General Device.

If in step 3606, the device is registered, then in step 3610, the request is made to the device to run a system check to obtain the current device classification and configuration. This may include, for example, invoking audit software installed on the mobile wireless device 102 that provides the current configuration of the mobile wireless device 106. In step 3612, the current device classification and configuration obtained from the device are compared to the current device classification and configuration data stored in the device management system 102 for the device. In step 3614, a determination is made whether the device classification or configuration has changed. If so, then in step 3608 the device is classified as a General Device, since the current configuration of the mobile wireless device 106 cannot be relied upon to enforce a download and processing restriction policy.

If no change has occurred, then in step 3616, the device is classified according to its current configuration state. For example, if the current configuration supports enforcement of document policies and security, then the device is classified as either a General Device Configured by a Business Organization or a Special Device, depending upon whether the device is a general purpose device or a special device.

Returning to FIG. 34, if the device verification 3420 is not successfully completed, then document manager 116 may generate and transmit a message to the mobile wireless device 106 indicating that the device verification 3420 was not successful. In response to receiving this message, the mobile wireless device 106 may notify the user that the device verification 3420 was not successful. If the device verification 3420 has been successfully completed, then the document manager 116 provides the requested document 3424 to the mobile wireless device 106. The format of the requested document 3424 may be requested by a user of the mobile wireless device 106, for example, by the user selecting the document in a particular format. Alternatively, the device management system 102 may determine the format of the requested document 3424. For example, the device management system 102 may provide the requested document 3424 in a protected format that limits the ability of a user of the mobile wireless device 106 to edit and/or save the requested document 3424.

FIG. 37 is a flow diagram 3700 that depicts an approach for using policies to manage access to data on the mobile wireless device 106, according to one embodiment. In step 3702, a document request is received. For example, the device management system 102 may receive a request for a document from the mobile wireless device 106. In step 3704, policy data is obtained for the requested document. For example, the policy manager 112 may identify one or more policies associated with the requested document based upon identification data that identifies the requested document. In step 3706, user information is obtained from the mobile wireless device 106. In this example it is presumed that the policy for the requested document indicates that user authorization is a prerequisite to allowing download of the document to the mobile wireless device 106. In step 3708, a determination is made whether the user is authorized based upon the user information. For example, the document manager 116 may verify whether the user information obtained in step 3706 matches user information stored by the device management system 102. If not, then a message is generated and transmitted to the mobile wireless device 106 rejecting access to the requested document. The message may include data which, when conveyed to the user, indicates that the user is not authorized to access the document. If the user is authorized to access the requested document, then in step 3712, device information is obtained. The device information obtained includes information sufficient to determine whether, in step 3714, the mobile wireless device 106 satisfies the requirements of the policies for the requested document. The mobile wireless device 106 must be configured to enforce the download and processing restrictions for the requested document, as previously described herein. If not, then in step 3710, a message is generated and transmitted to the mobile wireless device 106 rejecting access to the requested document. The message may include data which, when conveyed to the user, indicates that the mobile wireless device 106 is not currently configured to enforce the download and processing restrictions associated with the requested document. If in step 3714, the mobile wireless device 106 is determined to be configured to satisfy the requirements of the policies for the requested document, then in step 3716, the document is prepared, if applicable, and transmitted to the mobile wireless device 106.

In the foregoing specification, embodiments have been described with reference to numerous specific details that may vary from implementation to implementation. Thus, the sole and exclusive indicator of what is, and is intended by the applicants to be the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable medium for managing access to a particular electronic document, the computer-readable medium storing instructions which, when processed by one or more processors, causes:
   a device management system receiving, from a client device a request to access a particular electronic document, user identification information, and device identification information;
   determining, from the user identification information and device identification information that a user of the client device is a registered owner of the client device;
   determining, from a plurality of policies, one or more policies that apply to the particular electronic document, wherein the one or more policies specify one or more download and processing restrictions to be enforced with respect to the particular electronic document at client devices;
   in response to determining the one or more policies that specify the one or more download and processing restrictions to be enforced with respect to the particular electronic document at client devices:
      determining, based on the user identification information, a status of the user of the client device from stored personnel information, and
      determining, based on the status of the user of the client device and the one or more policies that apply to the particular electronic document, whether the user of the client device is authorized to download the particular electronic document;
   in response to determining that the user of the client device is authorized to download the particular electronic document:
      determining one or more attributes of the client device to which the particular electronic document is to be downloaded,
      determining, based upon the one or more attributes of the client device to which the particular electronic document is to be downloaded, whether the client device is currently configured to enforce the one or more download and processing restrictions with respect to the particular electronic document, and
      in response to determining, based upon the one or more attributes of the client device to which the particular electronic document is to be downloaded, that the client device is currently configured to enforce the one or more download and processing restrictions with respect to the particular electronic document, then providing the particular electronic document to the client device.

2. The non-transitory computer-readable medium of claim 1, wherein determining whether a user of the client device is authorized to download the particular electronic document includes:
   obtaining user authentication data for the user of the client device, and
   determining, based upon the user authentication data, whether the user is authorized to download the particular electronic document.

3. The non-transitory computer-readable medium of claim 1, wherein determining whether a user of the client device is authorized to download the particular electronic document includes:
   determining an authorization level that corresponds to the user of the client device,
   determining, based upon the one or more policies that apply to the particular electronic document, one or more attributes of electronic documents that are permitted to be downloaded to client device, and
   determining, based upon the authorization level that corresponds to the user of the client device and the one or more attributes of electronic documents that are permitted to be downloaded to client device and one or more attributes of the particular electronic document, whether the user is authorized to download the particular electronic document to the client device.

4. The non-transitory computer-readable medium of claim 1, wherein the one or more processing restrictions to be enforced with respect to the particular electronic document at client devices include one or more of allowing only data of one or more specified formats to be downloaded to the particular client device, allowing only the display of the particular electronic document at the client device, not allowing a copy of the particular electronic document to be stored at the client device, allowing a copy of the particular electronic document to be stored at the client device in accordance with an authorization level, not allowing a copy of the particular electronic document to be forwarded from the client device to another device, allowing a copy of the particular electronic document to be forwarded from the client device to another device in accordance with an authorization level, or deleting the particular electronic device from the client device after display of the particular electronic document.

5. The non-transitory computer-readable medium of claim 1, wherein determining, based upon the one or more attributes of the client device to which the particular electronic document is to be downloaded, whether the client device is currently configured to enforce the one or more download and processing restrictions with respect to the particular electronic document includes determining whether the client device is currently configured to allow only the display of the particular electronic document at the client device, not allow a copy of the particular electronic document to be stored at the client device, allow a copy of the particular electronic document to be stored at the client device in accordance with an authorization level, not allow a copy of the particular electronic document to be forwarded from the client device to another device or allow a copy of the particular electronic document to be forwarded from the client device to another device in accordance with an authorization level.

6. The non-transitory computer-readable medium of claim 1, wherein determining, based upon the one or more attributes of the client device to which the particular electronic document is to be downloaded, whether the client device is currently configured to enforce the one or more download and processing restrictions with respect to the particular electronic document includes determining whether the current hardware and software configuration of the client device allows only the display of the particular electronic document at the client device, does not allow a copy of the particular electronic document to be stored at the client device, allows a copy of the particular electronic document to be stored at the client device in accordance with an authorization level, does not allow a copy of the particular electronic document to be forwarded from the client device to another device or allows a copy of the particular electronic document to be forwarded from the client device to another device in accordance with an authorization level.

7. The non-transitory computer-readable medium of claim 1, wherein determining, from a plurality of policies, one or more policies that apply to the particular electronic document, is performed based on at least one or more of a file type of the particular electronic document or a logical group that corresponds to the particular electronic document.

8. An apparatus for managing access to a particular electronic document, the apparatus including a memory storing instructions which, when processed by one or more processors, cause:
   a device management system receiving, from a client device a request to access a particular electronic document, user identification information, and device identification information;
   determining, from the user identification information and device identification information that a user of the client device is a registered owner of the client device;
   determining, from a plurality of policies, one or more policies that apply to the particular electronic document, wherein the one or more policies specify one or more download and processing restrictions to be enforced with respect to the particular electronic document at client devices;
   in response to determining the one or more policies that specify the one or more download and processing restrictions to be enforced with respect to the particular electronic document at client devices:
      determining, based on the user identification information, a status of the user of the client device from stored personnel information, and
      determining, based on the status of the user of the client device and the one or more policies that apply to the particular electronic document, whether the user of the client device is authorized to download the particular electronic document;
   in response to determining that the user of the client device is authorized to download the particular electronic document:
      determining one or more attributes of the client device to which the particular electronic document is to be downloaded,
      determining, based upon the one or more attributes of the client device to which the particular electronic document is to be downloaded, whether the client device is currently configured to enforce the one or more download and processing restrictions with respect to the particular electronic document, and
      in response to determining, based upon the one or more attributes of the client device to which the particular electronic document is to be downloaded, that the client device is currently configured to enforce the one or more download and processing restrictions with respect to the particular electronic document, then providing the particular electronic document to the client device.

9. The apparatus of claim 8, wherein determining whether a user of the client device is authorized to download the particular electronic document includes:
   obtaining user authentication data for the user of the client device, and
   determining, based upon the user authentication data, whether the user is authorized to download the particular electronic document.

10. The apparatus of claim 8, wherein determining whether a user of the client device is authorized to download the particular electronic document includes:
   determining an authorization level that corresponds to the user of the client device,
   determining, based upon the one or more policies that apply to the particular electronic document, one or more attributes of electronic documents that are permitted to be downloaded to client device, and
   determining, based upon the authorization level that corresponds to the user of the client device and the one or more attributes of electronic documents that are permitted to be downloaded to client device and one or more attributes of the particular electronic document, whether the user is authorized to download the particular electronic document to the client device.

11. The apparatus of claim 8, wherein the one or more processing restrictions to be enforced with respect to the particular electronic document at client devices include one or more of allowing only data of one or more specified formats to be downloaded to the particular client device, allowing only the display of the particular electronic document at the client device, not allowing a copy of the particular electronic document to be stored at the client device, allowing a copy of the particular electronic document to be stored at the client device in accordance with an authorization level, not allowing a copy of the particular electronic document to be forwarded from the client device to another device, allowing a copy of the particular electronic document to be forwarded from the client device to another device in accordance with an authorization level, or deleting the particular electronic device from the client device after display of the particular electronic document.

12. The apparatus of claim 8, wherein determining, based upon the one or more attributes of the client device to which the particular electronic document is to be downloaded, whether the client device is currently configured to enforce the one or more download and processing restrictions with respect to the particular electronic document includes determining whether the client device is currently configured to allow only the display of the particular electronic document at the client device, not allow a copy of the particular electronic document to be stored at the client device, allow a copy of the particular electronic document to be stored at the client device in accordance with an authorization level, not allow a copy of the particular electronic document to be forwarded from the client device to another device or allow a copy of the particular electronic document to be forwarded from the client device to another device in accordance with an authorization level.

13. The apparatus of claim 8, wherein determining, based upon the one or more attributes of the client device to which the particular electronic document is to be downloaded, whether the client device is currently configured to enforce the one or more download and processing restrictions with respect to the particular electronic document includes determining whether the current hardware and software configuration of the client device allows only the display of the particular electronic document at the client device, does not allow a copy of the particular electronic document to be stored at the client device, allows a copy of the particular electronic document to be stored at the client device in accordance with an authorization level, does not allow a copy of the particular electronic document to be forwarded from the client device to another device or allows a copy of the particular electronic document to be forwarded from the client device to another device in accordance with an authorization level.

14. The apparatus of claim 8, wherein determining, from a plurality of policies, one or more policies that apply to the particular electronic document, is performed based on at least one or more of a file type of the particular electronic document or a logical group that corresponds to the particular electronic document.

15. A computer-implemented method for managing access to a particular electronic document, the computer-implemented method comprising:
- a device management system receiving, from a client device a request to access a particular electronic document, user identification information, and device identification information;
- determining, from the user identification information and device identification information that a user of the client device is a registered owner of the client device;
- determining, from a plurality of policies, one or more policies that apply to the particular electronic document, wherein the one or more policies specify one or more download and processing restrictions to be enforced with respect to the particular electronic document at client devices;
- in response to determining the one or more policies that specify the one or more download and processing restrictions to be enforced with respect to the particular electronic document at client devices:
  - determining, based on the user identification information, a status of the user of the client device from stored personnel information, and
  - determining, based on the status of the user of the client device and the one or more policies that apply to the particular electronic document, whether the user of the client device is authorized to download the particular electronic document;
- in response to determining that the user of the client device is authorized to download the particular electronic document:
  - determining one or more attributes of the client device to which the particular electronic document is to be downloaded,
  - determining, based upon the one or more attributes of the client device to which the particular electronic document is to be downloaded, whether the client device is currently configured to enforce the one or more download and processing restrictions with respect to the particular electronic document, and
  - in response to determining, based upon the one or more attributes of the client device to which the particular electronic document is to be downloaded, that the client device is currently configured to enforce the one or more download and processing restrictions with respect to the particular electronic document, then providing the particular electronic document to the client device.

16. The computer-implemented method of claim 15, wherein determining whether a user of the client device is authorized to download the particular electronic document includes:
- determining an authorization level that corresponds to the user of the client device,
- determining, based upon the one or more policies that apply to the particular electronic document, one or more attributes of electronic documents that are permitted to be downloaded to client device, and
- determining, based upon the authorization level that corresponds to the user of the client device and the one or more attributes of electronic documents that are permitted to be downloaded to client device and one or more attributes of the particular electronic document, whether the user is authorized to download the particular electronic document to the client device.

17. The computer-implemented method of claim 15, wherein the one or more processing restrictions to be enforced with respect to the particular electronic document at client devices include one or more of allowing only data of one or more specified formats to be downloaded to the particular client device, allowing only the display of the particular electronic document at the client device, not allowing a copy of the particular electronic document to be stored at the client device, allowing a copy of the particular electronic document to be stored at the client device in accordance with an authorization level, not allowing a copy of the particular electronic document to be forwarded from the client device to another device, allowing a copy of the particular electronic document to be forwarded from the client device to another device in accordance with an authorization level, or deleting the particular electronic device from the client device after display of the particular electronic document.

18. The computer-implemented method of claim 15, wherein determining, based upon the one or more attributes of the client device to which the particular electronic document is to be downloaded, whether the client device is currently configured to enforce the one or more download and processing restrictions with respect to the particular electronic document includes determining whether the client device is currently configured to allow only the display of the particular electronic document at the client device, not allow a copy of the particular electronic document to be stored at the client device, allow a copy of the particular electronic document to be stored at the client device in accordance with an authorization level, not allow a copy of the particular electronic document to be forwarded from the client device to another device or allow a copy of the particular electronic document to be forwarded from the client device to another device in accordance with an authorization level.

19. The computer-implemented method of claim 15, wherein determining, based upon the one or more attributes of the client device to which the particular electronic document is to be downloaded, whether the client device is currently configured to enforce the one or more download and processing restrictions with respect to the particular electronic document includes determining whether the current hardware and software configuration of the client device allows only the display of the particular electronic document at the client device, does not allow a copy of the particular electronic document to be stored at the client device, allows a copy of the particular electronic document to be stored at the client device in accordance with an authorization level, does not allow a copy of the particular electronic document to be forwarded from the client device to another device or allows a copy of the particular electronic document to be forwarded from the client device to another device in accordance with an authorization level.

20. The computer-implemented method of claim 15, wherein determining, from a plurality of policies, one or more policies that apply to the particular electronic document, is performed based on at least one or more of a file type of the particular electronic document or a logical group that corresponds to the particular electronic document.

* * * * *